United States Patent
Xia et al.

(10) Patent No.: US 12,314,398 B2
(45) Date of Patent: May 27, 2025

(54) REMOTE ATTESTATION METHOD AND APPARATUS

(71) Applicant: Huawei Technologies Co., Ltd., Shenzhen (CN)

(72) Inventors: Liang Xia, Shenzhen (CN); Wei Pan, Nanjing (CN); Yulin Shi, Nanjing (CN); Jianxiong Wei, Beijing (CN)

(73) Assignee: Huawei Techologies Co., Ltd., Shenzhen (CN)

( * ) Notice: Subject to any disclaimer, the term of this patent is extended or adjusted under 35 U.S.C. 154(b) by 596 days.

(21) Appl. No.: 17/647,657

(22) Filed: Jan. 11, 2022

(65) Prior Publication Data

US 2022/0131856 A1 Apr. 28, 2022

Related U.S. Application Data

(63) Continuation of application No. PCT/CN2020/101643, filed on Jul. 13, 2020.

(30) Foreign Application Priority Data

Jul. 12, 2019 (CN) .......................... 201910631547.4

(51) Int. Cl.
*G06F 21/57* (2013.01)
*H04L 9/40* (2022.01)

(52) U.S. Cl.
CPC ........ *G06F 21/577* (2013.01); *H04L 63/0428* (2013.01); *H04L 63/0853* (2013.01)

(58) Field of Classification Search
CPC ............ H04L 63/0853; H04L 63/0428; H04L 63/0442; H04L 63/10; G06F 21/577; G06F 21/57
See application file for complete search history.

(56) References Cited

U.S. PATENT DOCUMENTS 9,363,241 B2 6/2016 Deutsch et al.
9,411,962 B2 * 8/2016 Attfield ................. G06F 21/57
(Continued)

FOREIGN PATENT DOCUMENTS

CN 101043338 A 9/2007
CN 102096778 A 6/2011
(Continued)

OTHER PUBLICATIONS

Birkholz, H. et al., "Reference Terminology for Remote Attestation Procedures", draft-birkholz-attestation-terminology-02, Network Working Group Internet-Draft, Jul. 2, 2018, 17 pages.
(Continued)

*Primary Examiner* — Michael R Vaughan
(74) *Attorney, Agent, or Firm* — Slater Matsil, LLP

(57) ABSTRACT

This application discloses a remote attestation method and an apparatus. The method specifically includes: A first network device receives encrypted information and first measurement information of a second network device through the second network device, where the encrypted information is information obtained by encrypting second measurement information of a third network device; the first network device determines, based on the first measurement information, that the second network device is system-trusted; and the first network device decrypts the encrypted information to obtain the second measurement information.

16 Claims, 24 Drawing Sheets

(56) References Cited

U.S. PATENT DOCUMENTS

| | | | |
|---|---|---|---|
| 9,521,125 | B2 | 12/2016 | Schulz |
| 10,848,301 | B1* | 11/2020 | Fregly .................. H04L 61/4511 |
| 11,140,049 | B2* | 10/2021 | A ......................... H04L 41/5019 |
| 11,550,903 | B1* | 1/2023 | Epstein .................... G06F 21/57 |
| 2006/0005000 | A1 | 1/2006 | King et al. |
| 2006/0277417 | A1* | 12/2006 | Oikawa ............... H04L 63/0823 <br> 713/193 |
| 2010/0031047 | A1* | 2/2010 | Coker, II ............ H04L 63/0281 <br> 713/176 |
| 2011/0202992 | A1 | 8/2011 | Xiao et al. |
| 2012/0023334 | A1 | 1/2012 | Brickell et al. |
| 2012/0216244 | A1* | 8/2012 | Kumar .................... G06F 21/31 <br> 726/1 |
| 2014/0089660 | A1 | 3/2014 | Sarangshar et al. |
| 2014/0359777 | A1* | 12/2014 | Lam ...................... G06F 21/577 <br> 726/25 |
| 2017/0126647 | A1* | 5/2017 | Zhang .................... H04L 63/08 |
| 2017/0277895 | A1* | 9/2017 | Cha ....................... H04L 9/0861 |
| 2018/0316673 | A1 | 11/2018 | Shah et al. |
| 2020/0322356 | A1* | 10/2020 | Sheth .................... H04L 63/126 |
| 2020/0322380 | A1* | 10/2020 | Sheth ...................... H04L 63/10 |
| 2020/0336483 | A1* | 10/2020 | Murdoch .................. H04L 9/50 |
| 2021/0011984 | A1* | 1/2021 | Renke .................... G06F 21/554 |
| 2021/0314365 | A1* | 10/2021 | Smith .................... G06F 11/301 |
| 2022/0052919 | A1* | 2/2022 | Xia ........................ H04L 41/0866 |
| 2022/0116387 | A1* | 4/2022 | Pan ........................ H04L 41/0246 |
| 2022/0158856 | A1* | 5/2022 | Maximov ............. H04L 9/3271 |
| 2023/0148301 | A1* | 5/2023 | Goeringer ............... H04L 49/70 <br> 713/168 |

FOREIGN PATENT DOCUMENTS

| | | |
|---|---|---|
| CN | 102291396 A | 12/2011 |
| CN | 103501303 A | 1/2014 |
| CN | 103560887 A | 2/2014 |
| CN | 104008328 A | 8/2014 |
| CN | 109714168 A | 5/2019 |
| CN | 109862046 A | 6/2019 |
| CN | 109905476 A | 6/2019 |
| CN | 109960935 A | 7/2019 |
| EP | 3229164 A1 | 10/2017 |
| IN | 100583768 C | 1/2010 |
| JP | 2008226191 A | 9/2008 |
| JP | 2012501120 A | 1/2012 |
| KR | 102043978 B1 * | 11/2019 ......... H04L 49/3063 |
| WO | 2019120318 A2 | 6/2019 |

OTHER PUBLICATIONS

Birkholz, H. et al., "Architecture and Reference Terminology for Remote Attestation Procedures", draft-birkholz-rats-architecture-01, Network Working Group Internet-Draft, Mar. 12, 2019, 36 pages.

Tan, L. et al., "Attestation Project of the Running Environment of the Trusted Terminal", Ruan Jian Xue Bao/Journal of Software, vol. 25, No. 6, Jun. 2014, (in Chinese). http://www.jos.org.cn/1000-9825/4414.htm, with English Abstract, pp. 1273-1290.

Birkholz, H. et al., Reference Interaction Model for Challenge-Response-based Remote Attestation, draft-birkholz-rats-reference-interaction-model-00, TBD Internet-Draft, Mar. 12, 2019, 9 pages.

Pritikin, M. et al., "Bootstrapping Remote Secure Key Infrastructures (BRSKI)", t-ietf-anima-bootstrapping-keyinfra-19, ANIMA WG Internet-Draft, Mar. 7, 2019, 115 pages.

Watsen, K. et al., "Voucher Profile for Bootstrapping Protocols", draft-ietf-anima-voucher-04, ANIMA Working Group Internet-Draft, Jul. 3, 2017, 22 pages.

Watsen, K. et al., "Secure Zero Touch Provisioning (SZTP)", draft-ietf-netconf-zerotouch-29, NETCONF Working Group Internet-Draft, Jan. 15, 2019, 111 pages.

Fielding, R. et al., "Hypertext Transfer Protocol—HTTP/1.1", Request for Comments: 2616, Network Working Group, Jun. 1999, 114 pages.

Watsen, K. et al., "A Voucher Artifact for Bootstrapping Protocols", Request for Comments: 8366, Internet Engineering Task Force (IETF), May 2018, 23 pages.

\* cited by examiner

REMOTE ATTESTATION METHOD AND APPARATUS

CROSS-REFERENCE TO RELATED APPLICATIONS

This application is a continuation of International Application No. PCT/CN2020/101643, filed on Jul. 13, 2020, which claims priority to Chinese Patent Application No. 201910631547.4, filed on Jul. 12, 2019. The disclosures of the aforementioned applications are hereby incorporated by reference in their entireties.

TECHNICAL FIELD

This application relates to the field of communications technologies, and in particular, to a remote attestation method and an apparatus, used to perform remote attestation on system trustworthiness of a network device.

BACKGROUND

For a network device with a trusted platform module (TPM), the TPM may perform trustworthiness measurement on a system status, such as a system startup process, a process running status, and a configuration file of the network device, to obtain measurement information of system trustworthiness. In a remote attestation scenario, the network device may send the measurement information of the system trustworthiness to a server, and the server obtains a verification result of the system trustworthiness based on the measurement information. A user may view the verification result by accessing the server.

As remote attestation of system trustworthiness is applied to more extensive scenarios, there may be a large quantity of servers, in a network, used to perform remote attestation on system trustworthiness of a network device, and it is inevitable that some servers are untrusted. If the network device sends measurement information of the system trustworthiness of the network device to a server that is not trusted by the network device, a large security risk may occur on the network device.

SUMMARY

Based on this, embodiments of this application provide a remote attestation method and an apparatus, to prevent a server from obtaining measurement information of system trustworthiness of a network device when a system of the server is untrusted, thereby reducing a security risk of the network device.

According to a first aspect, an embodiment of this application provides a remote attestation method. The method may specifically include: A first network device receives encrypted information and first measurement information of a second network device through the second network device, where the encrypted information is information obtained by encrypting second measurement information of a third network device; the first network device determines, based on the first measurement information, that the second network device is system-trusted; and the first network device decrypts the encrypted information to obtain the second measurement information. It can be learned that, in the remote attestation method provided in this embodiment of this application, the first network device first verifies system trustworthiness of the second network device, and only when determining that the second network device is system-trusted, the first network device decrypts the encrypted information to obtain the second measurement information of the third network device. Then, the second network device can verify system trustworthiness of the third network device based on the second measurement information. In this way, the remote attestation method ensures trustworthiness and security of a remote attestation environment of the third network device, improves reliability of remote attestation, and reduces a probability that a security risk occurs on the network device.

It may be understood that, in a case, the first network device may be a device: Manufacturer Authorized Signing Authority (MASA) having a MASA service, and the second network device is a verification server: verifier, a relay device: relying party (RP), or an RP & verifier (that is, a device that combines an RP and a verifier into one). In another case, the first network device may be a MASA & verifier (that is, a device that combines a MASA and a verifier into one), the second network device may be an RP, and the third network device may be an attester.

With reference to a specific implementation of the first aspect, this embodiment may further include: The first network device sends the second measurement information to the second network device. The first network device is a MASA, and the second network device is a verifier. In this way, the second network device may verify system trustworthiness of the third network device based on the second measurement information.

In an example of this implementation, that a first network device receives encrypted information and first measurement information of a second network device through the second network device is specifically: The first network device receives a network configuration NETCONF protocol request message sent by the second network device, where the request message carries the encrypted information and the first measurement information. That the first network device sends the second measurement information to the second network device is specifically: The first network device sends a NETCONF protocol response message to the second network device, where the response message carries the second measurement information. It may be understood that, the encrypted information and the first measurement information in the request message are described by using an Internet Engineering Task Force Yet Another Next Generation data model IETF YANG data model format, and the first measurement information in the response message is described by using the IETF YANG data model format.

With reference to another specific implementation of the first aspect, this embodiment may further include: The first network device verifies system trustworthiness of the third network device based on the second measurement information, to obtain a first verification result; and the first network device sends the first verification result to the second network device. The first network device is a MASA & verifier, and the second network device is an RP. In this way, the first network device may verify the system trustworthiness of the third network device based on the second measurement information, and send the verification result to the second network device, so that a user can view the system trustworthiness of the third network device by using the second network device.

In an example of this implementation, that a first network device receives encrypted information and first measurement information of a second network device through the second network device is specifically: The first network device receives a network configuration NETCONF protocol request message sent by the second network device, where the request message carries the encrypted information and the first measurement information. That the first network device sends the first verification result to the second network device is specifically: The first network device sends a NETCONF protocol response message to the second network device, where the response message carries the first verification result. It may be understood that, the encrypted information and the first measurement information in the request message are described by using an Internet Engineering Task Force Yet Another Next Generation data model IETF YANG data model format, and the first verification result in the response message is described by using the IETF YANG data model format.

With reference to still another specific implementation of the first aspect, that a first network device receives encrypted information through the second network device is specifically: The first network device receives, through the second network device, the encrypted information sent by a fourth network device. The method further includes: The first network device receives third measurement information of the fourth network device through the second network device. Before the first network device decrypts the encrypted information, the method further includes: The first network device determines, based on the third measurement information, that the fourth network device is system-trusted. The first network device is a MASA, the second network device is a verifier, the third network device is an attester, and the fourth network device is an RP.

With reference to still another specific implementation of the first aspect, this embodiment may further include: The first network device receives identity information sent by the second network device. In this case, before the first network device decrypts the encrypted information, the method further includes: The first network device determines, based on the identity information, that an identity of the second network device is valid. In a case, the first network device may be a MASA, and the second network device is a verifier, an RP, or an RP & verifier. In another case, the first network device may be a MASA & verifier, the second network device may be an RP, and the third network device may be an attester. In this way, before decrypting the encrypted information, the first network device ensures identity validity and system trustworthiness of the second network device that performs system trustworthiness verification on the third network device. This improves remote attestation security.

In an example, the first verification result may be used to determine whether the third network device is allowed to access a network. Specifically, when the first verification result indicates that the third network device is system-trusted, it is determined that the third network device is allowed to access the network. Otherwise, when the first verification result indicates that the third network device is system-untrusted, it is determined that the third network device is not allowed to access the network.

According to a second aspect, an embodiment of this application further provides a remote attestation method. The method may specifically include: A first network device receives encrypted information sent by a second network device, where the encrypted information is information obtained by encrypting first measurement information of the second network device; the first network device sends the encrypted information and second measurement information of the first network device to a third network device; the first network device receives indication information sent by the third network device; and the first network device determines system trustworthiness of the second network device based on the indication information. It can be learned that, in the remote attestation method provided in this embodiment of this application, the third network device first verifies system trustworthiness of the first network device, and only when determining that the first network device is system-trusted, the third network device decrypts the encrypted information to obtain the first measurement information of the second network device. Then, the first network device can verify system trustworthiness of the second network device based on the first measurement information. In this way, the remote attestation method ensures trustworthiness and security of a remote attestation environment of the second network device, improves reliability of remote attestation, and reduces a probability that a security risk occurs on the network device.

It may be understood that the first network device may be an RP, a verifier, or an RP & verifier. In this case, the second network device may be an attester, and the third network device may be a verifier, a MASA, or a MASA & verifier.

With reference to a specific implementation of the second aspect, when the first network device is an RP, the indication information may be a verification result of the system trustworthiness of the second network device.

With reference to another specific implementation of the second aspect, when the first network device is a verifier, the indication information may be the first measurement information. In this case, that the first network device determines system trustworthiness of the second network device based on the indication information is specifically: The first network device verifies the system trustworthiness of the second network device based on the first measurement information.

That the first network device sends the encrypted information and second measurement information of the first network device to a third network device is specifically: The first network device sends a network configuration NETCONF protocol request message to the third network device, where the request message carries the encrypted information and the second measurement information. That the first network device receives an indication information sent by the third network device is specifically: The first network device receives a NETCONF protocol response message sent by the third network device, where the response message carries the indication information. In an example, the encrypted information and the second measurement information in the request message are described by using an Internet Engineering Task Force Yet Another Next Generation data model IETF YANG data model format. The indication information in the response message is described by using the IETF YANG data model format.

With reference to still another specific implementation of the second aspect, that a first network device receives encrypted information sent by a second network device is specifically: The first network device receives, through a fourth network device, the encrypted information sent by the second network device. In this case, the method further includes: The first network device receives third measurement information of the fourth network device sent by the fourth network device; and the first network device sends the third measurement information to the third network device. The first network device may be a verifier, the second network device may be an attester, the third network device may be a MASA, and the fourth network device may be an RP.

With reference to still another specific implementation of the second aspect, this embodiment further includes: The first network device receives first identity information sent by the second network device. In this case, before the first network device sends the encrypted information and the second measurement information of the first network device to the third network device, the method further includes: The first network device determines, based on the first identity information, that an identity of the second network device is valid. The first network device may be an RP, a verifier, or an RP & verifier. In this case, the second network device may be an attester, and the third network device may be a verifier, a MASA, or a MASA & verifier.

With reference to still another specific implementation of the second aspect, this embodiment further includes: The first network device receives second identity information sent by the fourth network device. In this case, before the first network device sends the encrypted information and the second measurement information of the first network device to the third network device, the method further includes: The first network device determines, based on the second identity information, that an identity of the fourth network device is valid. The first network device may be a verifier, the second network device may be an attester, the third network device may be a MASA, and the fourth network device may be an RP.

With reference to still another specific implementation of the second aspect, this embodiment further includes: The first network device sends third identity information of the first network device to the third network device. The third identity information is used to verify identity validity of the first network device.

It may be understood that, in this embodiment, the first network device may further determine, based on the system trustworthiness of the second network device, whether to allow the second network device to access a network.

It should be noted that the method provided in the second aspect and the method provided in the first aspect are a same remote attestation method introduced based on two network devices, and are corresponding to each other. Therefore, for various possible implementations and technical effects of the method provided in the second aspect, refer to the description of the method provided in the first aspect.

According to a third aspect, an embodiment of this application further provides a remote attestation method. The method may specifically include: A first network device generates encrypted information, where the encrypted information is information obtained by encrypting measurement information of the first network device; and the first network device sends the encrypted information to a second network device. The measurement information is used to verify system trustworthiness of the first network device, to obtain a verification result. It can be learned that, in the remote attestation method provided in this embodiment of this application, after the first network device encrypts the measurement information of the first network device, the first network device sends the encrypted information to the second network device. In this way, in the remote attestation method, when it is determined that a remote attestation environment of the first network device is reliable and secure, the second network device can obtain the decrypted measurement information of the first network device, so as to perform system trustworthiness verification on the first network device. This improves reliability of remote attestation, and reduces a probability that a security risk occurs on the network device.

It may be understood that the first network device may be an attester, and the second network device may be a verifier, an RP, or an RP & verifier.

With reference to a specific implementation of the third aspect, this embodiment may further include: The first network device sends identity information of the first network device to the second network device. The identity information is used to verify identity validity of the first network device. The first network device may be an attester, and the second network device may be a verifier, an RP, or an RP & verifier.

With reference to another specific implementation of the third aspect, the verification result may be used to determine whether the first network device is allowed to access a network.

It should be noted that the method provided in the third aspect and the method provided in the first aspect are a same remote attestation method introduced based on two network devices, and are corresponding to each other. Therefore, for various possible implementations and technical effects of the method provided in the third aspect, refer to the description of the method provided in the first aspect.

According to a fourth aspect, an embodiment of this application further provides another remote attestation method. The method may specifically include: A first network device queries system trustworthiness of a third network device from a second network device; the first network device determines that the third network device is system-trusted; and the first network device sends measurement information of the first network device to the third network device. The measurement information is used to verify system trustworthiness of the first network device, to obtain a verification result. It can be learned that, in the remote attestation method provided in this embodiment of this application, the verification result of the system trustworthiness of the third network device is prestored in the second network device, and before the first network device sends the measurement information of the first network device to the third network device, the first network device first queries the verification result of the system trustworthiness of the third network device from the second network. The first network device sends the measurement information of the first network device to the third network device only when it is determined that the third network device is system-trusted. The third network device verifies the system trustworthiness of the first network device based on the measurement information. This ensures trustworthiness and security of a remote attestation environment of the first network device, improves reliability of remote attestation of the network device, and reduces a probability that a security risk occurs on a network.

It may be understood that the first network device may be an attester, and the second network device may be a MASA. In this case, the third network device may be a verifier, an RP & verifier, or an RP.

With reference to a specific implementation of the fourth aspect, before the first network device sends the measurement information of the first network device to the third network device, this embodiment further includes: The first network device queries system trustworthiness of a fourth network device from the second network device; and the first network device determines that the fourth network device is system-trusted. The third network device is configured to send the received measurement information to the fourth network device, and the fourth network device is configured to verify system trustworthiness of the first network device based on the measurement information. In this way, only when determining that both the third network device and the fourth network device that receive the measurement information of the first network device are system-trusted, the first network device sends the measurement information of the first network device to the fourth network device through the third network device. This ensures trustworthiness and security of a system trustworthiness verification environment for the first network device, and improves security of remote attestation. The first network device may be an attester, the second network device is a MASA, the third network device is an RP, and the fourth network device is a verifier.

With reference to a specific implementation of the fourth aspect, before the first network device sends the measurement information of the first network device to the third network device, the embodiment further includes: The first network device queries identity validity of the third network device and identity validity of the fourth network device from the second network device; and the first network device determines that an identity of the fourth network device is valid. In this way, only when determining that both the third network device and the fourth network device that receive the measurement information of the first network device are system-trusted and valid in terms of identity, the first network device sends the measurement information of the first network device to the fourth network device through the third network device. This ensures trustworthiness and identity validity of a system trustworthiness verification environment for the first network device, and improves security of remote attestation. The first network device may be an attester, the second network device is a MASA, the third network device is an RP, and the fourth network device is a verifier.

It may be understood that the verification result of the system trustworthiness of the first network device is used to determine whether the first network device is allowed to access a network.

According to a fifth aspect, an embodiment of this application further provides a remote attestation method. The method may specifically include: A first network device sends first measurement information of the first network device to a second network device, where the first measurement information is used to verify system trustworthiness of the first network device, and a first verification result of the system trustworthiness of the first network device is recorded in the second network device; and the first network device receives second measurement information of a third network device sent by the third network device, where the second measurement information is used to verify system trustworthiness of the third network device. It may be understood that the first network device may be an RP, a verifier, or an RP & verifier. In this case, the second network device may be a MASA, and the third network device may be an attester.

With reference to a specific implementation of the fifth aspect, this embodiment may further include: The first network device sends the second measurement information to a fourth network device. The first network device may be an RP, the fourth network device may be a verifier, the second network device may be a MASA, and the third network device may be an attester.

In this embodiment, the fourth network device and the second network device are a same device. That is, the fourth network device and the second network device are a MASA & verifier.

With reference to another specific implementation of the fifth aspect, the embodiment further includes: The first network device receives a second verification result sent by the fourth network device, where the second verification result is a verification result of system trustworthiness of the second network device.

With reference to still another specific implementation of the fifth aspect, the embodiment further includes: The first network device verifies system trustworthiness of the third network device based on the second measurement information. The first network device is a verifier.

With reference to still another specific implementation of the fifth aspect, the embodiment further includes: The first network device receives first identity information sent by the third network device; and the first network device verifies identity validity of the third network device based on the first identity information.

With reference to another specific implementation of the fifth aspect, the embodiment further includes: The first network device sends second identity information of the first network device to the second network device. The second identity information is used to verify identity validity of the first network device, and a second verification result of the identity validity of the first network device is recorded in the second network device.

With reference to still another specific implementation of the fifth aspect, the embodiment further includes: The first network device determines, based on a verification result of the system trustworthiness of the third network device, whether to allow the third network device to access a network.

It should be noted that the method provided in the fifth aspect and the method provided in the fourth aspect are a same remote attestation method introduced based on two network devices, and are corresponding to each other. Therefore, for various possible implementations and technical effects of the method provided in the fifth aspect, refer to the description of the method provided in the fourth aspect.

According to a sixth aspect, an embodiment of this application further provides a remote attestation method. The method may specifically include: A first network device receives first measurement information of a second network device sent by the second network device; the first network device verifies system trustworthiness of the second network device based on the first measurement information, to obtain a first verification result; the first network device receives a query request of a third network device for the verification result of the system trustworthiness of the second network device; and the first network device sends the first verification result to the third network device.

It may be understood that, in a case, the first network device may be a MASA. In this case, the second network device may be a verifier, an RP, or an RP & verifier, and the third network device may be an attester. In another case, the first network device may be a MASA & verifier. In this case, the second network device may be an RP, and the third network device may be an attester.

With reference to a specific implementation of the sixth aspect, the embodiment further includes: The first network device receives second measurement information of a fourth network device sent by the fourth network device; the first network device verifies system trustworthiness of the fourth network device based on the second measurement information, to obtain a second verification result; the first network device receives a query request of the third network device for the verification result of the system trustworthiness of the fourth network device; and the first network device sends the second verification result to the third network device. The second network device is configured to receive third measurement information of the third network device sent by the third network device, and send the third measurement information to the fourth network device. The fourth network device is configured to verify system trustworthiness of the third network device based on the third measurement information, to obtain a fifth verification result. The first network device may be a MASA, the second network device may be an RP, the fourth network device may be a verifier, and the third network device may be an attester.

It may be understood that the fifth verification result is used to determine whether the third network device is allowed to access a network.

With reference to another specific implementation of the sixth aspect, the embodiment further includes: The first network device receives first identity information of the second network device sent by the second network device and second identity information of the fourth network device sent by the fourth network device; the first network device verifies system trustworthiness of the second network device based on the first identity information to obtain a third verification result, and verifies system trustworthiness of the fourth network device based on the second identity information to obtain a fourth verification result; the first network device receives a query request of the third network device for the verification result of the identity validity of the second network device and a query request of the third network device for the verification result of the identity validity of the fourth network device; and the first network device sends the third verification result and the fourth verification result to the third network device.

With reference to still another specific implementation of the sixth aspect, the embodiment further includes: The first network device receives third measurement information of the third network device that is sent by the third network device through the second network device; the first network device verifies system trustworthiness of the third network device based on the third measurement information; and the first network device sends a fifth verification result to the third network device. The fifth verification result is a verification result of the system trustworthiness of the third network device. The first network device may be a MASA & verifier, the second network device is an RP, and the third network device is an attester.

It should be noted that the method provided in the sixth aspect and the method provided in the fourth aspect are a same remote attestation method introduced based on two network devices, and are corresponding to each other. Therefore, for various possible implementations and technical effects of the method provided in the sixth aspect, refer to the description of the method provided in the fourth aspect.

According to a seventh aspect, an embodiment of this application further provides a remote attestation apparatus. The apparatus includes a receiving unit and a processing unit.

The receiving unit is configured to receive encrypted information and first measurement information of a second network device through the second network device. The encrypted information is information obtained by encrypting second measurement information of a third network device.

The processing unit is configured to determine, based on the first measurement information, that the second network device is system-trusted, and decrypt the encrypted information to obtain the second measurement information.

With reference to a specific implementation of the seventh aspect, the apparatus further includes a sending unit. The sending unit is configured to send the second measurement information to the second network device.

In an example, the receiving unit is specifically configured to receive a network configuration NETCONF protocol request message sent by the second network device, where the request message carries the encrypted information and the first measurement information. The sending unit is specifically configured to send a NETCONF protocol response message to the second network device, where the response message carries the second measurement information. The encrypted information and the first measurement information in the request message are described by using an Internet Engineering Task Force Yet Another Next Generation data model IETF YANG data model format. The first measurement information in the response message is described by using the IETF YANG data model format.

With reference to another specific implementation of the seventh aspect, the processing unit is further configured to verify system trustworthiness of the third network device based on the second measurement information, to obtain a first verification result. The sending unit is further configured to send the first verification result to the second network device.

It may be understood that the first verification result is used to determine whether the third network device is allowed to access a network.

In an example, the receiving unit is specifically configured to receive a network configuration NETCONF protocol request message sent by the second network device, where the request message carries the encrypted information and the first measurement information. The sending unit is specifically configured to be used by a first network device to send a NETCONF protocol response message to the second network device, where the response message carries the first verification result. The encrypted information and the first measurement information in the request message are described by using an Internet Engineering Task Force Yet Another Next Generation data model IETF YANG data model format. The first verification result in the response message is described by using the IETF YANG data model format.

With reference to still another specific implementation of the seventh aspect, the receiving unit is specifically configured to receive, through the second network device, the encrypted information sent by a fourth network device. In this case, the receiving unit is further configured to receive third measurement information of the fourth network device through the second network device. The processing unit is further configured to: before the first network device decrypts the encrypted information, determine system trustworthiness of the fourth network device based on the third measurement information.

With reference to another specific implementation of the seventh aspect, the receiving unit is further configured to receive identity information sent by the second network device. The processing unit is further configured to: before the first network device decrypts the encrypted information, determine, based on the identity information, that an identity of the second network device is valid.

It should be noted that the apparatus provided in the seventh aspect is corresponding to the method provided in the first aspect. Therefore, for various possible implementations and technical effects of the apparatus provided in the seventh aspect, refer to the description of the method provided in the first aspect.

According to an eighth aspect, an embodiment of this application further provides a remote attestation apparatus. The apparatus includes a receiving unit, a sending unit, and a processing unit.

The receiving unit is configured to receive encrypted information sent by a second network device, where the encrypted information is information obtained by encrypting first measurement information of the second network device.

The sending unit is configured to send the encrypted information and second measurement information of the first network device to a third network device.

The receiving unit is further configured to receive indication information sent by the third network device.

The processing unit is configured to determine system trustworthiness of the second network device based on the indication information.

In a case, the indication information is a verification result of the system trustworthiness of the second network device.

In another case, the indication information is the first measurement information. In this case, the processing unit is specifically configured to verify the system trustworthiness of the second network device based on the first measurement information.

In an example, the sending unit is specifically configured to send a network configuration NETCONF protocol request message to the third network device, where the request message carries the encrypted information and the second measurement information. The receiving unit is specifically configured to receive a NETCONF protocol response message sent by the third network device, where the response message carries the indication information. The encrypted information and the second measurement information in the request message are described by using an Internet Engineering Task Force Yet Another Next Generation data model IETF YANG data model format. The indication information in the response message is described by using the IETF YANG data model format.

With reference to a specific implementation of the eighth aspect, the receiving unit is specifically configured to receive, through a fourth network device, the encrypted information sent by the second network device. The receiving unit is further configured to receive third measurement information of the fourth network device sent by the fourth network device. The sending unit is further configured to send the third measurement information to the third network device.

With reference to another specific implementation of the eighth aspect, the receiving unit is further configured to receive first identity information sent by the second network device. The processing unit is further configured to: before the first network device sends the encrypted information and the second measurement information of the first network device to the third network device, determine, based on the first identity information, that an identity of the second network device is valid.

With reference to still another specific implementation of the eighth aspect, the receiving unit is further configured to receive second identity information sent by the fourth network device. The processing unit is further configured to: before the first network device sends the encrypted information and the second measurement information of the first network device to the third network device, determine, based on the second identity information, that an identity of the fourth network device is valid.

With reference to still another specific implementation of the eighth aspect, the sending unit is further configured to send third identity information of the first network device to the third network device.

With reference to still another specific implementation of the eighth aspect, the processing unit is further configured to determine, based on the system trustworthiness of the second network device, whether to allow the second network device to access a network.

It should be noted that the apparatus provided in the eighth aspect is corresponding to the method provided in the second aspect. Therefore, for various possible implementations and technical effects of the apparatus provided in the eighth aspect, refer to the description of the method provided in the second aspect.

According to a ninth aspect, an embodiment of this application further provides a remote attestation apparatus, including a processing unit and a sending unit.

The processing unit is configured to generate encrypted information. The encrypted information is information obtained by encrypting measurement information of a first network device.

The sending unit is configured to send the encrypted information to a second network device. The measurement information is used to verify system trustworthiness of the first network device, to obtain a verification result. It may be understood that the verification result is used to determine whether the first network device is allowed to access a network.

With reference to a specific implementation of the ninth aspect, the sending unit is further configured to send identity information of the first network device to the second network device. The identity information is used to verify identity validity of the first network device.

It should be noted that the apparatus provided in the ninth aspect is corresponding to the method provided in the third aspect. Therefore, for various possible implementations and technical effects of the apparatus provided in the ninth aspect, refer to the description of the method provided in the third aspect.

According to a tenth aspect, an embodiment of this application further provides a remote attestation apparatus, including a processing unit and a sending unit.

The processing unit is configured to be used by a first network device to query system trustworthiness of a third network device from a second network device, and determine that the third network device is system-trusted.

The sending unit is configured to send measurement information of the first network device to the third network device. The measurement information is used to verify system trustworthiness of the first network device, to obtain a verification result.

It may be understood that the verification result is used to determine whether the first network device is allowed to access a network.

With reference to a specific implementation of the tenth aspect, the processing unit is further configured to: before the first network device sends the measurement information of the first network device to the third network device, query system trustworthiness of a fourth network device from the second network device; and determine that the fourth network device is system-trusted. The third network device is configured to send the received measurement information to the fourth network device, and the fourth network device is configured to verify the system trustworthiness of the first network device based on the measurement information.

With reference to another specific implementation of the tenth aspect, the processing unit is further configured to: before the first network device sends the measurement information of the first network device to the third network device, query identity validity of the third network device and identity validity of the fourth network device from the second network device; and determine that an identity of the fourth network device is valid.

It should be noted that the apparatus provided in the tenth aspect is corresponding to the method provided in the fourth aspect. Therefore, for various possible implementations and technical effects of the apparatus provided in the tenth aspect, refer to the description of the method provided in the fourth aspect.

According to an eleventh aspect, an embodiment of this application further provides a remote attestation apparatus, including a sending unit and a receiving unit.

The sending unit is configured to send first measurement information of a first network device to a second network device. The first measurement information is used to verify system trustworthiness of the first network device, and a first verification result of the system trustworthiness of the first network device is recorded in the second network device.

The receiving unit is configured to receive second measurement information of a third network device sent by the third network device. The second measurement information is used to verify system trustworthiness of the third network device.

With reference to a specific implementation of the eleventh aspect, the sending unit is further configured to send the second measurement information to a fourth network device.

With reference to another specific implementation of the eleventh aspect, the fourth network device and the second network device are a same device.

With reference to still another specific implementation of the eleventh aspect, the receiving unit is further configured to receive a second verification result sent by the fourth network device. The second verification result is a verification result of system trustworthiness of the second network device.

With reference to still another specific implementation of the eleventh aspect, the apparatus further includes a processing unit. The processing unit is configured to verify system trustworthiness of the third network device based on the second measurement information.

With reference to still another specific implementation of the eleventh aspect, the receiving unit is further configured to receive first identity information sent by the third network device. The processing unit is further configured to verify identity validity of the third network device based on the first identity information.

With reference to still another specific implementation of the eleventh aspect, the sending unit is further configured to send second identity information of the first network device to the second network device. The second identity information is used to verify identity validity of the first network device, and a second verification result of the identity validity of the first network device is recorded in the second network device.

With reference to still another specific implementation of the eleventh aspect, the processing unit is further configured to determine, based on a verification result of the system trustworthiness of the third network device, whether to allow the third network device to access a network.

It should be noted that the apparatus provided in the eleventh aspect is corresponding to the method provided in the fifth aspect. Therefore, for various possible implementations and technical effects of the apparatus provided in the eleventh aspect, refer to the description of the method provided in the fifth aspect.

According to a twelfth aspect, an embodiment of this application further provides a remote attestation apparatus, including a receiving unit, a processing unit, and a sending unit.

The receiving unit is configured to receive first measurement information of a second network device sent by the second network device.

The processing unit is configured to verify system trustworthiness of the second network device based on the first measurement information, to obtain a first verification result.

The receiving unit is further configured to receive a query request of a third network device for the verification result of the system trustworthiness of the second network device.

The sending unit is configured to send the first verification result to the third network device.

With reference to a specific implementation of the twelfth aspect, the receiving unit is further configured to receive second measurement information of a fourth network device sent by the fourth network device. The processing unit is further configured to verify system trustworthiness of the fourth network device based on the second measurement information, to obtain a second verification result. The receiving unit is further configured to receive a query request of the third network device for the verification result of the system trustworthiness of the fourth network device. The sending unit is further configured to send the second verification result to the third network device. The second network device is configured to receive third measurement information of the third network device sent by the third network device, and send the third measurement information to the fourth network device. The fourth network device is configured to verify system trustworthiness of the third network device based on the third measurement information, to obtain a fifth verification result.

It may be understood that the fifth verification result is used to determine whether the third network device is allowed to access a network.

With reference to another specific implementation of the twelfth aspect, the receiving unit is further configured to receive first identity information of the second network device sent by the second network device and second identity information of the fourth network device sent by the fourth network device. The processing unit is further configured to: verify system trustworthiness of the second network device based on the first identity information to obtain a third verification result, and verify system trustworthiness of the fourth network device based on the second identity information to obtain a fourth verification result. The receiving unit is further configured to receive a query request of the third network device for the verification result of the identity validity of the second network device and a query request of the third network device for the verification result of the identity validity of the fourth network device. The sending unit is further configured to send the third verification result and the fourth verification result to the third network device.

With reference to still another specific implementation of the twelfth aspect, the receiving unit is further configured to receive third measurement information of the third network device that is sent by the third network device through the second network device. The processing unit is further configured to verify system trustworthiness of the third network device based on the third measurement information. The sending unit is further configured to send a fifth verification result to the third network device. The fifth verification result is a verification result of the system trustworthiness of the third network device.

It should be noted that the apparatus provided in the twelfth aspect is corresponding to the method provided in the sixth aspect. Therefore, for various possible implementations and technical effects of the apparatus provided in the twelfth aspect, refer to the description of the method provided in the sixth aspect.

According to a thirteenth aspect, an embodiment of this application further provides a network device. The network device includes a memory and a processor. The memory is configured to store program code. The processor is configured to run instructions in the program code, to enable the network device to perform the remote attestation method in any implementation of the first aspect to the third aspect.

According to a fourteenth aspect, an embodiment of this application further provides a network device. The network device includes a memory and a processor. The memory is configured to store program code. The processor is configured to run instructions in the program code, to enable the network device to perform the remote attestation method in any implementation of the fourth aspect to the sixth aspect.

According to a fifteenth aspect, an embodiment of this application further provides a computer program product. When the computer program product runs on a computer, the computer is enabled to perform the remote attestation method in any implementation of the first aspect to the sixth aspect.

According to a sixteenth aspect, an embodiment of this application further provides a computer-readable storage medium. The computer-readable storage medium stores instructions, and when the instructions run on a computer, the computer is enabled to perform the remote attestation method in any implementation of the first aspect to the sixth aspect.

According to a seventeenth aspect, an embodiment of this application further provides a communications system, including the network device provided in the thirteenth aspect and the network device provided in the fourteenth aspect.

BRIEF DESCRIPTION OF THE DRAWINGS

To describe technical solutions in the embodiments of this application more clearly, the following briefly describes the accompanying drawings for describing the embodiments. It is clear that the accompanying drawings in the following description show merely some embodiments of this application, and a person of ordinary skill in the art may derive other drawings from these accompanying drawings.

DETAILED DESCRIPTION OF ILLUSTRATIVE EMBODIMENTS

Figure 1:
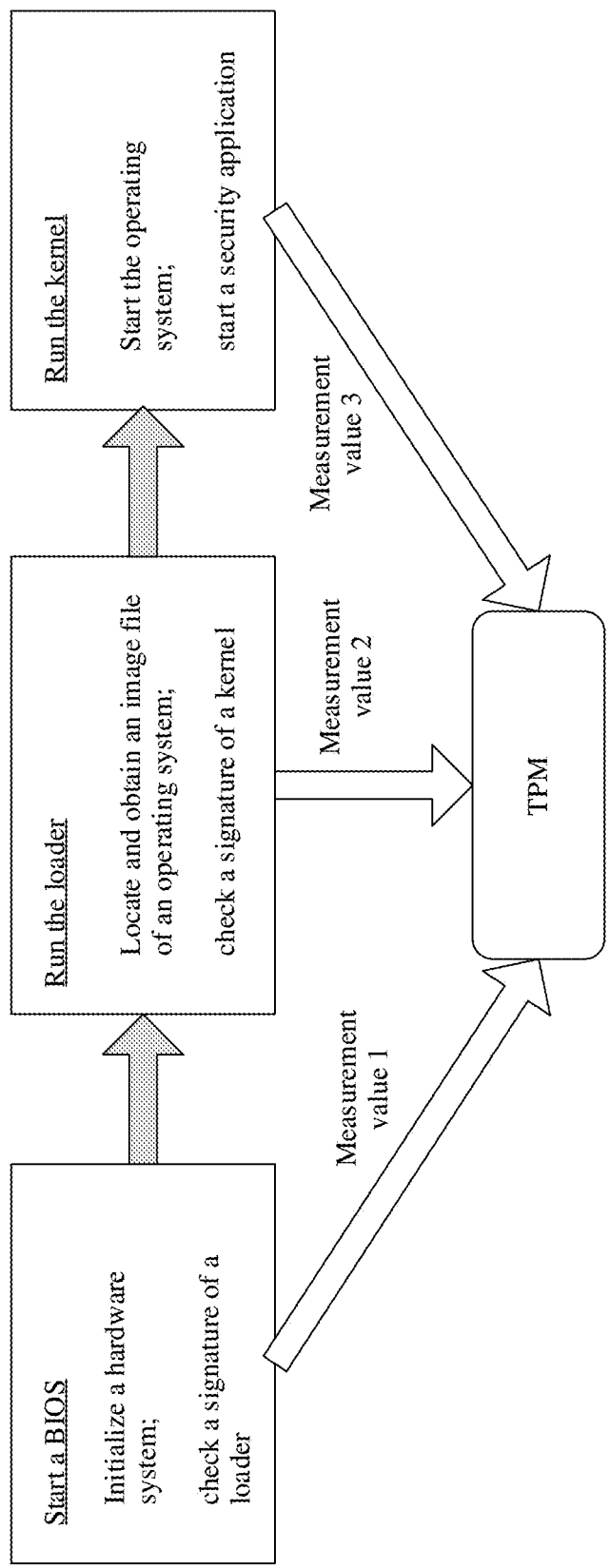
FIG. 1 is a schematic structural diagram of a trustworthiness attestation process during measurement startup according to an embodiment of this application.

With the explosive growth of information and the emergence of all things connected, a network includes more and more network devices. To improve a secure and reliable network environment, it is necessary to have high trustworthiness requirements for the network and the network devices. Therefore, strict trustworthiness verification is required for the network devices in the network.

It may be understood that a network device has a trusted platform module (TPM). The TPM has a component of trust (also referred to as a root of trust) that cannot be tampered with, is absolutely trusted, and does not require external maintenance, and the root of trust is an indispensable part of trustworthiness verification. Typically, the TPM has three roots of trust: a root of trust for measurement (RTM), a root of trust for storage (RTS), and a root of trust for reporting (RTR). The RTM is used to perform integrity measurement on a network device to which the RTM belongs, and is a computing component using a core root of trust for measurement (CRTM). The CRTM is execution code used when the TPM performs the RTM, and is generally stored in a basic input output system (BIOS). Because measurement information is generated by the RTM, the RTM can be used as an origin of trustworthiness-related measurement information transfer. The integrity measurement may be measurement performed on software in the network device at each stage during running. The RTS is a component used to store integrity measurement and measurement sequences, and may include a component that encrypts storage and an encryption key. The RTR is a component that generates a report through computation and can reliably report measurement information stored in the RTS. The reliability of the RTR component can be ensured through a signature. The three roots of trust: the RTM, the RTS, and the RTR may exist in the TPM and the BIOS of the network device, and an expert or a technical person may determine, through evaluation, whether a system status of the network device meets a trustworthiness standard. It should be noted that the TPM and the BIOS are generally considered as absolutely trusted modules.

Verification of system trustworthiness of a network device may specifically include: A TPM in the network device performs trustworthiness measurement on a system status such as a system startup process, a process running status, and a configuration file of the network device, to obtain system trustworthiness measurement information; and the measurement information is compared with a trustworthiness standard, to obtain a trustworthiness verification result of the system status, that is, the system status of the network device is trusted or untrusted. In this way, a user may determine, by viewing the verification result, whether the network device is trusted, and based on this, determine a subsequent operation on the network device, for example, maintain the untrusted network device or allow the trusted network device to access a network.

To describe a system trustworthiness verification process of a network device more clearly, the following describes system trustworthiness verification in a startup process of the network device by using a startup model shown in FIG. 1 as an example.

It may be understood that, in a startup process, a TPM performs measurement for a key startup step in the system startup process, and records a measurement value. For example, as shown in FIG. 1, a specific process in which the network device performs measurement startup may include: In the first step, a root of trust in the TPM provides a trust basis for a BIOS. In the second step, the BIOS starts, and initializes a hardware system, a signature of a loader to be run in a next phase is checked by invoking the root of trust in the TPM, the loader and configuration information are measured, and measurement values are recorded in the TPM. In the third step, the loader runs, an image file of an operating system is located and obtained, a signature of a kernel of the operating system to be run in a next phase is checked by invoking the root of trust in the TPM, the kernel is measured, and a measurement value is recorded in the TPM. In the fourth step, the kernel runs, and starts the operating system, a security application, and the like, configuration information is measured, and a measurement value is recorded in the TPM. The foregoing startup process may be referred to as a measurement startup process. A feature of the measurement startup process is: In the system startup process, only measurement and recoding of measurement values are performed, and the startup process is not interfered with, that is, startup is not stopped because a measurement value corresponding to a specific startup step is untrusted.

When the system startup is completed, in a case, the network device may perform local verification, that is, the network device generates a report based on the measurement values recorded by the TPM and performs trustworthiness verification, to obtain a verification result. In another case, remote attestation may be performed. To be specific, the network device generates a report based on the measurement values recorded by the TPM, and sends the report to a server, and the server performs trustworthiness verification based on the received report, to obtain a verification result. Alternatively, the TPM performs trustworthiness verification based on the generated report to obtain a verification result, and sends the verification result to the server.

Currently, as a quantity of to-be-verified network devices increases, because remote attestation is easier to monitor device integrity in a centralized manner compared with local attestation, remote attestation of system trustworthiness of a network device is applied to more extensive scenarios. It may be understood that remote attestation means that a network device that is to undergo trustworthiness verification sends measurement information to the server, and the server performs, based on the received measurement information, remote attestation on the network device that is to undergo trustworthiness verification. For example, the remote attestation may include: In one aspect, the server performs remote attestation on measurement information generated in a startup process of the network device; in another aspect, the server performs remote attestation on measurement information generated in a process of performing dynamic measurement on dynamically changing objects such as processes in a running process of the network device; in still another aspect, the server performs remote attestation on measurement information generated in a process of performing static measurement on static data generated in the network device, such as configuration information or a file.

Figure 2:
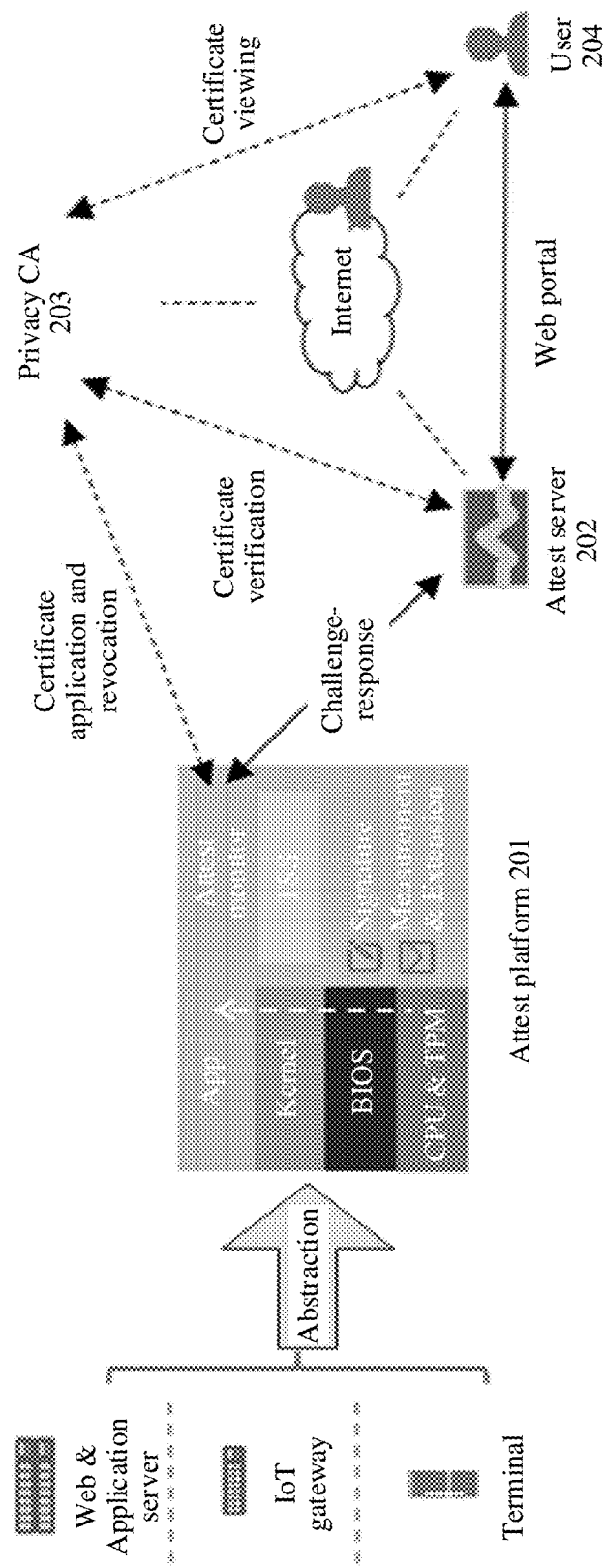
FIG. 2 is a schematic diagram of a framework of remote attestation in an application scenario according to an embodiment of this application.

Refer to the network model shown in FIG. 2. The model shows a scenario of remote attestation. The scenario includes an attest platform 201, an attest server 202, a privacy certificate authority (CA) 203, and a user 204. The attest platform 201 may be a network device on which remote attestation needs to be performed, such as a terminal, an Internet of Things (IoT) gateway, a network, or an application server. The attest platform 201 may include four parts: a central processing unit (CPU) & a TPM, a BOIS, a kernel, and an application (app), which are used to calculate and record integrity values.

During specific implementation, the attest platform 201 may securely send security attributes of the attest platform 201 (for example, software and hardware integrity values, configuration information, and a node status) to the attest server 202 in a specific format and an interaction process by using a challenge-response interaction mechanism, and the attest server 202 performs remote attestation according to a specific policy, to finally verify whether the attest platform 201 is trusted. In addition, to ensure device and communication security during the entire remote attestation interaction process, a certificate mechanism (including certificate application, certificate revocation, and the like) needs to be pre-deployed to support necessary operations such as certificate verification and viewing in the interaction process. Specifically, the attest platform 201 encrypts and signs an integrity value recorded by the attest platform 201 by using a certificate applied for from the privacy CA 203. The attest server 202 decrypts received information, and interacts with the privacy CA 203 to check whether the certificate of the attest platform 201 is valid. The user 204 may view a certificate issued externally by the privacy CA 203, and view a remote attestation result of the attest server 202 for the attest platform 201.

Figure 3:
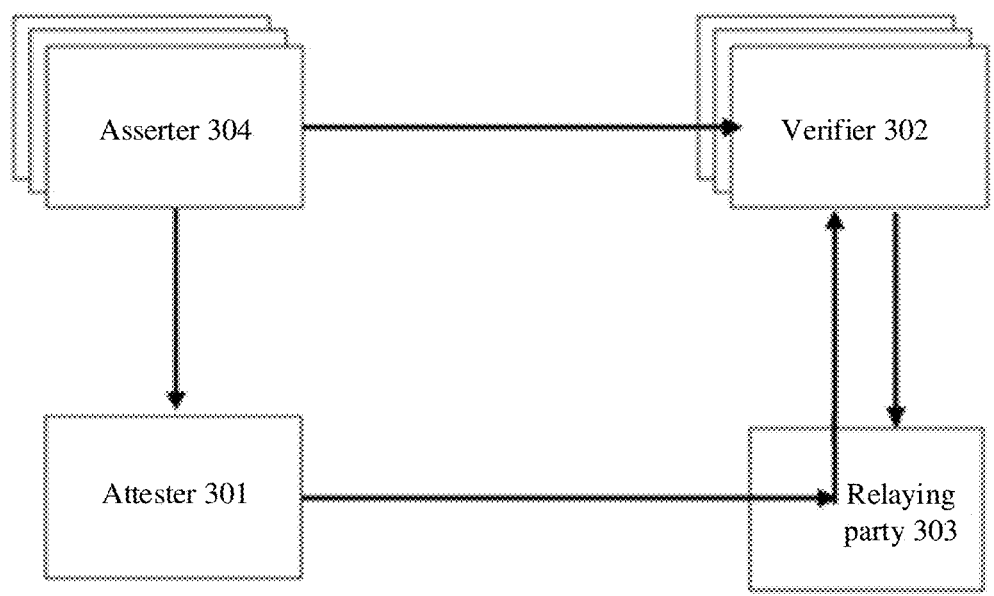
FIG. 3 is a schematic diagram of a framework of remote attestation in another application scenario according to an embodiment of this application.

A remote attestation architecture, shown in FIG. 3, defined by the Internet Engineering Task Force (IETF) Remote Attestation Procedures (RATS) working group is used as an example. In addition, according to a definition, remote attestation is performed in a challenge-response manner of the Network Configuration Protocol (NET-CONF), and information about remote attestation can be described by using a Yet Another Next Generation (YANG) data model. It should be noted that, for related descriptions in this example, refer to related descriptions of draft-birkholz-rats-architecture-oi and draft-birkholz-rats-reference-interaction-model-oo.

As shown in FIG. 3, a remote attestation system 300 shown in this scenario includes a to-be-attested device: attester 301, a verification server: verifier 302, a relay device: relying party 303, and a supply chain entity: asserter 304. The attester 301 is a to-be-verified device or application in the remote attestation system 300, and may be specifically a switch, a router, a terminal, a personal computer (PC), IoT, an application, or the like. The verifier 302 may be specifically a server with a remote attestation function. The relying party (referred to as RP below) 303 may be, for example, a network management device. In the remote attestation system 300, the RP 303 may communicate with both the attester 301 and the verifier 302 to exchange information in remote attestation. The supply chain entity: asserter 304 may be, for example, a network device of a device manufacturer. A specific process of implementing remote attestation may include the following steps. S11: The attester 301 computes and collects all kinds of integrity attestation information of the attester 301 by using a root of trust, and provides the integrity attestation information as measurement information for the RP 303. S12: The RP 303 receives the to-be-remotely-attested measurement information sent by the attester 301, and verifies an identity of the attester 301 in a signature authentication manner. S13: After the verification succeeds, the RP 303 signs the to-be-remotely-attested measurement information of the attester 301 by using a certificate of the RP 303, and sends the signed measurement information to the verifier 302. S14: The verifier 302 verifies the measurement information provided by the attester 301, and sends a verification result to the RP 303. Before S11 to S14, the asserter 304 is configured to provide configuration information such as an initial device ID for the attester 301, and the asserter 304 has a reference value or a standard value of the integrity attestation of the attester 301; and the asserter 304 is further configured to send, to the verifier 302, the reference value or standard value that is used as a basis for the verifier 302 to perform remote attestation. It should be noted that the attester 301 may be specifically corresponding to the attest platform 201 in FIG. 2, and the verifier 302 may be specifically corresponding to the attest server 202 in FIG. 2.

To ensure reliable implementation of system trustworthiness verification for a network device, it is necessary to strictly require that a server performing remote attestation be system-trusted. Currently, the network device assumes that an identity of the server (or identities of the server and a relay device) is valid and system-trusted. On this basis, the server with a remote attestation function performs remote attestation on the network device. However, as remote attestation of system trustworthiness is widely applied, a large quantity of servers (or servers and relay devices) used to remotely attest system trustworthiness of a network device may appear in a network, and among a large quantity of servers (or servers and relay devices) having a remote attestation function, there are probably some servers (or servers and relay devices) that are invalid, attacked, or untrusted. In this case, system trustworthiness of a server (or the server and a relay device) that performs remote attestation becomes critical. If the network device sends measurement information of system trustworthiness of the network device to a server (or the server and a relay device) that is untrusted, a large security risk may occur on the network device.

Based on this, to provide a more reliable remote attestation manner in a scenario in which there is an increasing quantity of servers performing remote attestation, in the embodiments of this application, it is no longer assumed that the server (or the server and the relay device) is system-trusted. Instead, system trustworthiness verification is performed on the server (or the server and the relay device). Only after it is determined that the server (or the server and the relay device) is trusted, the server can receive measurement information of a network device, and then verify system trustworthiness of the network device based on the measurement information. In this way, the large security risk occurring on the network device because the measurement information of system trustworthiness of the network device is obtained by a system-untrusted server can be prevented. System trustworthiness verification is performed on the server (or the server and the relay device) that is about to perform remote attestation, so that it is ensured that system trustworthiness verification for the network device is performed by a system-trusted server, reliability of remote attestation for the network device is improved, and the security risk of the network device is reduced.

It may be understood that, in the embodiments of this application, system trustworthiness of a server (or the server and a relay device) may be verified by a network device with the help of a device: Manufacturer Authorized Signing Authority (MASA) that has a MASA service and that is defined in the Internet Engineering Task Force (IETF) Bootstrapping Remote Secure Key Infrastructures (BRSKI) protocol. Therefore, the remote attestation method in the embodiments of this application may be performed by using an improved IETF Remote Attestation Procedures (RATS) protocol and IETF BRSKI protocol.

Figure 4:
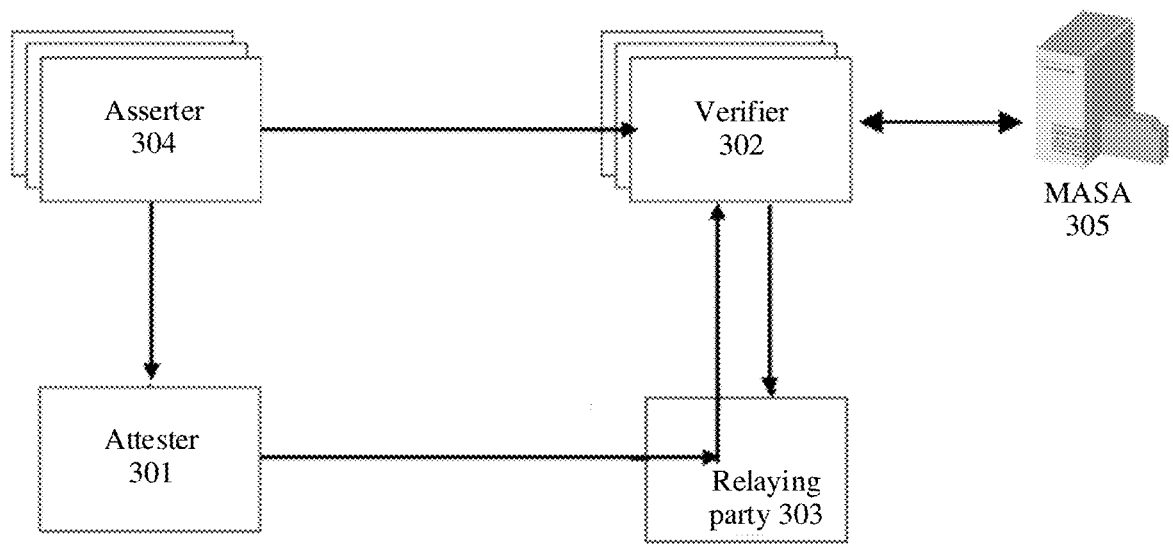
FIG. 4 is a schematic diagram of a framework of remote attestation in still another application scenario according to an embodiment of this application.

For example, in a scenario in the embodiments of this application, the remote attestation method may be applied to the remote attestation system 400 shown in FIG. 4. In addition to the attester 301, the verifier 302, the RP 303, and the asserter 304 included in the remote attestation system 300, the remote attestation system 400 may include a Manufacturer Authorized Signing Authority (MASA) 305. The MASA 305 may be a signing authority that is provided or authorized by a manufacturer and that is defined in the Internet Engineering Task Force (IETF) Bootstrapping Remote Secure Key Infrastructures (BRSKI) protocol, for example, a dedicated server device or a software service provided by a computer device. The MASA 305 may be configured to verify identity validity and system trustworthiness of the RP 303 and the verifier 302, or may store identity validity verification results and system trustworthiness verification results of the RP 303 and the verifier 302.

For example, if the MASA 305 has a capability of verifying system trustworthiness of the RP 303 and the verifier 302, a process of implementing remote attestation in this embodiment of this application may specifically include the following steps. S21: The attester 301 sends encrypted information to the RP 303, where the encrypted information is information obtained by encrypting measurement information 1 of the attester 301. S22: The RP 303 sends the encrypted information and measurement information 2 of the RP 303 to the verifier 302. S23: The verifier 302 sends the encrypted information, the measurement information 2, and measurement information 3 of the verifier 302 to the MASA 305. S24: The MASA 305 verifies system trustworthiness of the RP 303 and the verifier 302 respectively based on the measurement information 2 and the measurement information 3, to obtain a verification result 1. S25: When the verification result 1 indicates that both the RP 303 and the verifier 302 are trusted, the MASA 305 decrypts the encrypted information to obtain the measurement information 1, and sends the measurement information 1 to the verifier 302. S26: The verifier 302 verifies system trustworthiness of the attester 301 based on the measurement information 1, to obtain a verification result 2. S27: The verifier 302 sends the verification result 2 to the RP 303, so that a user checks, on the verifier 302 or the RP 303, whether the attester 301 is trusted.

It should be noted that, in addition to the information in the foregoing description, identity information may be carried in S21 to S23, so that a device that directly receives the identity information performs identity validity verification on the sender. For example, in S22, the RP 303 may further send identity information of the RP 303 to the verifier 302, and the verifier 302 verifies identity validity of the RP 303. An identity validity verification result is carried in a subsequent message for sending. In this case, when S25 is being performed, when the verification result 1 indicates that both the RP 303 and the verifier 302 are trusted, and the identity verification result indicates that identities of the attester 301, the RP 303, and the verifier 302 are all valid, the MASA 305 decrypts the encrypted information to obtain the measurement information 1, and sends the measurement information 1 to the verifier 302 to perform a subsequent verification process.

In another example, if the MASA 305 stores a verification result of system trustworthiness of the RP 303 and the verifier 302, a process of implementing remote attestation in this embodiment of this application may specifically include the following steps. S31: The attester 301 queries the system trustworthiness of the RP 303 and the verifier 302 from the MASA 305. S32: The MASA 305 feeds back, to the attester 301, the verification result 3 of the system trustworthiness of the RP 303 and the verifier 302. S33: If the verification result 3 indicates that the RP 303 and the verifier 302 are system-trusted, the attester 301 sends measurement information 1 of the attester 301 to the verifier 302 through the RP 303. S34: The verifier 302 verifies system trustworthiness of the attester 301 based on the measurement information 1, to obtain a verification result 2. S35: The verifier 302 sends the verification result 2 to the RP 303, so that the user checks, on the verifier 302 or the RP 303, whether the attester 301 is trusted.

It should be noted that, in S31, identity validity of the attester 301, the RP 303, and the verifier 302 may further be queried from the MASA 305. In this case, the verification result 3 fed back in S32 may further include a related result of the identity validity of the RP 303 and the verifier 302. When S33 is being performed, only when the verification result 3 indicates that both the RP 303 and the verifier 302 are trusted, and the identity verification result indicates that the attester 301, the RP 303, and the verifier 302 are valid, the MASA 305 decrypts the encrypted information to obtain the measurement information 1, and sends the measurement information 1 to the verifier 302 to perform a subsequent verification process.

It should be noted that in this embodiment of this application, the RP 303 and the verifier 302 do not have a capability of decrypting the encrypted information.

It should be noted that, in this scenario, the RP 303 and the verifier 302 may be deployed on a same device, or the attester 301 may directly exchange data with the verifier 302. In this case, the attester 301 only needs to be concerned about whether the verifier 302 (or the device to which the verifier 302 and the RP 301 belong) is system-trusted (or system-trusted and valid in terms of identity).

It may be understood that the foregoing scenario is merely a scenario example provided in the embodiments of this application, and the embodiments of this application are not limited to this scenario.

With reference to the accompanying drawings, the following describes in detail a specific implementation of a remote attestation method in the embodiments of this application by using embodiments.

In some specific implementations, a MASA first verifies system trustworthiness of an RP and a verifier, and only when it is determined that both the RP and the verifier are system-trusted, the MASA decrypts encrypted information obtained by encrypting measurement information 1 of an attester. The verifier verifies system trustworthiness of the attester based on the measurement information 1. This ensures reliability and security of a remote attestation environment of the attester, improves reliability of remote attestation for the attester, and reduces a security risk of the attester. For a specific implementation, refer to the following embodiments in FIG. 5 to FIG. 8.

Figure 5:
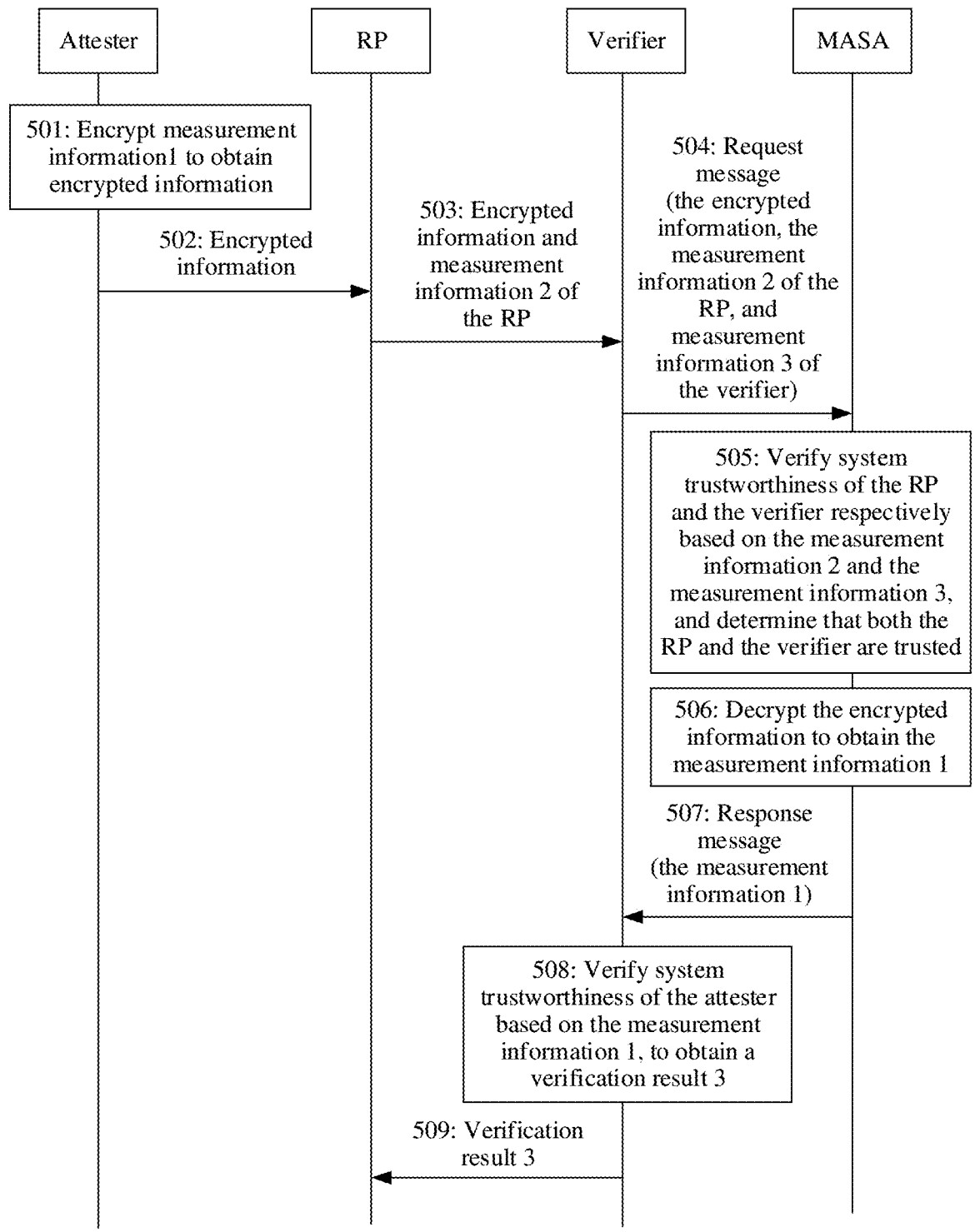
FIG. 5 is a signaling flowchart of a remote attestation method according to an embodiment of this application.

FIG. 5 is a signaling flowchart of a remote attestation method according to an embodiment of this application. As shown in FIG. 5, the method is applied to a network including an attester, an RP, a verifier, and a MASA, and it is known that identities of the attester, the RP, and the verifier are valid. The method may specifically include the following step 501 to step 509.

Step 501: The attester encrypts measurement information 1 of the attester to obtain encrypted information.

It may be understood that, it is assumed that the entire network has completed an initial network configuration process by using a mechanism such as BRSKI, and all devices can securely communicate with each other. Before remote attestation, the attester cannot determine whether the verifier performing remote attestation and the RP are trusted. To ensure security, the attester needs to encrypt the measurement information 1 of the attester and send the encrypted information to the RP and the verifier, to prevent the measurement information 1 from being obtained by an untrusted verifier or RP. After it is determined that the verifier and the RP are system-trusted, the measurement information 1 is sent to the verifier for remote attestation. The determining that the verifier and the RP are system-trusted may be implemented by using the MASA device having a MASA service function, and the MASA is provided by using extended BRSKI.

It may be understood that the measurement information 1 may be information that is generated in a running process of the attester and that is used to verify system trustworthiness of the attester. The measurement information 1 may specifically include a hardware integrity value, a software integrity value, configuration information, and the like. The hardware integrity value may be a set of measurement values generated by a hardware driver (for example, a boot driver) in the attester. The software integrity value may be a set of measurement values generated by dynamically changing objects such as a process running in the attester. The configuration information may be information generated by performing static measurement on static data generated in the attester, for example, configuration information or a file.

In specific implementation, the attester may encrypt the measurement information 1 by using a public key, to obtain the encrypted information. In a case, the public key may be an initial device identity (IDevID) of the attester of IEEE 802.1AR defined by the Institute of Electrical and Electronics Engineers (IEEE), and the MASA can decrypt the encrypted information that is encrypted by using the IDevID. In another case, the public key may be a public key that is allocated by the MASA to all to-be-verified attesters and that is used to encrypt the measurement information. In still another case, the public key may alternatively be another public key that is agreed upon and known by the attester and the MASA and that is used to encrypt the measurement information.

It should be noted that the verifier and the RP do not know a decryption private key of the encrypted information, and have no capability of decrypting the encrypted information.

Step 502: The attester sends the encrypted information to the RP.

In an example, the attester may use a remote attestation request to carry the encrypted information, and send the remote attestation request to the RP, to indicate the RP to send the remote attestation request to the verifier, and to indicate the RP to send measurement information 2 of the RP to the verifier.

In another example, before step 502, the RP may initiate a remote attestation request to the attester. In this case, the attester may use a remote attestation response message to carry the encrypted information, and send the remote attestation response message to the RP, to indicate the RP to send the remote attestation response message to the verifier, and to indicate the RP to send the measurement information 2 of the RP to the verifier.

Step 503: The RP sends the encrypted information and the measurement information 2 of the RP to the verifier.

The measurement information 2 may be generated in a running process of the RP and is used to verify system trustworthiness of the RP. The measurement information 2 may specifically include a hardware integrity value, a software integrity value, configuration information, and the like.

In specific implementation, after receiving the remote attestation request or remote attestation response message that carries the encrypted information, the RP may further use the remote attestation request or remote attestation response message to carry the measurement information 2 of the RP, and send the measurement information 2 together with the encrypted information to the verifier. The remote attestation request or the remote attestation response message that carries the measurement information 2 is used to indicate the verifier to send the encrypted information and the measurement information 2 in the message together with measurement information 3 of the verifier to the MASA.

Step 504: The verifier sends a request message to the MASA to request the MASA to verify system trustworthiness of the verifier and the RP, where the request message carries the encrypted information, the measurement information 2, and the measurement information 3 of the verifier.

The measurement information 3 may be generated in a running process of the verifier and is used to verify system trustworthiness of the verifier. The measurement information 3 may specifically include a hardware integrity value, a software integrity value, configuration information, and the like.

In specific implementation, after receiving the remote attestation request or the remote attestation response message, the verifier may parse the remote attestation request or the remote attestation response message to obtain the encrypted information and the measurement information 2, use the request message to carry the encrypted information, the measurement information 2, and the measurement information 3 of the verifier, and send the request message to the MASA.

It may be understood that, in a case, the request message may be a voucher request message defined in the network configuration NETCONF protocol, and is used to indicate the MASA to verify the system trustworthiness of the RP and the verifier based on the measurement information 2 and the measurement information 3 respectively. When a verification result indicates that both the RP and the verifier are system-trusted, the MASA decrypts the encrypted information and sends the decrypted measurement information to the verifier. In another case, the request message may be a request message newly defined in the NETCONF protocol. In still another case, the request message may be a request message in another protocol.

In an example, the encrypted information, the measurement information 2, and the measurement information 3 that are in the request message may be described by using an Internet Engineering Task Force Yet Another Next Generation data model IETF YANG data model format. For example, the request message of the YANG data model may be specifically as follows:

```
module: ietf-voucher-request
   grouping voucher-request-grouping
      +-- voucher
         +-- created-on?      yang: date-and-time
         +-- expires-on?      yang: date-and-time
         +-- assertion?       enumeration
         +-- serial-number    string
         +-- idevid-issuer?   binary
         +-- pinned-domain-cert?    binary
         +-- domain-cert-revocation-checks?    boolean
         +-- nonce?     binary
         +-- last-renewal-date?     yang: date-and-time
         +-- prior-signed-voucher-request?    binary
         +-- proximity-registrar-cert?    binary
         +-- encrypted-attester-trust-evidence//encrypted attester system
trustworthiness verification evidence
            | +-- encrypted-trust-assertion  binary//encrypted measurement
information 1 of attester
            | +-- signature     binary//signature of attester
         +-- relying-party-trust-evidence//RP system trustworthiness
verification evidence
            | +-- trust-assertion   binary//measurement information 2 of RP
            | +-- signature     binary//signature of RP
         +-- verifier-trust-evidence//verifier system trustworthiness
verification evidence
            | +-- trust-assertion   binary//measurement information 3 of verifier
            | +-- signature     binary//signature of verifier
```

In the foregoing message, enumeration indicates enumeration, string indicates that a data type is a string, binary indicates that a data type is binary, and boolean indicates that a data type is a Boolean value.

Step 505: The MASA verifies the system trustworthiness of the RP and the verifier respectively based on the measurement information 2 and the measurement information 3, to obtain a verification result 1 and a verification result 2.

It may be understood that, the MASA may determine whether an abnormal situation exists in the measurement information 2, for example, some measurement parameters in the measurement information 2 do not meet a standard or a necessary measurement parameter is missing. If the abnormal situation exists, it may be determined that the RP is system-untrusted; or if the abnormal situation does not exist, it may be determined that the RP is system-trusted. The verification result 1 is obtained based on the determined system trustworthiness. The verification result 1 is used to indicate whether a system of the RP is trusted. Similarly, the MASA may further determine whether an abnormal situation exists in the measurement information 3, for example, some measurement parameters in the measurement information 3 do not meet a standard or a necessary measurement parameter is missing. If the abnormal situation exists, it may be determined that the verifier is system-untrusted; or if the abnormal situation does not exist, it may be determined that the verifier is system-trusted. The verification result 2 is obtained based on the determined system trustworthiness. The verification result 2 is used to indicate whether a system of the verifier is trusted.

Step 506: When the verification result 1 and the verification result 2 respectively indicate that the RP and the verifier are system-trusted, the MASA decrypts the encrypted information to obtain the measurement information 1.

It may be understood that, when the verification result 1 indicates that the system of the RP is trusted, and the verification result 2 indicates that the system of the verifier is trusted, the MASA determines that performing remote attestation by the RP and the verifier for the attester is secure and trusted. That is, in this case, the RP and the verifier are eligible to perform remote attestation for the attester.

It should be noted that, when the verification result 1 indicates that the system of the RP is untrusted, or the verification result 2 indicates that the system of the verifier is untrusted, the MASA determines that performing remote attestation by the RP and the verifier for the attester is insecure and untrusted. That is, in this case, the RP and the verifier cannot perform remote attestation for the attester. In this case, the MASA may send the verification result 1 and the verification result 2 to the attester, the RP, and the verifier by using a response message corresponding to the request message, to notify the devices of the verification results of this remote attestation.

In specific implementation, the MASA may decrypt the encrypted information based on a private key corresponding to the public key used when the attester encrypts the measurement information 1, to obtain the measurement information 1.

Step 507: The MASA uses a response message to carry the measurement information 1 and sends the response message to the verifier.

It may be understood that, according to an indication of the request message, after determining that the RP and the verifier are system-trusted, the MASA uses the response message to carry the measurement information 1 and sends the response message to the verifier. The response message is a message used to respond to the request message in step 504, and is used to indicate the verifier to perform system trustworthiness verification on the measurement information 1 of the attester. In a case, if the request message is a voucher request message defined in the NETCONF protocol, the response message may be a voucher response message defined in the NETCONF protocol. In another case, if the request message is a request message newly defined in the NETCONF protocol, the response message may be a response message corresponding to the newly defined request message in the NETCONF protocol. In still another case, if the request message is a request message in another protocol, the response message may be a response message corresponding to the request message in the another protocol.

In an example, the measurement information 1 in the response message may also be described by using the Internet Engineering Task Force Yet Another Next Generation data model IETF YANG data model format. For example, the response message of the YANG data model may be specifically as follows:

```
module: ietf-voucher-response
    grouping voucher-response-grouping
       +-- voucher
          +-- created-on?         yang:date-and-time
          +-- expires-on?         yang:date-and-time
          +-- assertion?          enumeration
          +-- serial-number       string
          +-- idevid-issuer?      binary
          +-- pinned-domain-cert?    binary
          +-- domain-cert-revocation-checks?    boolean
          +-- nonce?      binary
          +-- last-renewal-date?    yang: date-and-time
          +-- prior-signed-voucher-request?    binary
          +-- proximity-registrar-cert?    binary
          +-- attester-trust-assertion    binary//decrypted measurement
information 1 of attester
```

It should be noted that the response message may further include the system trustworthiness verification results of the RP and the verifier, to notify the RP and the verifier that the systems of the RP and the verifier are trusted.

Step 508: The verifier verifies the system trustworthiness of the attester based on the measurement information 1, to obtain a verification result 3.

It may be understood that, the verifier may determine whether an abnormal situation exists in the measurement information 1, for example, some measurement parameters in the measurement information 1 do not meet a standard or a necessary measurement parameter is missing. If the abnormal situation exists, it may be determined that the attester is system-untrusted; or if the abnormal situation does not exist, it may be determined that the attester is system-trusted. The verification result 3 is obtained based on the determined system trustworthiness. The verification result 3 is used to indicate whether a system of the attester is trusted.

Step 509: The verifier sends the verification result 3 to the RP.

For example, the verifier may use a response message to carry the verification result 3, and send the response message to the RP, to indicate the RP to perform processing for the attester, for example, resource management or network access control for the attester.

It may be understood that a user may check the system trustworthiness of the attester by using the verifier or the RP. The verification result of the system trustworthiness of the attester is used to determine whether the attester is allowed to access the network. In other words, a necessary condition for the attester to access the network is that the system of the attester is trusted. Only when it is determined that the system of the attester is trusted, the attester can be allowed to access the network.

It should be noted that, after step 509, the RP may send the verification result 3 to the attester, to directly notify the attester whether the attester is system-trusted.

It can be learned that, in a scenario in which the attester, the RP, the verifier, and the MASA are included and it is known that the identities of the attester, the RP, and the verifier are valid, a large security risk of the attester caused because the measurement information of the system trustworthiness of the attester is obtained by a system-untrusted RP and verifier is avoided. The MASA first verifies the system trustworthiness of the RP and the verifier, and sends the decrypted measurement information 1 of the attester to the verifier for system trustworthiness verification only when it is determined that the RP and the verifier are system-trusted. This ensures that a remote attestation environment of the attester is trusted and secure, improves reliability of remote attestation for the attester, and reduces the security risk of the attester.

Figure 6A:
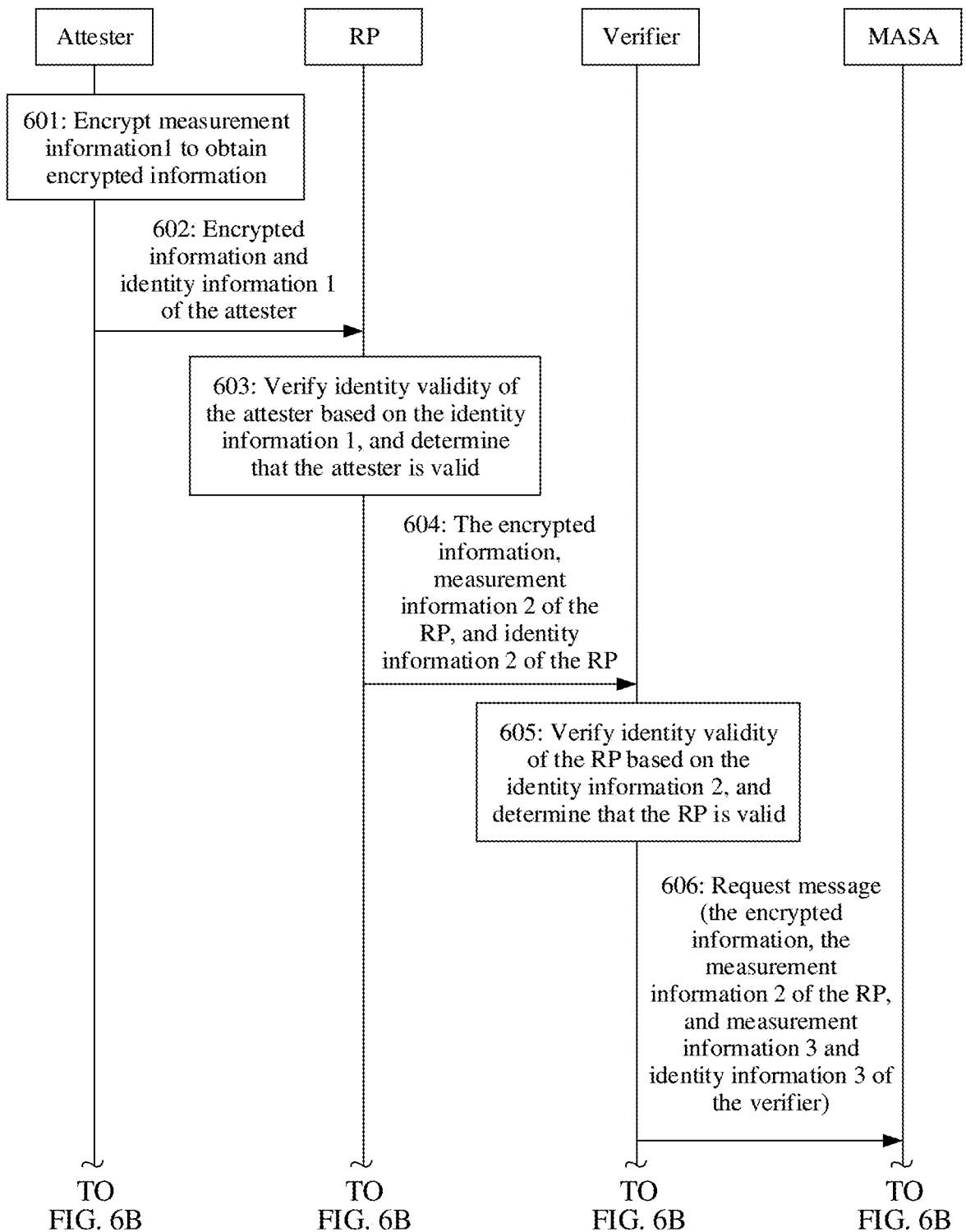
FIG. 6A and FIG. 6B are a signaling flowchart of another remote attestation method according to an embodiment of this application.
Figure 6B:
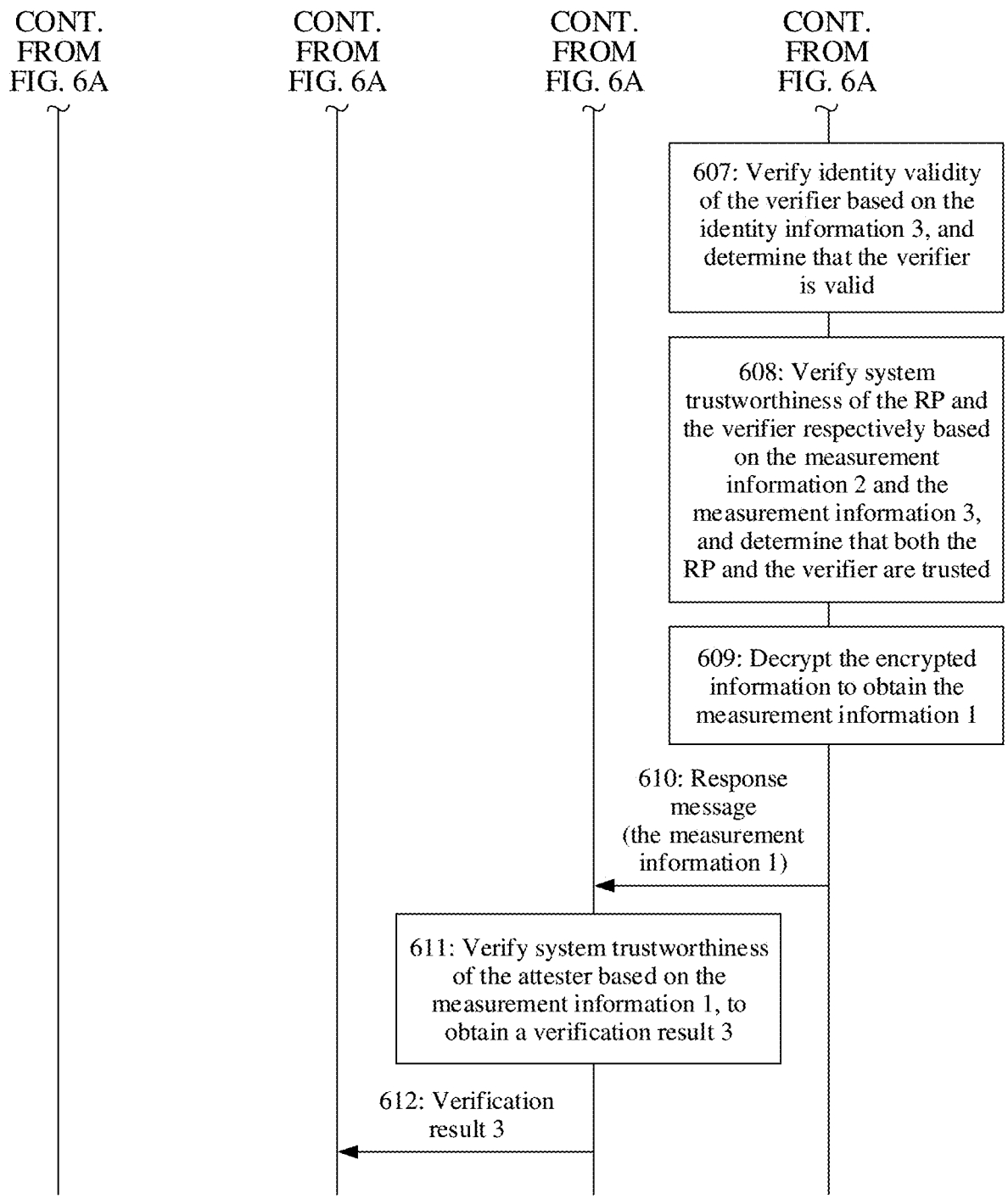

It is assumed that a network includes an attester, an RP, a verifier, and a MASA, and identity validity of the attester, the RP, and the verifier is unknown. In this case, the embodiments of this application further provide another remote attestation method. As shown in FIG. 6A and FIG. 6B, the method may specifically include the following step 601 to step 612.

Step 601: The attester encrypts measurement information 1 of the attester to obtain encrypted information.

Step 602: The attester sends the encrypted information and identity information 1 of the attester to the RP.

Step 603: The RP verifies identity validity of the attester based on the identity information 1.

Step 604: If it is determined that an identity of the attester is valid, the RP sends the encrypted information, measurement information 2 of the RP, and identity information 2 of the RP to the verifier.

Step 605: The verifier verifies identity validity of the RP based on the identity information 2.

Step 606: If it is determined that an identity of the RP is valid, the verifier sends a request message to the MASA, to request the MASA to verify system trustworthiness of the verifier and the RP. The request message carries the encrypted information, the measurement information 2, measurement information 3 of the verifier, and identity information 3 of the verifier.

Step 607: The MASA verifies identity validity of the verifier based on the identity information 3.

Step 608: If it is determined that an identity of the verifier is valid, the MASA verifies the system trustworthiness of the RP and the verifier respectively based on the measurement information 2 and the measurement information 3, to obtain a verification result 1 and a verification result 2.

Step 609: When the verification result 1 and the verification result 2 respectively indicate that the RP and the verifier are system-trusted, the MASA decrypts the encrypted information to obtain the measurement information 1.

Step 610: The MASA uses a response message to carry the measurement information 1 and sends the response message to the verifier.

Step 611: The verifier verifies system trustworthiness of the attester based on the measurement information 1, to obtain a verification result 3.

Step 612: The verifier sends the verification result 3 to the RP.

It may be understood that the identity information 1 is related information used to verify the identity validity of the attester. The identity information 2 is related information used to verify the identity validity of the RP. The identity information 3 is related information used to verify the identity validity of the verifier. The identity validity of the attester may be verified by the RP, the identity validity of the RP may be verified by the verifier, and the identity validity of the verifier may be verified by the MASA. Alternatively, the identity validity of the attester, the RP, and the verifier may all be verified by the MASA.

It should be noted that, for specific implementations and related descriptions of the encrypted information, the measurement information, the verification results, the system trustworthiness verification, and the like in the foregoing step 601 to step 612, refer to related descriptions of the embodiment shown in FIG. 5.

It can be learned that, in a scenario in which the attester, the RP, the verifier, and the MASA are included, a large security risk of the attester caused because the measurement information of the system trustworthiness of the attester is obtained by a system-untrusted or invalid RP and verifier is avoided. The identity validity of the attester, the RP, and the verifier is first verified, and the MASA verifies the system trustworthiness of the RP and the verifier, and sends the decrypted measurement information 1 of the attester to the verifier for system trustworthiness verification only when it is determined that the RP and the verifier are system-trusted. This ensures that a remote attestation environment of the attester is trusted and secure, improves reliability of remote attestation for the attester, and reduces the security risk of the attester.

Figure 7:
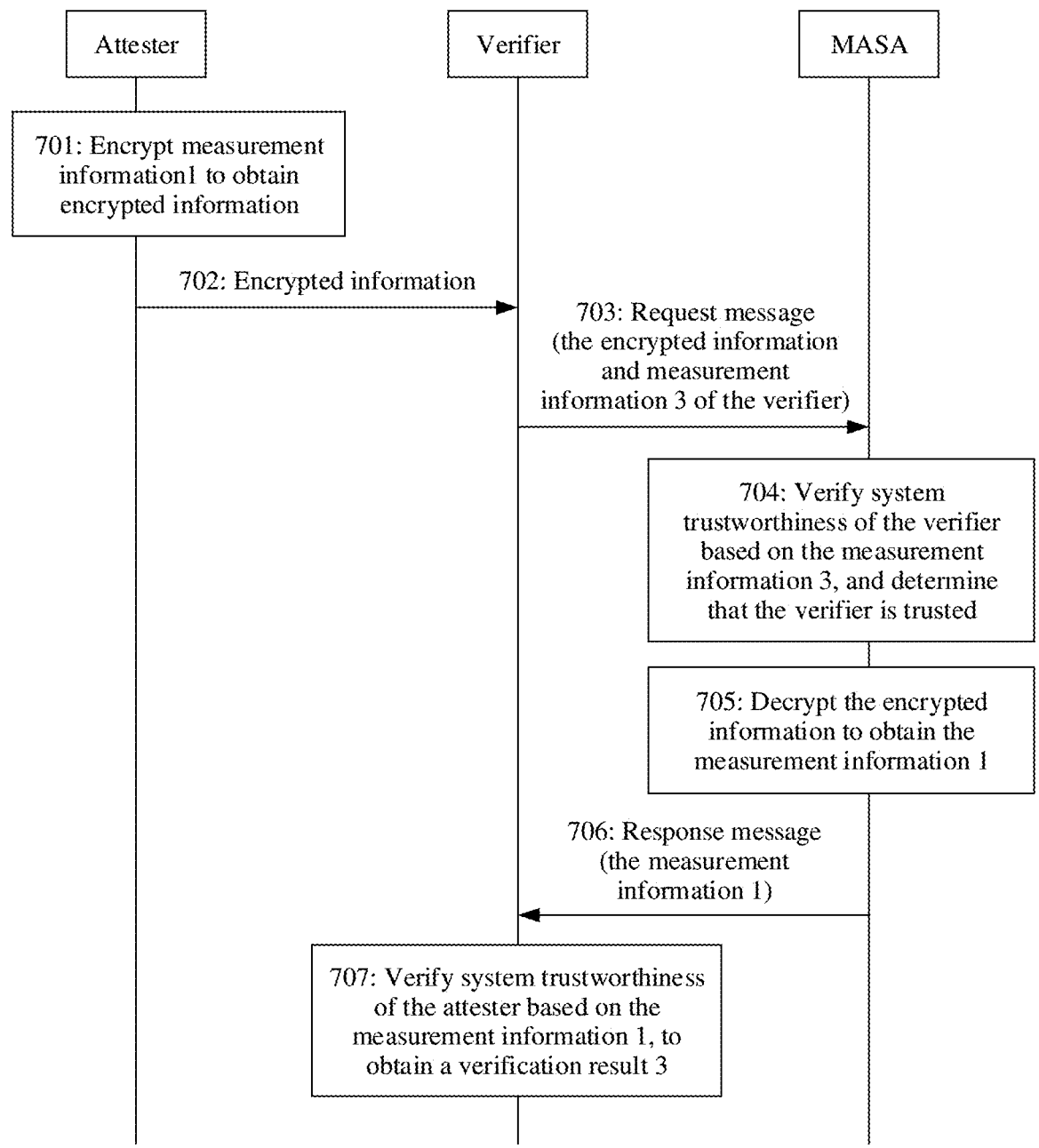
FIG. 7 is a signaling flowchart of still another remote attestation method according to an embodiment of this application.

It is assumed that in a to-be-remotely-attested network, an RP and a verifier are deployed on a same device, or an attester directly interacts with the verifier. In this case, as shown in FIG. 7, the embodiments of this application further provide another remote attestation method. Based on an actual network architecture, the verifier in FIG. 7 may be a device on which functions of the RP and the verifier in the foregoing embodiment are deployed, and may also be a verifier that directly interacts with the attester. In this method, it is assumed that identities of the verifier and the attester are valid. The method may specifically include the following step 701 to step 707.

Step 701: The attester encrypts measurement information 1 of the attester to obtain encrypted information.

Step 702: The attester sends the encrypted information to the verifier.

Step 703: The verifier uses a request message to carry the encrypted information and measurement information 3 of the verifier, and sends the request message to a MASA.

Step 704: The MASA verifies system trustworthiness of the verifier based on the measurement information 3, to obtain a verification result 2.

Step 705: When the verification result 2 indicates that the verifier is system-trusted, the MASA decrypts the encrypted information to obtain the measurement information 1.

Step 706: The MASA uses a response message to carry the measurement information 1 and sends the response message to the verifier.

Step 707: The verifier verifies system trustworthiness of the attester based on the measurement information 1, to obtain a verification result 3.

It should be noted that, for specific implementations and related descriptions of the encrypted information, the measurement information, the verification results, the system trustworthiness verification, and the like in the foregoing step 701 to step 707, refer to related descriptions of the embodiment shown in FIG. 5.

It should be noted that, in this embodiment of this application, it is assumed that the identities of the verifier and the attester are valid. When it is not determined whether the identities of the verifier and the attester are valid, for specific implementations and related descriptions, refer to related descriptions of the embodiment shown in FIG. 6A and FIG. 6B. Details are not described herein again.

It can be learned that, in a scenario in which the attester, the verifier, and the MASA are included, a large security risk of the attester caused because the measurement information of the system trustworthiness of the attester is obtained by a system-untrusted or invalid verifier is avoided. The MASA first verifies the system trustworthiness of the verifier, and sends the decrypted measurement information 1 of the attester to the verifier for system trustworthiness verification only when the verification succeeds. This ensures that a remote attestation environment of the attester is trusted and secure, improves reliability of remote attestation for the attester, and reduces the security risk of the attester.

Figure 8:
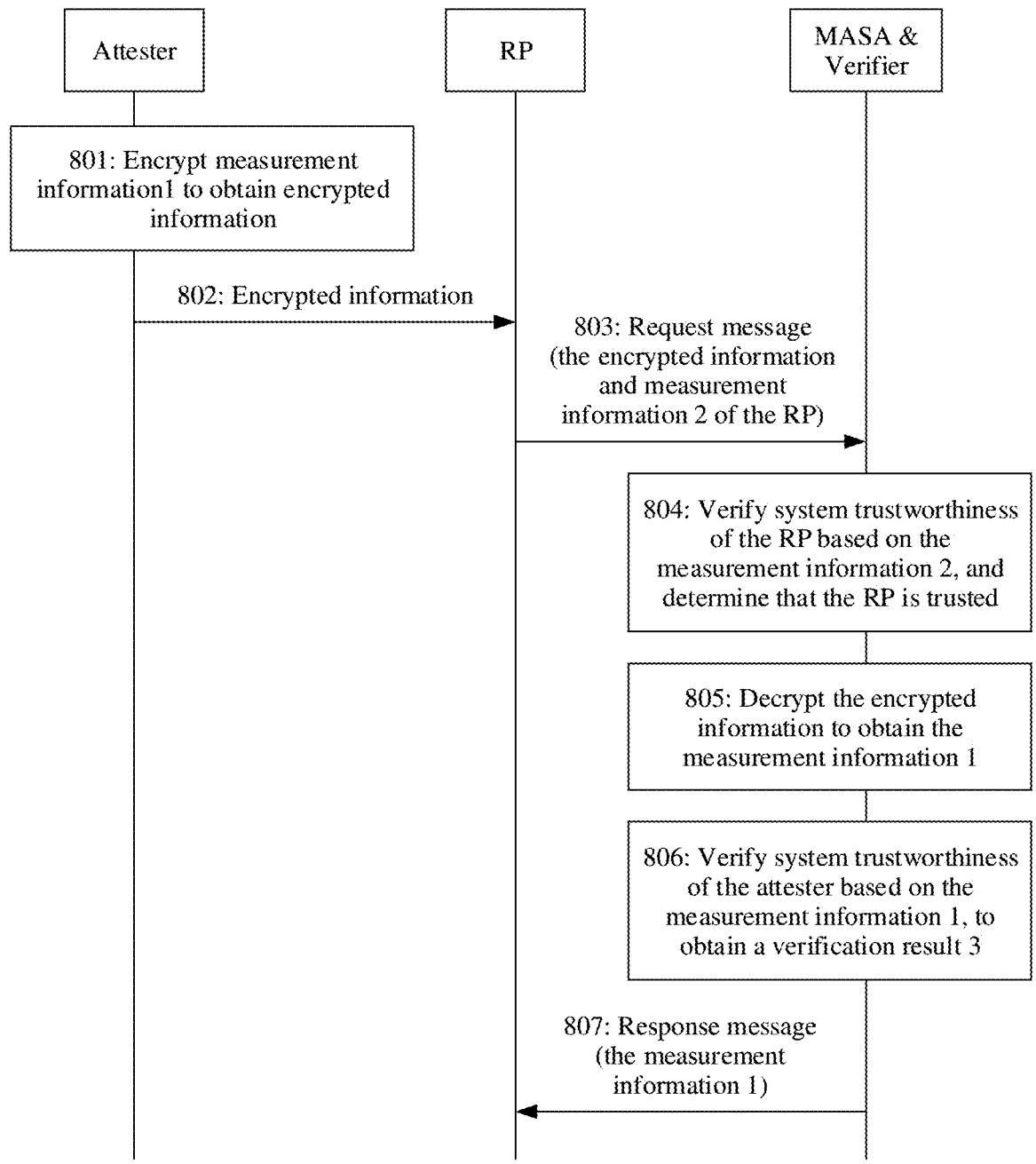
FIG. 8 is a signaling flowchart of yet another remote attestation method according to an embodiment of this application.

It is assumed that in a to-be-remotely-attested network, a MASA and a verifier are deployed on a same device, and the device is denoted as MASA & verifier. In this case, as shown in FIG. 8, the embodiments of this application further provide another remote attestation method. In this method, it is assumed that identities of an RP and an attester are valid. The method may specifically include the following step 801 to step 807.

Step 801: The attester encrypts measurement information 1 of the attester to obtain encrypted information.

Step 802: The attester sends the encrypted information to the RP.

Step 803: The verifier uses a request message to carry the encrypted information and measurement information 2 of the RP, and sends the request message to the MASA & verifier.

Step 804: The MASA & verifier verifies system trustworthiness of the RP based on the measurement information 2, to obtain a verification result 1.

Step 805: When the verification result 1 indicates that the RP is system-trusted, the MASA & verifier decrypts the encrypted information to obtain the measurement information 1.

Step 806: The MASA & verifier verifies system trustworthiness of the attester based on the measurement information 1, to obtain a verification result 3.

Step 807: The MASA & verifier uses a response message to carry the verification result 3, and sends the response message to the RP.

It should be noted that, for specific implementations and related descriptions of the encrypted information, the measurement information, the verification results, the system trustworthiness verification, and the like in the foregoing step 801 to step 807, refer to related descriptions of the embodiment shown in FIG. 5.

It should be noted that, in this embodiment of this application, it is assumed that the identities of the RP and the attester are valid. When it is not determined whether the identities of the RP and the attester are valid, for specific implementations and related descriptions, refer to related descriptions of the embodiment shown in FIG. 6A and FIG. 6B. Details are not described herein again.

It can be learned that, in a scenario in which three network devices: the attester, the RP, and the MASA & verifier are included, a large security risk of the attester caused because the measurement information of the system trustworthiness of the attester is obtained by a system-untrusted or invalid RP is avoided. The MASA & verifier first verifies the system trustworthiness of the RP, and sends the decrypted measurement information 1 of the attester to the RP for system trustworthiness verification only when the verification succeeds. This ensures that a remote attestation environment of the attester is trusted and secure, improves reliability of remote attestation for the attester, and reduces the security risk of the attester.

In some other specific implementations, the MASA stores system trustworthiness verification results of the RP and the verifier. Before the attester sends the measurement information 1, the attester first queries the system trustworthiness verification results of the RP and the verifier from the MASA. Only when it is determined that both the RP and the verifier are system-trusted, the attester sends the measurement information 1 to the verifier, and then the verifier verifies system trustworthiness of the attester based on the measurement information 1. This ensures that a remote attestation environment of the attester is trusted and secure, improves reliability of remote attestation for the attester, and reduces the security risk of the attester. For specific implementation, refer to the following embodiments in FIG. 9 to FIG. 12.

Figure 9:
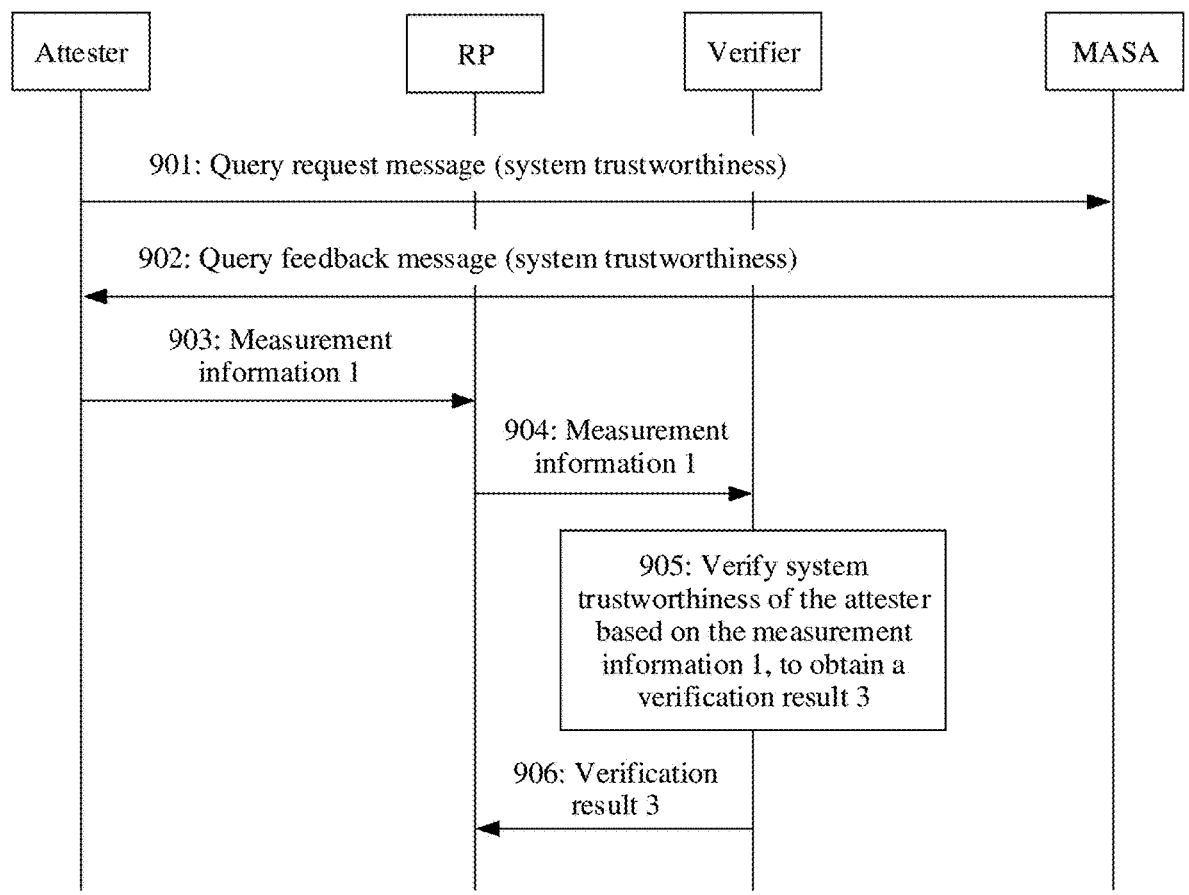
FIG. 9 is a signaling flowchart of another remote attestation method according to an embodiment of this application.

FIG. 9 is a signaling flowchart of another remote attestation method according to an embodiment of this application. As shown in FIG. 9, the method is applied to a network including an attester, an RP, a verifier, and a MASA, and it is known that identities of the attester, the RP, and the verifier are valid. The method may specifically include the following step 901 to step 906.

Step 901: The attester sends a query request message to the MASA to query system trustworthiness of the verifier and the RP from the MASA.

It may be understood that before the attester accesses the network, the MASA may first verify the system reliability of the RP and the verifier, and record verification results. In an example, before step 901, the MASA may separately initiate system trustworthiness verification for the RP and the verifier. The RP sends measurement information 2 to the MASA. The MASA verifies the system trustworthiness of the RP based on the measurement information 2, and obtains and records a verification result 2. Similarly, the verifier sends measurement information 3 to the MASA, and the MASA verifies the system trustworthiness of the verifier based on the measurement information 3, and obtains and records a verification result 3. In another example, before step 901, the RP may actively send measurement information 2 to the MASA, and the MASA verifies the system trustworthiness of the RP based on the measurement information 2, and obtains and records a verification result 2; similarly, the verifier may actively send measurement information 3 to the MASA, and the MASA verifies the system trustworthiness of the verifier based on the measurement information 3, and obtains and records a verification result 3. This provides a data basis for the attester to check the system trustworthiness of the RP and the verifier.

In specific implementation, when the attester needs to access the network, the attester may directly query the system trustworthiness of the RP and the verifier from the MASA. Alternatively, when the RP initiates remote attestation to the attester, that is, when the attester receives a remote attestation request message sent by the RP, the attester queries the system trustworthiness of the RP and the verifier from the MASA.

After receiving the query request message, the MASA searches for, according to an indication of the query request message, the verification results of the system trustworthiness verification for the RP and the verifier that are stored in the MASA. In an example, the MASA may directly use the verification result 2 of the RP and the verification result 3 of the verifier as a query result. In another example, the MASA checks the verification result 2 of the RP and the verification result 3 of the verifier, analyzes the verification results, and uses a system trustworthiness conclusion determined through analysis as a query result, for example, uses "RP-system-trusted" as the query result.

Step 902: The MASA returns a query feedback message carrying the query result to the attester.

Step 903: When the query result received by the attester indicates that the RP and the verifier are system-trusted, the attester sends measurement information 1 to the RP.

Step 904: The RP sends the measurement information 1 to the verifier.

In specific implementation, when receiving the query feedback message fed back by the MASA, the attester may obtain the query result through parsing. In a case, the query result includes the verification result 1 and the verification result 3. In this situation, the attester may analyze the verification result 2 to determine whether the RP is system-trusted, and analyze the verification result 3 to determine whether the verifier is system-trusted. In another case, the query result may include the conclusion of the system trustworthiness of the RP and the verifier. In this situation, the attester may directly determine, from the query result, whether the RP and the verifier are system-trusted. When both the verifier and the RP are system-trusted, the attester determines that a remote attestation environment of the attester is secure. In this case, the attester may send the measurement information 1 of the attester to the verifier through the RP. Once at least one of the verifier and the RP is system-untrusted, the attester determines that the remote attestation environment of the attester is insecure, and therefore the RP and the verifier are not used for remote attestation.

It may be understood that the measurement information 1 may be carried in a remote attestation request and sent to the verifier; or when the RP initiates a remote attestation request to the attester before step 901, the measurement information 1 may be carried in a remote attestation response message and sent to the verifier.

Step 905: The verifier verifies system trustworthiness of the attester based on the measurement information 1, to obtain a verification result 3.

Step 906: The verifier sends the verification result 3 to the RP.

For example, the verifier may use a remote attestation response message to carry the verification result 3, and send the remote attestation response message to the RP, to indicate the RP to perform processing for the attester, for example, resource management or network access control for the attester.

It may be understood that a user may check the system trustworthiness of the attester by using the verifier or the RP. Alternatively, after step 906, the RP may send the verification result 3 to the attester, to directly notify the attester whether the attester is system-trusted.

It should be noted that, for specific implementations and related descriptions of step 901 to step 906 in this embodiment of this application, refer to related descriptions of the embodiment shown in FIG. 5.

It can be learned that, in a scenario in which the attester, the RP, the verifier, and the MASA are included and it is known that the identities of the attester, the RP, and the verifier are valid, a large security risk of the attester caused because the measurement information of the system trustworthiness of the attester is obtained by a system-untrusted RP and verifier is avoided. The attester first queries the system trustworthiness of the RP and the verifier from the MASA, and sends the measurement information 1 of the attester to the verifier for system trustworthiness verification only when it is determined that the RP and the verifier are system-trusted. This ensures that the remote attestation environment of the attester is trusted and secure, improves reliability of remote attestation for the attester, and reduces the security risk of the attester.

Figure 10:
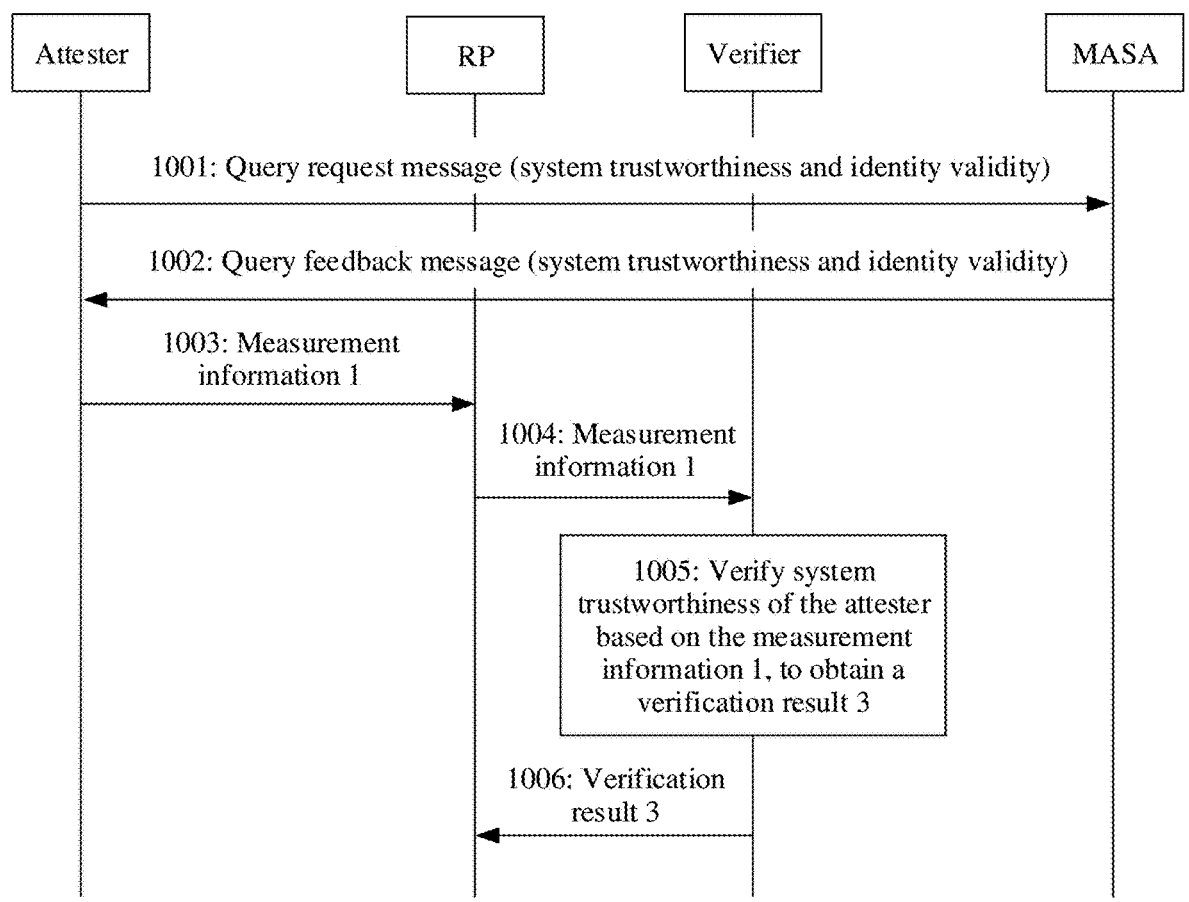
FIG. 10 is a signaling flowchart of still another remote attestation method according to an embodiment of this application.

It is assumed that a network includes an attester, an RP, a verifier, and a MASA, and identity validity of the attester, the RP, and the verifier is unknown. In this case, the embodiments of this application further provide another remote attestation method. As shown in FIG. 10, the method may specifically include the following step 1001 to step 1006.

Step 1001: The attester sends a query request message to the MASA to query, from the MASA, system trustworthiness of the verifier and the RP and identity validity of the attester, the RP, and the verifier.

It may be understood that before the attester accesses the network, the MASA may first verify system trustworthiness of the RP and the verifier, and verify the identity validity of the attester, the RP, and the verifier. For example, before step 901, the MASA may separately initiate identity validity verification for the attester, the RP, and the verifier. The attester sends identity information 1 to the MASA, and the MASA verifies the identity validity of the attester based on the identity information 1, and records whether the attester is valid. Similarly, the RP sends identity information 2 to the MASA, and the MASA verifies the identity validity of the RP based on the identity information 2, and records whether the RP is valid. The verifier sends identity information 3 to the MASA, and the MASA verifies the identity validity of the verifier based on the identity information 3, and records whether the verifier is valid. In another example, before step 901, the attester, the RP, and the verifier may actively send identity information corresponding to the attester, the RP, and the verifier to the MASA, and the MASA verifies the identity validity of each device based on the identity information, and records whether the device is valid. It should be noted that, for system trustworthiness verification, refer to related descriptions of step 601. This provides a data basis for the attester to query the system trustworthiness of the RP and the verifier and the identity validity of the attester, the RP, and the verifier.

Step 1002: The MASA returns a query feedback message carrying a query result to the attester.

It may be understood that the query result includes system trustworthiness verification results of the RP and the verifier and identity validity verification results of the attester, the RP, and the verifier.

Step 1003: The attester sends measurement information 1 to the RP when the query result received by the attester indicates that the RP and the verifier are system-trusted and identities of the attester, the RP, and the verifier are valid.

Step 1004: The RP sends the measurement information 1 to the verifier.

Step 1005: The verifier verifies system trustworthiness of the attester based on the measurement information 1, to obtain a verification result 3.

Step 1006: The verifier sends the verification result 3 to the RP.

It should be noted that, for specific implementation and related descriptions of the measurement information, the identity information, the verification results, the system trustworthiness verification, and the like in step 1001 to step 1006, refer to related descriptions of the embodiments shown in FIG. 9 and FIG. 6A and FIG. 6B.

It can be learned that, in a scenario in which the attester, the RP, the verifier, and the MASA are included, a large security risk of the attester caused because the measurement information of the system trustworthiness of the attester is obtained by a system-untrusted or invalid RP and verifier is avoided. The identity validity of the attester, the RP, and the verifier and the system trustworthiness of the RP and the verifier are first queried, and the attester sends the measurement information 1 to the verifier for system trustworthiness verification only when it is determined that the RP and the verifier are system-trusted and the identities of the attester, the RP, and the verifier are valid. This ensures that a remote attestation environment of the attester is trusted and secure, improves reliability of remote attestation for the attester, and reduces the security risk of the attester.

Figure 11:
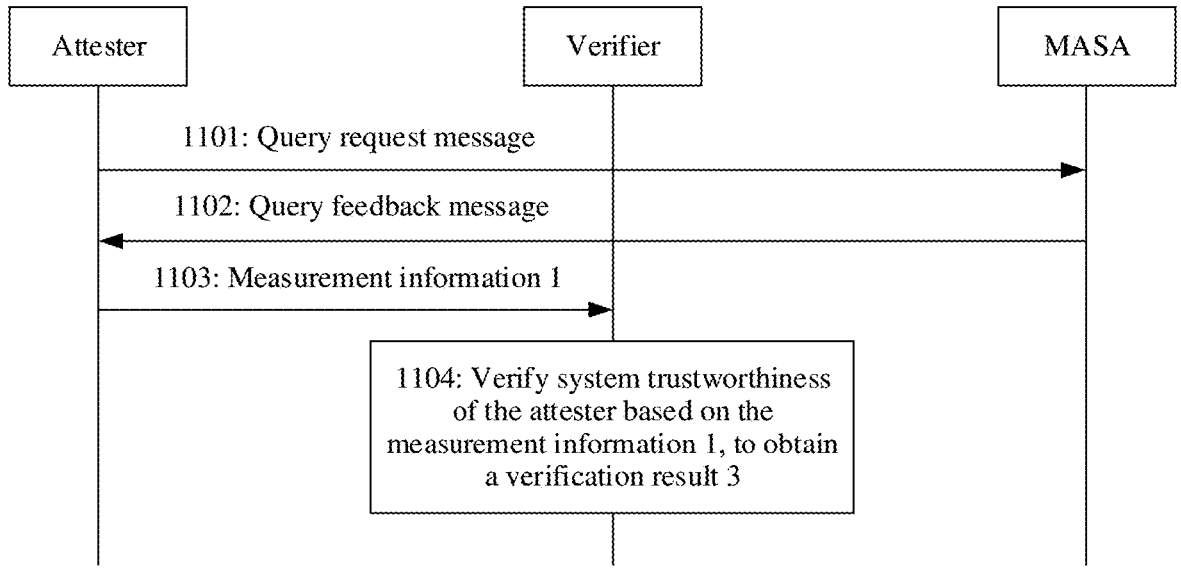
FIG. 11 is a signaling flowchart of yet another remote attestation method according to an embodiment of this application.

It is assumed that in a to-be-remotely-attested network, an RP and a verifier are deployed on a same device, or an attester directly interacts with the verifier. In this case, as shown in FIG. 11, the embodiments of this application further provide another remote attestation method. Based on an actual network architecture, the verifier in FIG. 11 may be a device on which functions of the RP and the verifier in the foregoing embodiment are deployed, and may also be a verifier that directly interacts with the attester. In this method, it is assumed that identities of the verifier and the attester are valid. The method may specifically include the following step 1101 to step 1104.

Step 1101: The attester sends a query request message to a MASA to query system trustworthiness of the verifier from the MASA.

Step 1102: The MASA returns a query feedback message carrying a query result to the attester.

It may be understood that the query result includes a system trustworthiness verification result of the verifier.

Step 1103: When the query result received by the attester indicates that the verifier is system-trusted, the attester sends measurement information 1 to the verifier.

Step 1104: The verifier verifies system trustworthiness of the attester based on the measurement information 1, to obtain a verification result 3.

It should be noted that, for specific implementation and related descriptions of the measurement information, the verification results, the system trustworthiness verification, and the like in step 1101 to step 1104, refer to related descriptions of the embodiments shown in FIG. 7 and FIG. 9.

It should be noted that, in this embodiment of this application, it is assumed that the identities of the verifier and the attester are valid. When it is not determined whether the identities of the verifier and the attester are valid, for specific implementations and related descriptions, refer to related descriptions of the embodiment shown in FIG. 10. Details are not described herein again.

It can be learned that, in a scenario in which the attester, the verifier, and the MASA are included, a large security risk of the attester caused because the measurement information of the system trustworthiness of the attester is obtained by a system-untrusted verifier is avoided. The attester first queries the system trustworthiness of the verifier from the MASA, and sends the measurement information 1 of the attester to the verifier for system trustworthiness verification only when it is determined that the verifier is system-trusted. This ensures that the remote attestation environment of the attester is trusted and secure, improves reliability of remote attestation for the attester, and reduces the security risk of the attester.

Figure 12:
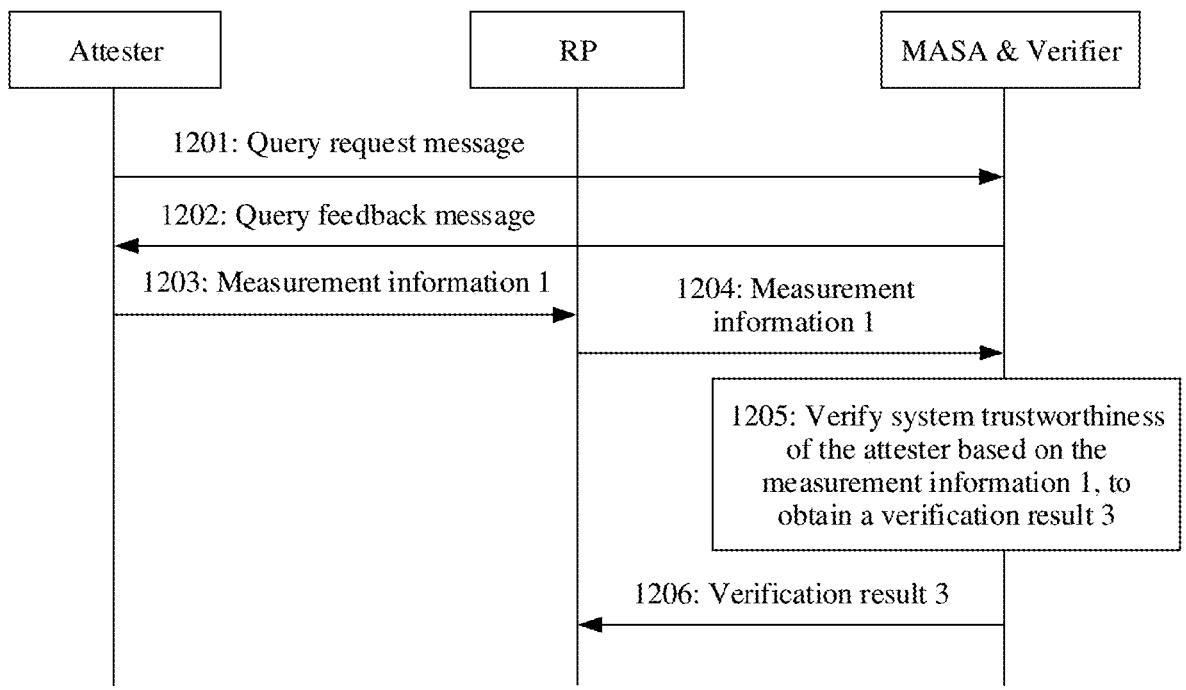
FIG. 12 is a signaling flowchart of another remote attestation method according to an embodiment of this application.

It is assumed that in a to-be-remotely-attested network, a MASA and a verifier are deployed on a same device, and the device is denoted as MASA & verifier. In this case, as shown in FIG. 12, the embodiments of this application further provide another remote attestation method. In this method, it is assumed that identities of an RP and an attester are valid. The method may specifically include the following step 1201 to step 1206.

Step 1201: The attester sends a query request message to the MASA & verifier to query system trustworthiness of an RP from the MASA & verifier.

Step 1202: The MASA & verifier returns a query feedback message carrying a query result to the attester.

It may be understood that the query result includes a system trustworthiness verification result of the RP.

Step 1203: When the query result received by the attester indicates that the RP is system-trusted, the attester sends measurement information 1 to the RP.

Step 1204: The RP sends the measurement information 1 to the MASA & verifier.

Step 1205: The MASA & verifier verifies system trustworthiness of the attester based on the measurement information 1, to obtain a verification result 3.

Step 1206: The MASA & verifier sends the verification result 3 to the RP.

It should be noted that, for specific implementation and related descriptions of the measurement information, the verification results, the system trustworthiness verification, and the like in step 1201 to step 1206, refer to related descriptions of the embodiments shown in FIG. 8 and FIG. 9.

It should be noted that, in this embodiment of this application, it is assumed that the identities of the RP and the attester are valid. When it is not determined whether the identities of the RP and the attester are valid, for specific implementations and related descriptions, refer to related descriptions of the embodiment shown in FIG. 10. Details are not described herein again.

It can be learned that, in a scenario in which three network devices: the attester, the RP, and the MASA & verifier are included, a large security risk of the attester caused because the measurement information of the system trustworthiness of the attester is obtained by a system-untrusted RP is avoided. The MASA & verifier first verifies the system trustworthiness of the RP, and sends the decrypted measurement information 1 of the attester to the verifier for system trustworthiness verification only when the verification succeeds. This ensures that a remote attestation environment of the attester is trusted and secure, improves reliability of remote attestation for the attester, and reduces the security risk of the attester.

On the basis of the scenario shown in FIG. 4, with reference to FIG. 13A to FIG. 15B, several specific implementations of the remote attestation method provided in the embodiments of this application in a BRSKI protocol framework are described. Before an attester accesses a network for the first time, at least the following requirements need to be met: BRSKI-based identity validity verification succeeds, and a system of a remote attestation network device is trusted. This implementation achieves secure remote attestation with little impact on the BRSKI protocol.

Figure 13A:
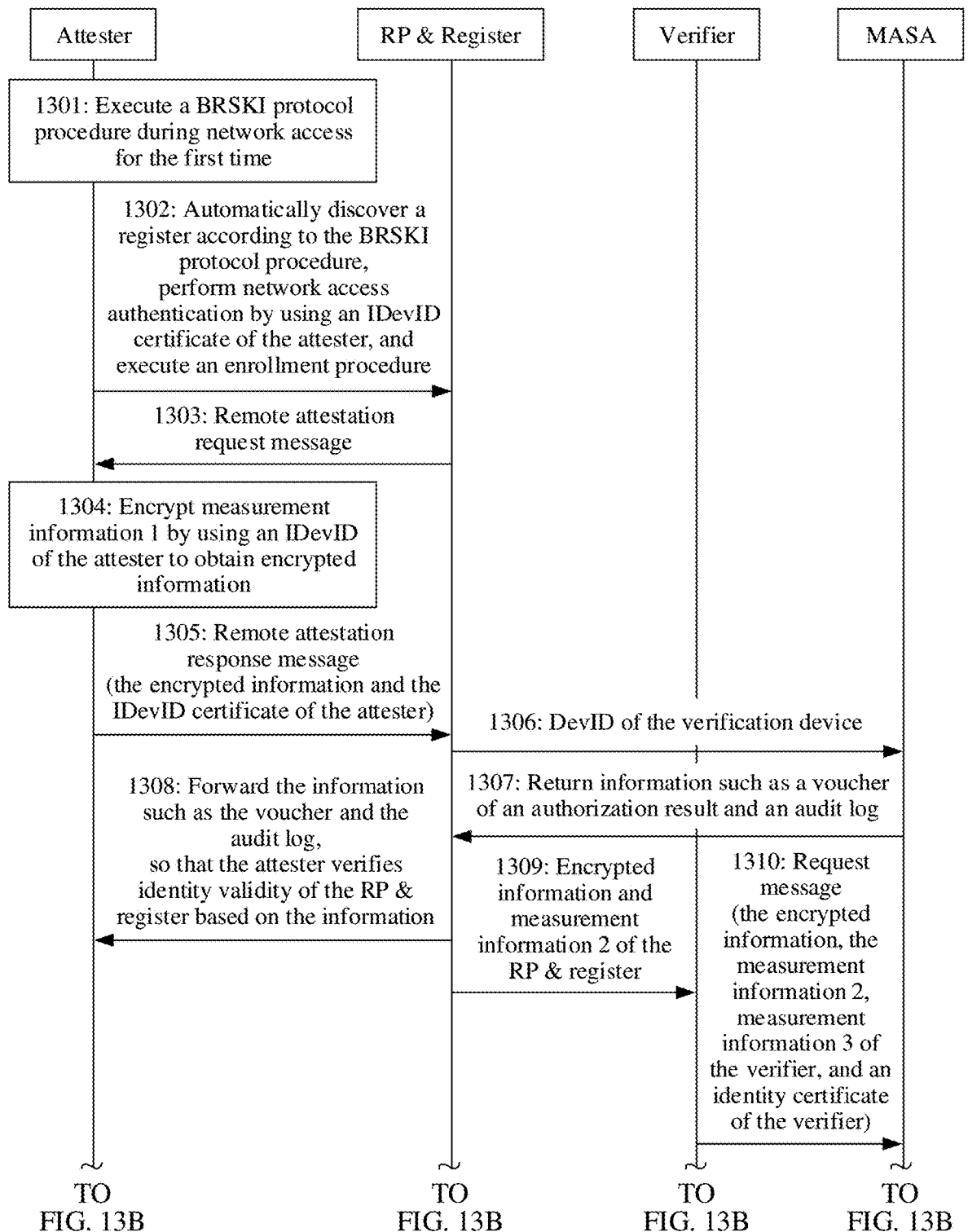
FIG. 13A and FIG. 13B are a signaling flowchart of a BRSKI procedure and a remote attestation process according to an embodiment of this application.
Figure 13B:
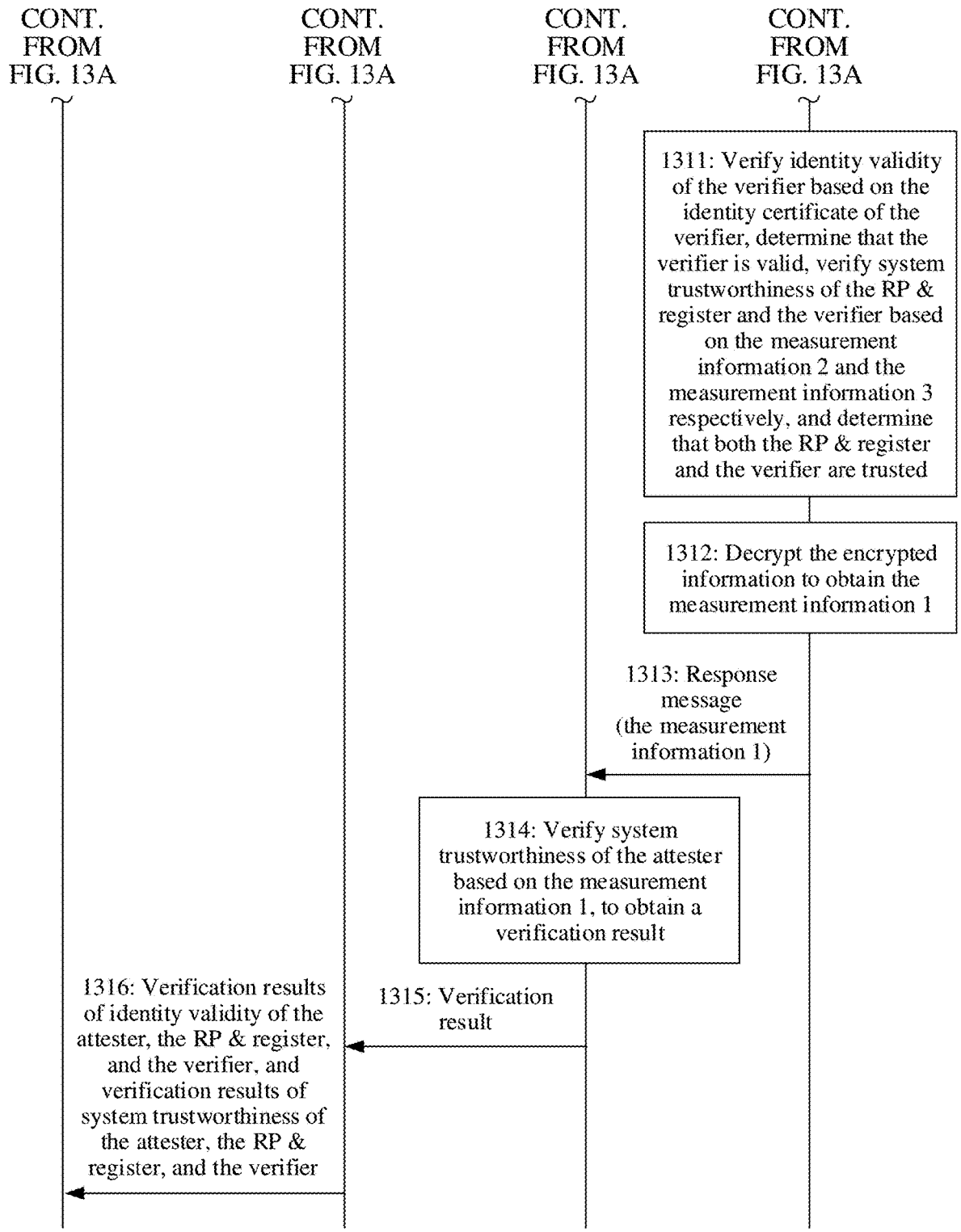

During specific implementation, as shown in FIG. 13A and FIG. 13B, in this embodiment, an RP and a registration device are deployed on a same device, and the device is denoted as RP & register. This embodiment may include the following steps.

Step 1301: The attester accesses the network for the first time, and executes a BRSKI protocol procedure.

Step 1302: According to the BRSKI protocol procedure, the attester automatically discovers the register, performs network access authentication by using an IDevID certificate of the attester, and executes an enrollment procedure.

Step 1303: The RP & register sends a remote attestation request message to the attester.

Step 1304: The attester encrypts measurement information 1 by using a public key corresponding to an IDevID of the attester, to obtain encrypted information.

Step 1305: The attester sends a remote attestation response message carrying the encrypted information and the IDevID certificate of the attester to the RP & register.

Step 1303 to step 1305 are steps corresponding to the extended BRSKI protocol.

Step 1306: The RP & register provides a certificate of the RP & register to a MASA for verification.

Step 1307: The MASA returns information such as a voucher of an authorization result and an audit log to the RP & register.

Step 1308: The RP & register forwards information such as the voucher to the attester, so that the attester verifies identity validity of the RP & register based on the information.

Step 1306 to step 1308 may be specifically a process of verifying the identity validity of the RP & register in the BRSKI process.

Step 1309: The RP & register sends the encrypted information and measurement information 2 of the RP & register to a verifier.

It may be understood that the information in step 1309 may be specifically forwarded by using the RATS protocol.

Step 131o: The verifier uses a request message to carry the encrypted information, the measurement information 2, measurement information 3 of the verifier, and an identity certificate of the verifier, and sends the request message to the MASA.

Step 1311: The MASA verifies system trustworthiness of the RP & register and the verifier respectively based on the measurement information 2 and the measurement information 3 of the verifier, and verifies identity validity of the verifier.

Step 1312: When it is determined that systems of the RP & register and the verifier are trusted and an identity of the verifier is valid, the MASA decrypts the encrypted information to obtain the measurement information 1.

Step 1313: The MASA uses a response message to carry the measurement information 1 and sends the response message to the verifier.

Step 1314: The verifier verifies system trustworthiness of the attester based on the measurement information 1, to obtain a verification result.

Step 1315: The verifier sends the verification result of the system trustworthiness of the attester to the RP & register.

Step 1316: The RP & register sends identity validity verification results of the attester, the RP & register, and the verifier, and system trustworthiness verification results of the attester, the RP & register, and the verifier to the attester.

It should be noted that, after the foregoing remote attestation has been performed, the attester may determine that the verifier and the RP & register are system-trusted and valid in terms of identity. In this case, when remote attestation is subsequently required, measurement information may be directly sent to the verifier through the RP & register, and the verifier verifies the system trustworthiness of the attester quickly and securely.

It should be noted that, in some implementations, because the attester receives the identity validity verification result and the system trustworthiness verification result of the RP & register in step 1316, in order to save network resources and simplify the verification procedure, the process of verifying the identity validity of the RP & register corresponding to step 1306 to step 1309 in the original BRSKI procedure may not be performed.

It should be noted that there is no specific sequence for performing steps 1306 to 1309 and steps 1310 to 1316. Generally, the steps are performed in the foregoing sequence. However, to save network resources, the BRSKI-based identity validity verification is performed first, and only when the verification succeeds, system trustworthiness verification of the remote attestation network device is performed; when the verification fails, remote attestation may not be performed to directly prevent the network device from accessing the network. In other cases, system trustworthiness verification of the remote attestation network device may be performed first, and only when a verification result indicates that a system of the network device is trusted, the BRSKI-based identity validity verification is performed; when the system is untrusted, the BRSKI-based identity validity verification may not be performed to directly prevent the network device from accessing the network. In still other cases, the BRSKI-based identity validity verification and the system trustworthiness verification of the remote attestation network device may both be performed. The network device is allowed to access the network only when both the verifications succeed.

It should be noted that step 1310 to step 1316 correspond to a remote attestation process for the attester. For specific implementation, refer to related descriptions in the embodiments corresponding to FIG. 5 to FIG. 12 in this application.

It can be learned that, in this embodiment, the remote attestation method is combined with the BRSKI protocol procedure, and a specific process in which the attester accesses the network for the first time is shown. The remote attestation method provided in this embodiment of this application can enable remote attestation for the attester to be more accurate, and therefore improve reliability of accessing the network by the attester for the first time.

Figure 14A:
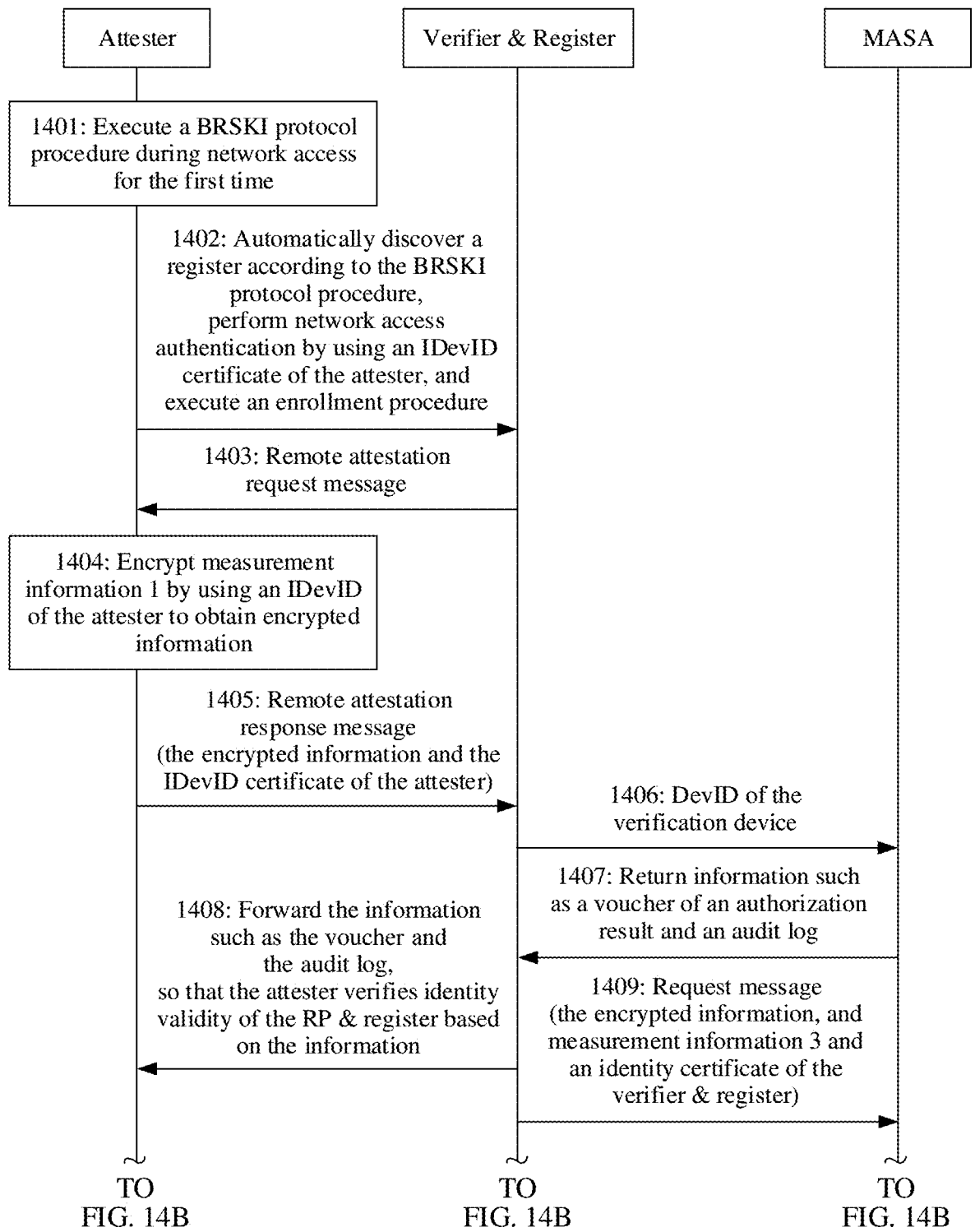
FIG. 14A and FIG. 14B are another signaling flowchart of a BRSKI procedure and a remote attestation process according to an embodiment of this application.
Figure 14B:
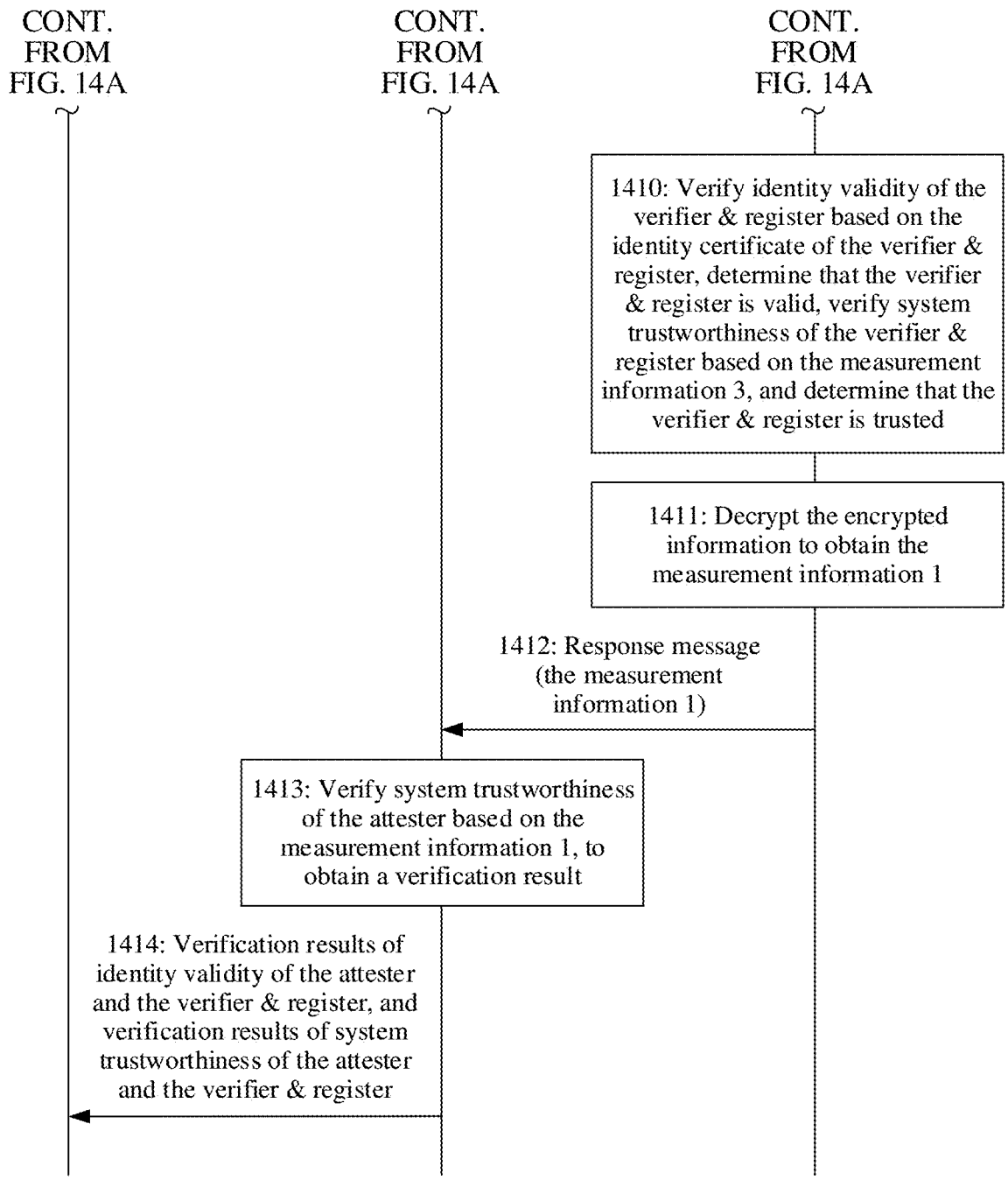

During specific implementation, it is assumed that an RP and a verifier are deployed on a same device, or an attester directly interacts with the verifier. In this case, as shown in FIG. 14A and FIG. 14B, based on an actual network architecture, the verifier in FIG. 14A and FIG. 14B may be a device on which functions of the RP and the verifier in the foregoing embodiment are deployed, or may be a verifier that directly interacts with the attester. The verifier and a registration device are deployed on the same device, and the device is referred to as verifier & register.

As shown in FIG. 14A and FIG. 14B, the embodiments of this application further provide another remote attestation method. In the method, it is assumed that identities of the verifier and the attester are valid. The method may specifically include the following steps.

Step 1401: The attester accesses a network for the first time, and executes a BRSKI protocol procedure.

Step 1402: According to the BRSKI protocol procedure, the attester automatically discovers the register, performs network access authentication by using an IDevID certificate of the attester, and executes an enrollment procedure.

Step 1403: The verifier & register sends a remote attestation request message to the attester.

Step 1404: The attester encrypts measurement information 1 by using a public key corresponding to an IDevID of the attester, to obtain encrypted information.

Step 1405: The attester sends a remote attestation response message carrying the encrypted information and the IDevID certificate of the attester to the verifier & register.

Step 1403 to step 1405 are steps corresponding to the extended BRSKI protocol.

Step 1406: The verifier & register provides a certificate of the verifier & register to a MASA for verification.

Step 1407: The MASA returns information such as a voucher (voucher) of an authorization result and an audit log to the verifier & register.

Step 1408: The verifier & register forwards information such as the voucher to the attester, so that the attester verifies identity validity of the verifier & register based on the information.

Step 1406 to step 1408 may be specifically a process of verifying the identity validity of the verifier & register in the BRSKI process.

Step 1409: The verifier & register uses a request message to carry the encrypted information, measurement information 3 of the verifier & register, and an identity certificate of the verifier & register, and sends the request message to the MASA.

Step 141o: The MASA verifies system trustworthiness of the verifier & register based on the measurement information 3, and verifies identity validity of the verifier & register.

Step 1411: When it is determined that a system of the verifier & register is trusted and an identity of the verifier & register is valid, the MASA decrypts the encrypted information to obtain the measurement information 1.

Step 1412: The MASA uses a response message to carry the measurement information 1 and sends the response message to the verifier & register.

Step 1413: The verifier & register verifies system trustworthiness of the attester based on the measurement information 1, to obtain a verification result.

Step 1414: The verifier & register sends identity validity verification results of the attester and the verifier & register and system trustworthiness verification results of the attester and the verifier & register to the attester.

It should be noted that, after the foregoing remote attestation has been performed, the attester may determine that the verifier & register is system-trusted and valid in terms of identity. In this case, when remote attestation is subsequently required, measurement information may be directly sent to the verifier & register, and the verifier & register verifies the system trustworthiness of the attester quickly and securely.

It should be noted that, in some implementations, because the attester receives the identity validity verification result and the system trustworthiness verification result of the verifier & register in step 1414, in order to save network resources and simplify the verification procedure, the process of verifying the identity validity of the verifier & register corresponding to step 1406 to step 1408 in the original BRSKI procedure may not be performed.

It can be learned that, in this embodiment, the remote attestation method is combined with the BRSKI protocol procedure, and a specific process in which the attester accesses the network for the first time is shown. The remote attestation method provided in this embodiment of this application can enable remote attestation for the attester to be more accurate, and therefore improve reliability of accessing the network by the attester for the first time.

Figure 15A:
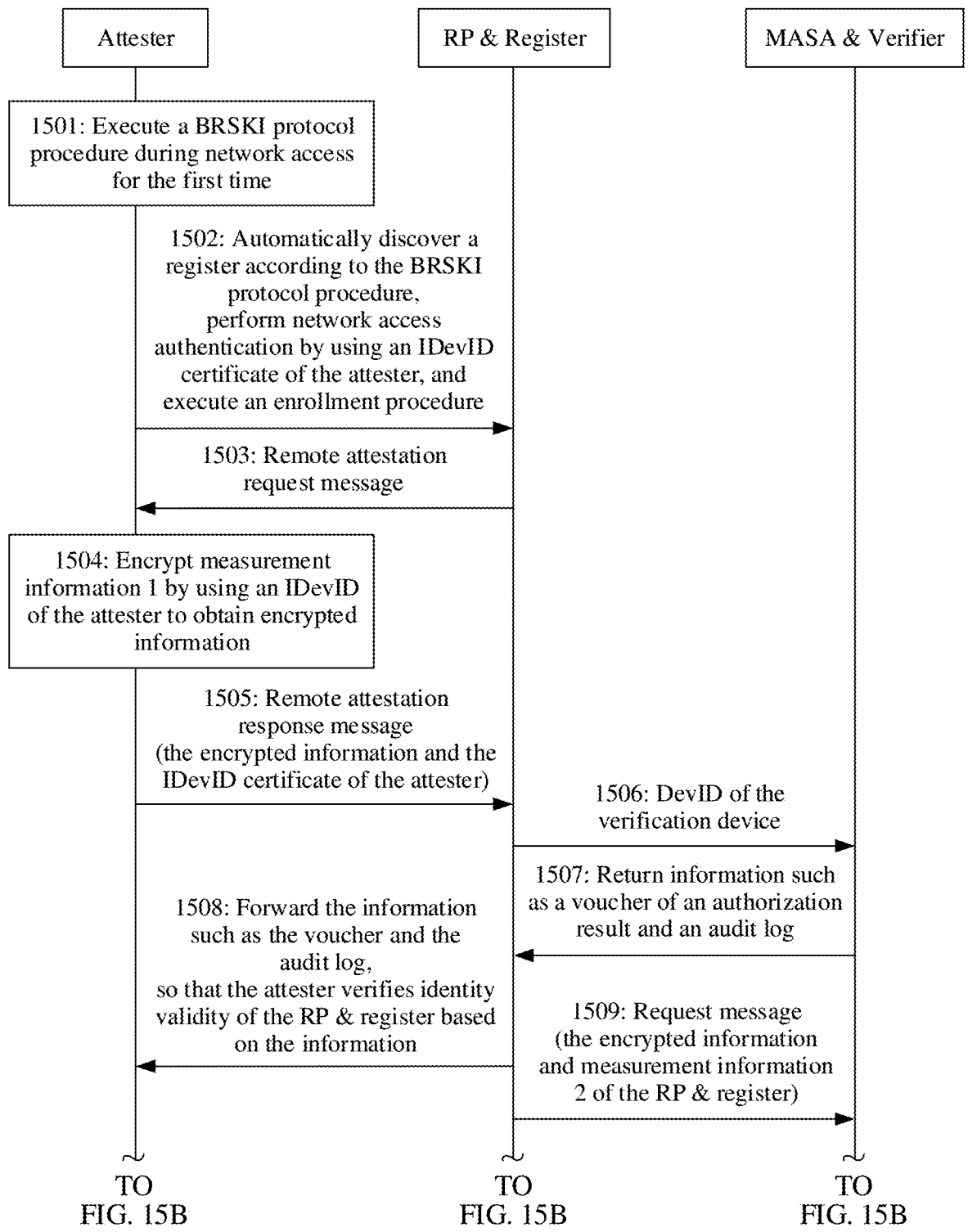
FIG. 15A and FIG. 15B are still another signaling flowchart of a BRSKI procedure and a remote attestation process according to an embodiment of this application.
Figure 15B:
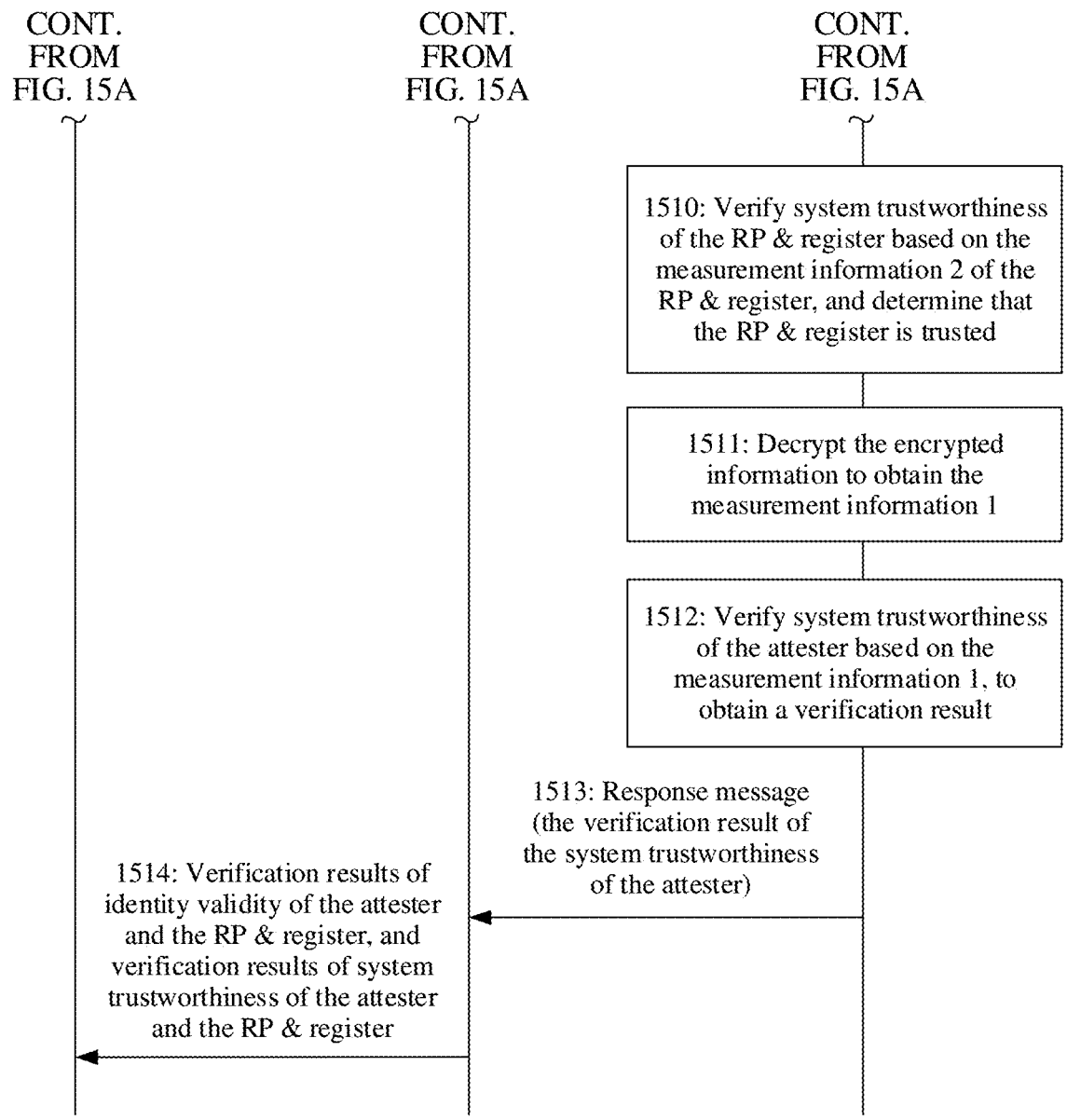

During specific implementation, it is assumed that a MASA and a verifier are deployed on a same device, and the device is denoted as MASA & verifier. In this case, as shown in FIG. 15A and FIG. 15B, the embodiments of this application further provide another remote attestation method. The method may specifically include the following steps.

Step 1501: The attester accesses a network for the first time, and executes a BRSKI protocol procedure.

Step 1502: According to the BRSKI protocol procedure, the attester automatically discovers a register, performs network access authentication by using an IDevID certificate of the attester, and executes an enrollment procedure.

Step 1503: An RP & register sends a remote attestation request message to the attester.

Step 1504: The attester encrypts measurement information 1 by using a public key corresponding to an IDevID of the attester, to obtain encrypted information.

Step 1505: The attester sends a remote attestation response message carrying the encrypted information and the IDevID certificate of the attester to the RPr & register.

Step 1503 to step 1505 are steps corresponding to the extended BRSKI protocol.

Step 1506: The RP & register provides a certificate of the RP & register to the MASA & verifier for verification.

Step 1507: The MASA & verifier returns information such as a voucher (voucher) of an authorization result and an audit log to the RP & register.

Step 1508: The RP & register forwards information such as the voucher to the attester, so that the attester verifies identity validity of the RP & register based on the information.

Step 1506 to step 1508 may be specifically a process of verifying the identity validity of the RP & register in the BRSKI process.

Step 1509: The RP & register uses a request message to carry the encrypted information and measurement information 2 of the RP & register, and sends the request message to the MASA & verifier.

Step 1510: The MASA & verifier verifies system trustworthiness of the RP & register based on the measurement information 2.

Step 1511: When it is determined that a system of the RP & register is trusted, the MASA & verifier decrypts the encrypted information to obtain the measurement information 1.

Step 1512: The MASA & verifier verifies system trustworthiness of the attester based on the measurement information 1, to obtain a verification result.

Step 1513: The MASA & verifier sends the verification result of the system trustworthiness of the attester to the RP & register.

Step 1514: The RP & register sends identity validity verification results of the attester and the RP & register and system trustworthiness verification results of the attester and the RP & register to the attester.

It should be noted that, after the foregoing remote attestation has been performed, the attester may determine that the MASA & verifier is system-trusted and valid in terms of identity. In this case, when remote attestation is subsequently required, measurement information may be directly sent to the MASA & verifier through the RP & register, and the MASA & verifier verifies the system trustworthiness of the attester quickly and securely.

It can be learned that, in this embodiment, the remote attestation method is combined with the BRSKI protocol procedure, and a specific process in which the attester accesses the network for the first time is shown. The remote attestation method provided in this embodiment of this application can enable remote attestation for the attester to be more accurate, and therefore improve reliability of accessing the network by the attester for the first time.

Figure 16:
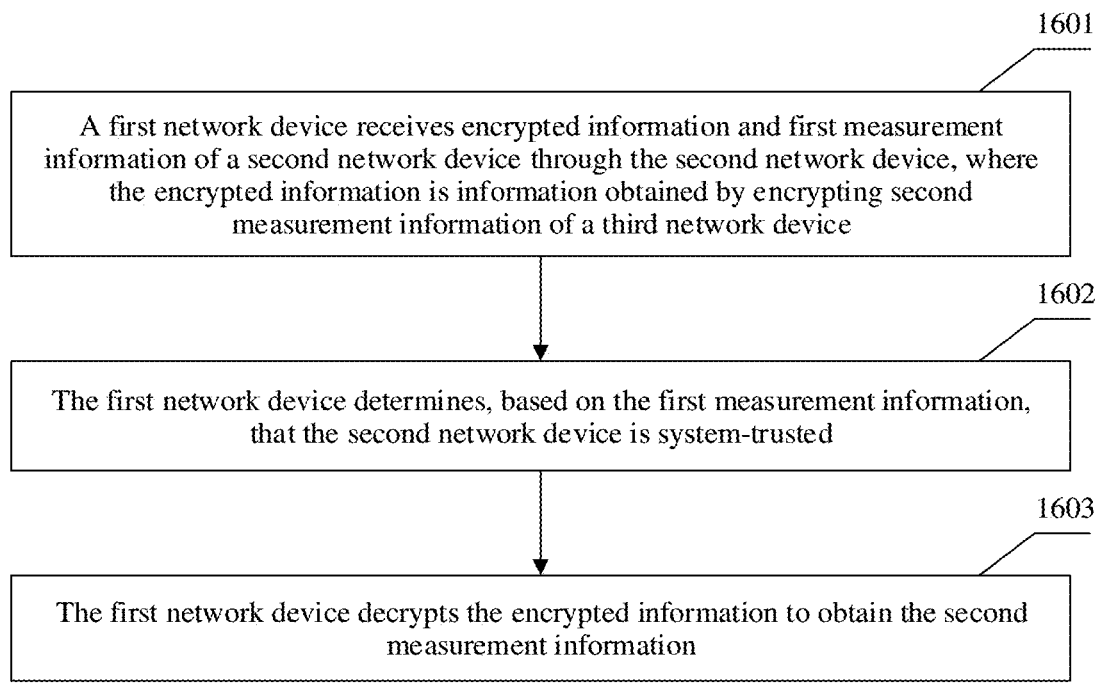
FIG. 16 is a schematic flowchart of a remote attestation method according to an embodiment of this application.

FIG. 16 is a schematic flowchart of a remote attestation method according to an embodiment of this application. Devices participating in remote attestation include a first network device, a second network device, and a third network device. The first network device is used as an execution body. A specific remote attestation process may include the following steps.

Step 1601: The first network device receives encrypted information and first measurement information of a second network device through the second network device. The encrypted information is information obtained by encrypting second measurement information of a third network device.

Step 1602: The first network device determines, based on the first measurement information, that a system of the second network device is trusted.

Step 1603: The first network device decrypts the encrypted information to obtain the second measurement information.

It should be noted that the embodiment shown in FIG. 16 may correspond to the foregoing embodiments shown in FIG. 5 to FIG. 8. In a case, the first network device may be the MASA in the embodiments corresponding to FIG. 5 to FIG. 7. In this case, the second network device may be the verifier and the RP in the embodiments corresponding to FIG. 5 and FIG. 6A and FIG. 6B, or may be a device (that is, the RP & verifier) in which the RP and the verifier are combined in the embodiment in FIG. 7, and the third network device may be the attester. In another case, the first network device may be the MASA & verifier in the embodiment corresponding to FIG. 8. In this case, the second network device may be the RP in the embodiment corresponding to FIG. 7, and the third network device may be the attester. Related implementations of the embodiment shown in FIG. 16 may correspond to related descriptions of the embodiments shown in FIG. 5 to FIG. 8.

In a case in which the first network device is the MASA and the second network device is the verifier, this embodiment may further include: The first network device sends the second measurement information to the second network device. In this way, the second network device may verify system trustworthiness of the third network device based on the second measurement information.

In a case in which the first network device is the MASA & verifier and the second network device is the RP, this embodiment may further include: The first network device verifies system trustworthiness of the third network device based on the second measurement information, to obtain a first verification result; and the first network device sends the first verification result to the second network device. In this way, the first network device may verify the system trustworthiness of the third network device based on the second measurement information, and send the verification result to the second network device, so that the user can view the system trustworthiness of the third network device by using the second network device.

In an example, this embodiment may further include: The first network device sends a second verification result to the second network device. The second verification result is a verification result of system trustworthiness of the second network device.

In a case in which the first network device is the MASA, the second network device is the verifier, the third network device is the attester, and a fourth network device is the RP, step 1601 in which the first network device receives encrypted information through the second network device in this embodiment is specifically: The first network device receives, through the second network device, the encrypted information sent by the fourth network device. This embodiment may further specifically include: The first network device receives third measurement information of the fourth network device through the second network device. In this case, before step 1603, the method further includes: The first network device determines, based on the third measurement information, that a system of the fourth network device is trusted. In an example, this embodiment may further include: The first network device sends a third verification result to the second network device. The third verification result is a verification result of system trustworthiness of the fourth network device. For details, refer to related descriptions in the embodiments corresponding to FIG. 5 and FIG. 6A and FIG. 6B.

In some specific implementations, this embodiment of this application may further include: The first network device receives identity information sent by the second network device. Before step 1603, the method further includes: The first network device determines, based on the identity information, that an identity of the second network device is valid. This embodiment may further include: The first network device sends a fourth verification result to the second network device. The fourth verification result is a verification result of identity validity of the second network device. For details, refer to related descriptions in the embodiment corresponding to FIG. 6A and FIG. 6B.

It may be understood that the first verification result in this embodiment is used to determine whether the third network device is allowed to access a network.

In this embodiment, step 1601 is specifically: The first network device receives a network configuration NETCONF protocol request message sent by the second network device, where the request message carries the encrypted information and the first measurement information. That the first network device sends the second measurement information to the second network device is specifically: The first network device sends a NETCONF protocol response message to the second network device, where the response message carries the second measurement information. The encrypted information and the first measurement information in the request message may be described by using an Internet Engineering Task Force Yet Another Next Generation data model IETF YANG data model format. The first measurement information in the response message may also be described by using the IETF YANG data model format.

Alternatively, in this embodiment, step 1601 may be specifically: The first network device receives a network configuration NETCONF protocol request message sent by the second network device, where the request message carries the encrypted information and the first measurement information. That the first network device sends the first verification result to the second network device is specifically: The first network device sends a NETCONF protocol response message to the second network device, where the response message carries the first verification result.

Figure 17:
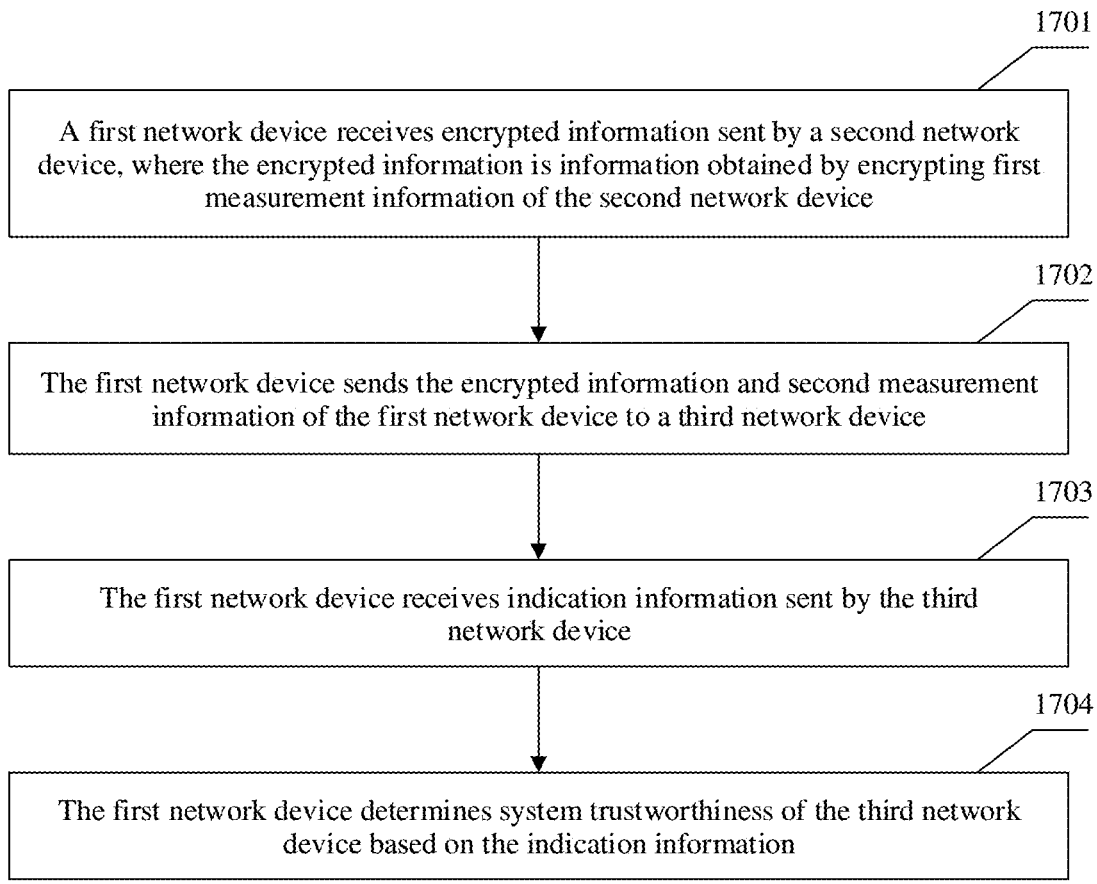
FIG. 17 is a schematic flowchart of another remote attestation method according to an embodiment of this application.

FIG. 17 is a schematic flowchart of a remote attestation method according to an embodiment of this application. Devices participating in remote attestation include a first network device, a second network device, and a third network device. The first network device is used as an execution body. A specific remote attestation process may include the following steps.

Step 1701: The first network device receives encrypted information sent by a second network device. The encrypted information is information obtained by encrypting first measurement information of the second network device.

Step 1702: The first network device sends the encrypted information and second measurement information of the first network device to the third network device.

Step 1703: The first network device receives indication information sent by the third network device.

Step 1704: The first network device determines system trustworthiness of the second network device based on the indication information.

It should be noted that the embodiment shown in FIG. 17 may correspond to the foregoing embodiments shown in FIG. 5 to FIG. 8. The first network device may be an RP, a verifier, or a device (that is, the RP & verifier) in which the RP and the verifier are combined. In this case, the second network device may be an attester, and the third network device may be a verifier, a MASA, or a device (that is, the MASA & verifier) in which the MASA and the verifier are combined. Related implementations of the embodiment shown in FIG. 17 may correspond to related descriptions of the embodiments shown in FIG. 5 to FIG. 8.

In a case, when the first network device is the RP, the indication information may be a verification result of system trustworthiness of the second network device.

In another case, when the first network device is the verifier, the indication information may alternatively be the first measurement information. In this case, the determining the system trustworthiness of the second network device based on the indication information in step 1704 is specifically: The first network device verifies the system trustworthiness of the second network device based on the first measurement information.

Corresponding to the embodiment shown in FIG. 5, step 1701 is specifically: The first network device receives, through a fourth network device, the encrypted information sent by the second network device. This embodiment may further include: The first network device receives third measurement information of the fourth network device sent by the fourth network device. In this case, the first network device sends the third measurement information to the third network device. The third measurement information is used to verify system trustworthiness of the fourth network device, and the encrypted information is used to be decrypted into the first measurement information when it is determined that the first network device is system-trusted and the fourth network device system is system-trusted.

It may be understood that this embodiment may further include: The first network device sends a first verification result to the second network device. The first verification result is a verification result of system trustworthiness of the second network device.

It may be understood that this embodiment may further include: The first network device receives a second verification result sent by the third network device. The second verification result is a verification result of system trustworthiness of the first network device. This embodiment may further include: The first network device sends the second verification result to the second network device, so that the second network device can learn the system trustworthiness of the first network device. This facilitates subsequent remote attestation.

It may be understood that this embodiment may further include: The first network device receives a third verification result sent by the third network device. The third verification result is a verification result of system trustworthiness of the fourth network device. In this case, this embodiment further includes: The first network device sends the third verification result to the second network device. Specifically, the first network device sends the third verification result to the fourth network device, and then the fourth network device sends the third verification result to the second network device.

Corresponding to the method provided in the embodiment shown in FIG. 6A and FIG. 6B, this embodiment may further include: The first network device receives first identity information sent by the second network device. Before step 1702, the method further includes: The first network device determines identity validity of the second network device based on the first identity information. The first network device may further send a fourth verification result to the second network device. The fourth verification result is a verification result of identity validity of the second network device.

In an example, this embodiment may further include: The first network device receives second identity information sent by the fourth network device. Before step 1702, the method further includes: The first network device determines, based on the second identity information, that an identity of the fourth network device is valid. The first network device may further send a fifth verification result to the fourth network device. The fifth verification result is a verification result of identity validity of the fourth network device.

In another example, this embodiment may further include: The first network device sends third identity information of the first network device to the third network device. The first network device may further receive a sixth verification result sent by the third network device. The sixth verification result is a verification result of identity validity of the first network device. In this embodiment, the first network device may further send the sixth verification result to the second network device.

This embodiment may further include: The first network device sends the third identity information of the first network device to the fourth network device. The third identity information is used to verify the identity validity of the first network device.

It may be understood that, in this embodiment, the first network device may be further configured to determine, based on the system trustworthiness of the second network device, whether to allow the second network device to access the network.

In this embodiment, step 1702 is specifically: The first network device sends a network configuration NETCONF protocol request message to the third network device. The request message carries the encrypted information and the second measurement information. Step 1703 in which the first network device receives indication information sent by the third network device is specifically: The first network device receives a NETCONF protocol response message sent by the third network device. The response message carries the indication information. The encrypted information and the second measurement information in the request message may be described by using an Internet Engineering Task Force Yet Another Next Generation data model IETF YANG data model format. The indication information in the response message may also be described by using the IETF YANG data model format.

Figure 18:
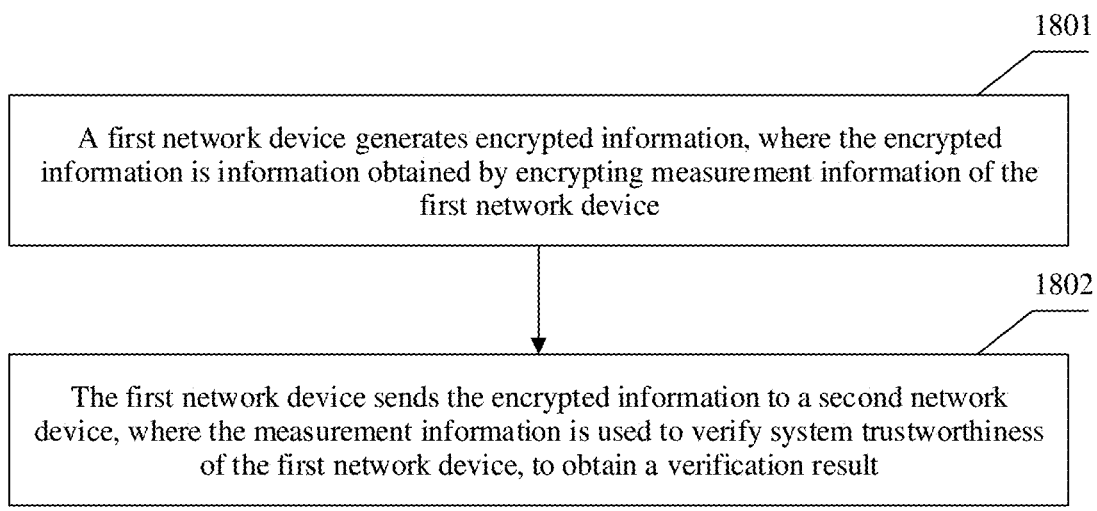
FIG. 18 is a schematic flowchart of still another remote attestation method according to an embodiment of this application.

FIG. 18 is a schematic flowchart of a remote attestation method according to an embodiment of this application. Devices participating in remote attestation include a first network device and a second network device. The first network device is used as an execution body. A specific remote attestation process may include the following steps.

Step 1801: The first network device generates encrypted information. The encrypted information is information obtained by encrypting measurement information of the first network device.

Step 1802: The first network device sends the encrypted information to the second network device. The measurement information is used to verify system trustworthiness of the first network device, to obtain a verification result.

It should be noted that the embodiment shown in FIG. 18 may correspond to the foregoing embodiments shown in FIG. 5 to FIG. 8. The first network device may be the attester. In this case, the second network device may be the verifier, the RP, or a device (that is, the RP & verifier) in which the RP and the verifier are combined. Related implementations of the embodiment shown in FIG. 18 may correspond to related descriptions of the embodiments shown in FIG. 5 to FIG. 8.

In an example, this embodiment may further include: The first network device receives a verification result sent by the second network device. The verification result is a verification result of the system trustworthiness of the first network device.

In another example, this embodiment may further include: The first network device receives a verification result of system trustworthiness of the second network device sent by the second network device.

It may be understood that, in this embodiment, the first network device may further send identity information of the first network device to the second network device. The identity information is used to verify identity validity of the first network device. In this case, this embodiment may further include: The first network device receives a verification result of the identity validity of the first network device sent by the second network device. The method may further include: The first network device receives a verification result of identity validity of the second network device sent by the second network device.

It may be understood that the verification result of the system trustworthiness of the first network device is used to determine whether the first network device is allowed to access a network.

It should be noted that, the embodiments shown in FIG. 16 to FIG. 18 respectively correspond to the remote attestation methods provided in the embodiments of this application that are performed by the MASA, the RP or the verifier, and the attester side. For specific implementation, achieved effects, and descriptions of related concepts, refer to related descriptions of the embodiments shown in FIG. 5 to FIG. 8.

Figure 19:
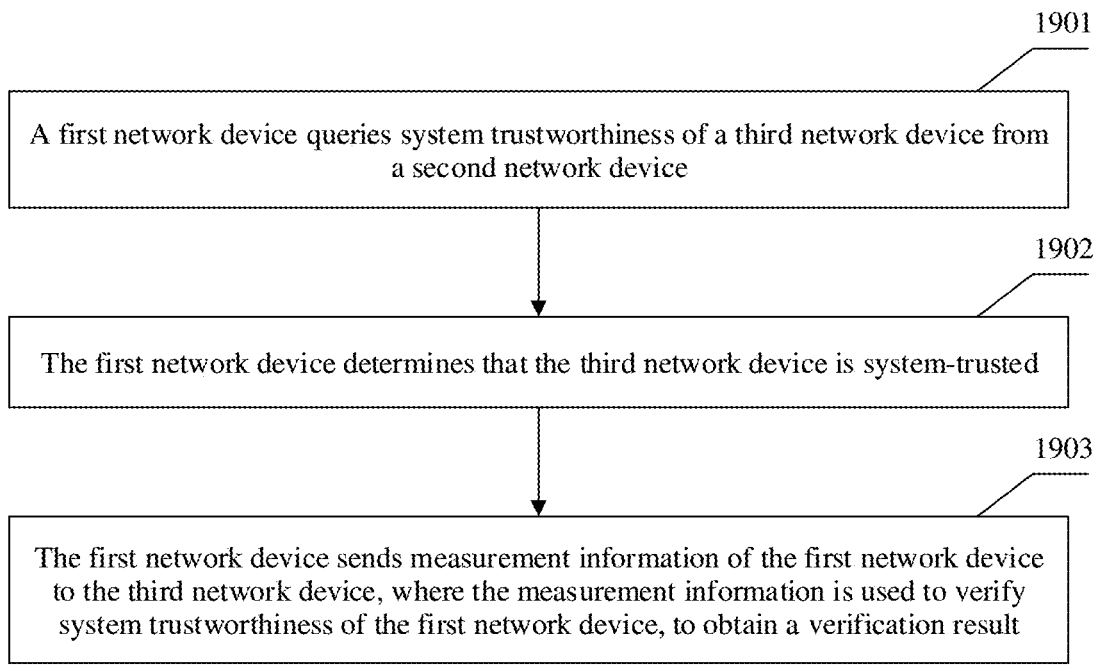
FIG. 19 is a schematic flowchart of a remote attestation method according to an embodiment of this application.

FIG. 19 is a schematic flowchart of another remote attestation method according to an embodiment of this application. The method is executed by a first network device. A specific remote attestation process may include the following steps.

Step 1901: The first network device queries system trustworthiness of a third network device from a second network device.

Step 1902: The first network device determines that the third network device is system-trusted.

Step 1903: The first network device sends measurement information of the first network device to the third network device. The measurement information is used to verify system trustworthiness of the first network device, to obtain a verification result.

It should be noted that the embodiment shown in FIG. 19 may correspond to the foregoing embodiments shown in FIG. 9 to FIG. 12. The first network device may be the attester, and the second network device may be the MASA. In this case, the third network device may be the verifier, the RP, or a device (that is, the RP & verifier) in which the RP and the verifier are combined. Related implementations of the embodiment shown in FIG. 19 may correspond to related descriptions of the embodiments shown in FIG. 9 to FIG. 12.

In an example, before the first network device sends the measurement information of the first network device to the third network device in this embodiment, the method may further include: The first network device queries system trustworthiness of a fourth network device from the second network device; and the first network device determines that the fourth network device is system-trusted. The third network device is configured to send the received measurement information to the fourth network device, and the fourth network device is configured to verify system trustworthiness of the first network device based on the measurement information.

In an example, before the first network device sends the measurement information of the first network device to the third network device in this embodiment, the method may further include: The first network device queries identity validity of the third network device and identity validity of the fourth network device from the second network device, and the first network device determines that an identity of the fourth network device is valid.

The first network device in this embodiment may further receive the verification result of the system trustworthiness of the first network device that is sent by the third network device.

In this embodiment, the first network device may further send identity information of the first network device to the third network device. The identity information is used to verify identity validity of the first network device.

The first network device in this embodiment may further receive a verification result of the identity validity of the first network device that is sent by the third network device.

It may be understood that the verification result of the system trustworthiness of the first network device is used to determine whether the first network device is allowed to access a network.

Figure 20:
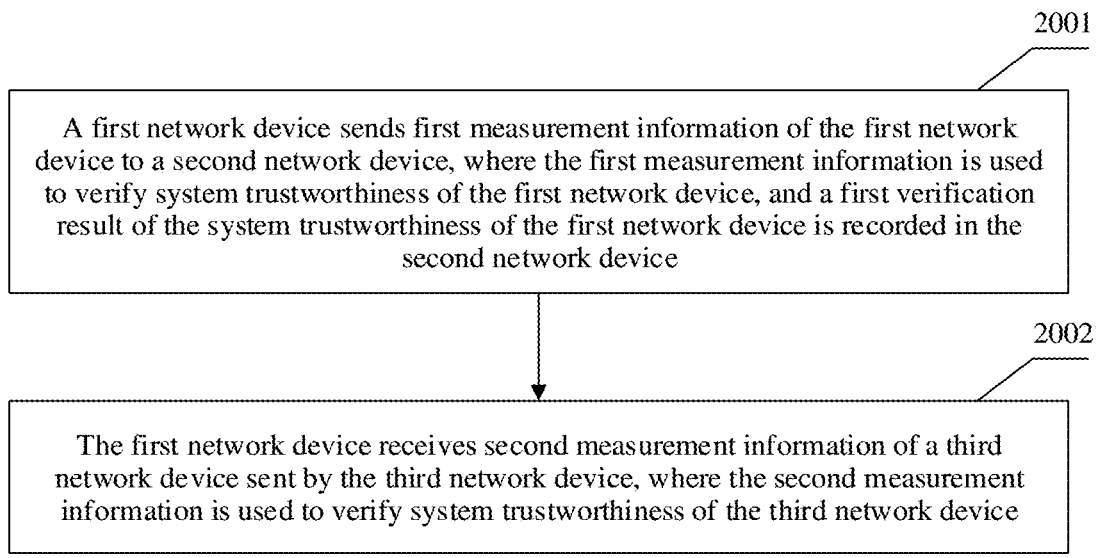
FIG. 20 is a schematic flowchart of another remote attestation method according to an embodiment of this application.

FIG. 20 is a schematic flowchart of another remote attestation method according to an embodiment of this application. The method is executed by a first network device. A specific remote attestation process may include the following steps.

Step 2001: The first network device sends first measurement information of the first network device to a second network device. The first measurement information is used to verify system trustworthiness of the first network device. A first verification result of the system trustworthiness of the first network device is recorded in the second network device.

Step 2002: The first network device receives second measurement information of a third network device sent by the third network device. The second measurement information is used to verify system trustworthiness of the third network device.

It should be noted that the embodiment shown in FIG. 20 may correspond to the foregoing embodiments shown in FIG. 9 to FIG. 12. The first network device may be the RP, the verifier, or a device (that is, the RP & verifier) in which the RP and the verifier are combined. In this case, the second network device may be the MASA, and the third network device may be the attester. Related implementations of the embodiment shown in FIG. 20 may correspond to related descriptions of the embodiments shown in FIG. 9 to FIG. 12.

For example, if the first network device is the RP, and a fourth network device is the verifier, this embodiment may further include: The first network device sends the second measurement information to the fourth network device. The fourth network device and the second network device may be a same device. In this case, the first network device may further verify system trustworthiness of the third network device based on the second measurement information.

In another example, this embodiment may further include: The first network device receives a second verification result sent by the fourth network device. The second verification result is a verification result of the system trustworthiness of the second network device. In this case, the first network device may further send a third verification result to the third network device. The third verification result is a verification result of the system trustworthiness of the third network device.

In still another example, this embodiment may further include: The first network device receives first identity information sent by the third network device; and the first network device verifies identity validity of the third network device based on the first identity information. In this case, the first network device may further send a fourth verification result to the third network device. The fourth verification result is a verification result of the identity validity of the third network device.

In still another example, this embodiment may further include: The first network device sends second identity information of the first network device to the second network device. The second identity information is used to verify identity validity of the first network device. A second verification result of the identity validity of the first network device is recorded in the second network device.

In another example, this embodiment may further include: The first network device determines, based on the verification result of the system trustworthiness of the third network device, whether to allow the third network device to access a network.

Figure 21:
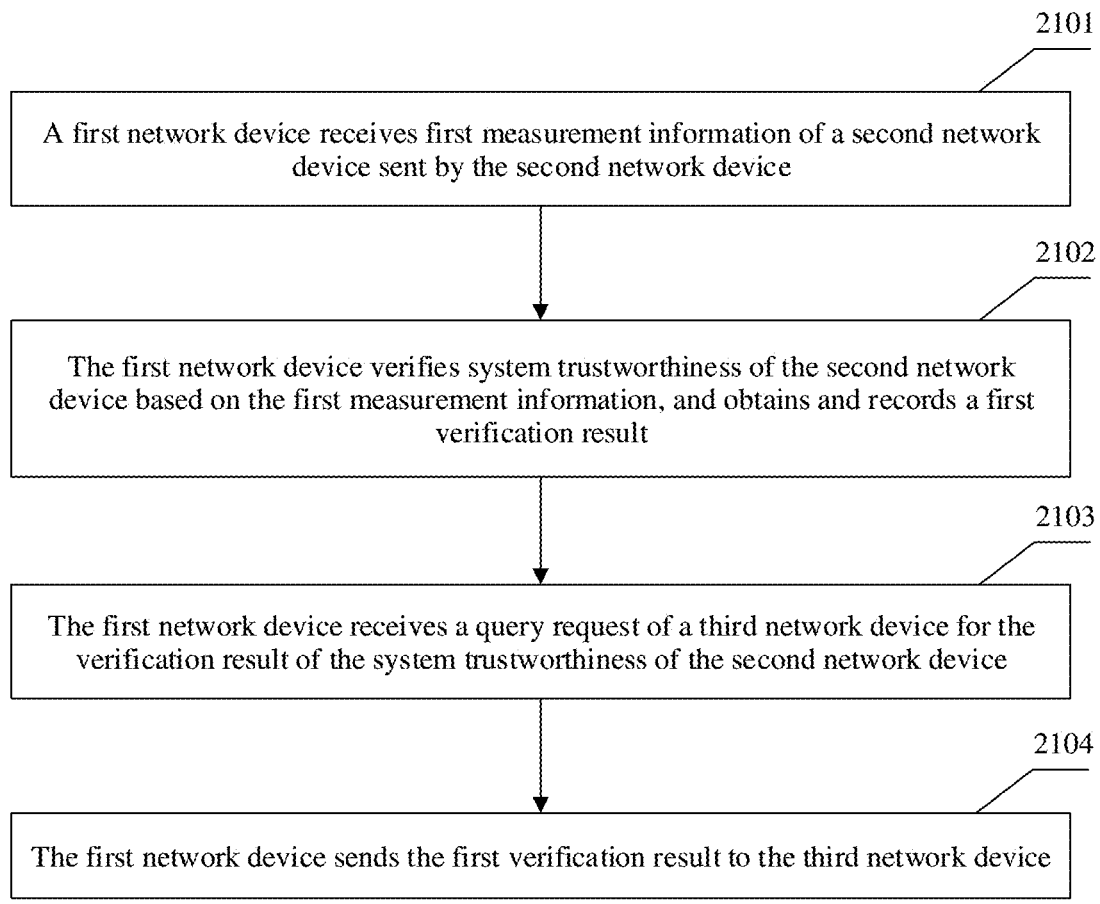
FIG. 21 is a schematic flowchart of still another remote attestation method according to an embodiment of this application.

FIG. 21 is a schematic flowchart of another remote attestation method according to an embodiment of this application. The method is executed by a first network device. A specific remote attestation process may include the following steps.

Step 2101: The first network device receives first measurement information of a second network device sent by the second network device.

Step 2102: The first network device verifies system trustworthiness of the second network device based on the first measurement information, to obtain a first verification result.

Step 2103: The first network device receives a query request of a third network device for the verification result of the system trustworthiness of the second network device.

Step 2104: The first network device sends the first verification result to the third network device.

It should be noted that the embodiment shown in FIG. 21 may correspond to the foregoing embodiments shown in FIG. 9 to FIG. 12. In a case, the first network device may be the MASA in the embodiments corresponding to FIG. 9 to FIG. 12. In this case, the second network device may be the verifier or the RP, or may be a device (that is, the RP & verifier) in which the RP and the verifier are combined, and the third network device may be the attester. In another case, the first network device may be the MASA & verifier. In this case, the second network device may be the RP, and the third network device may be the attester. Related implementations of the embodiment shown in FIG. 21 may correspond to related descriptions of the embodiments shown in FIG. 9 to FIG. 12.

In an example, this embodiment may further include: The first network device receives second measurement information of a fourth network device sent by the fourth network device; the first network device verifies system trustworthiness of the fourth network device based on the second measurement information, to obtain a second verification result; the first network device receives a query request of the third network device for the verification result of the system trustworthiness of the fourth network device; and the first network device sends the second verification result to the third network device. The second network device is configured to receive third measurement information of the third network device sent by the third network device, and send the third measurement information to the fourth network device. The fourth network device is configured to verify system trustworthiness of the third network device based on the third measurement information, to obtain a fifth verification result.

In another example, this embodiment may further include: The first network device receives first identity information of the second network device sent by the second network device and second identity information of the fourth network device sent by the fourth network device; the first network device verifies identity validity of the second network device based on the first identity information to obtain a third verification result, and verifies identity validity of the fourth network device based on the second identity information to obtain a fourth verification result; the first network device receives a query request of the third network device for the verification result of the identity validity of the second network device and a query request of the third network device for the verification result of the identity validity of the fourth network device; and the first network device sends the third verification result and the fourth verification result to the third network device.

In still another example, this embodiment may further include: The first network device receives third measurement information of the third network device that is sent by the third network device through the second network device; the first network device verifies system trustworthiness of the third network device based on the third measurement information; and the first network device sends a fifth verification result to the third network device. The fifth verification result is a verification result of the system trustworthiness of the third network device.

It may be understood that the verification result of the system trustworthiness of the third network device, that is, the fifth verification result, is used to determine whether the third network device is allowed to access a network.

It should be noted that, the embodiments shown in FIG. 19 to FIG. 21 respectively correspond to the remote attestation methods provided in the embodiments of this application that are performed by the MASA, the RP or the verifier, and the attester side. For specific implementation, achieved effects, and descriptions of related concepts, refer to related descriptions of the embodiments shown in FIG. 9 to FIG. 12.

Figure 22:
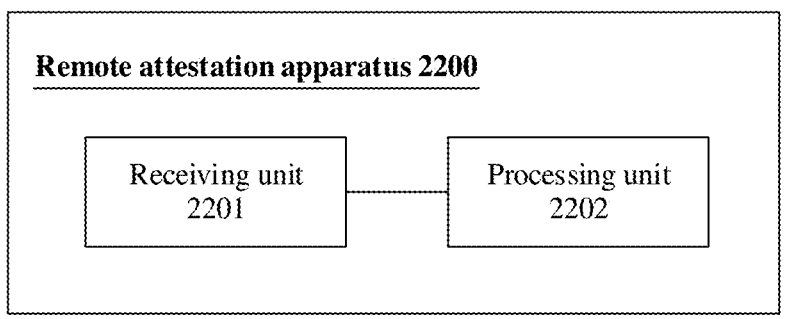
FIG. 22 is a schematic diagram of a structure of a remote attestation apparatus according to an embodiment of this application.

FIG. 22 is a schematic diagram of a structure of a remote attestation apparatus according to an embodiment of this application. The apparatus 2200 includes a receiving unit 2201 and a processing unit 2202.

The receiving unit 2201 is configured to receive encrypted information and first measurement information of a second network device through the second network device. The encrypted information is information obtained by encrypting second measurement information of a third network device.

The processing unit 2202 is configured to determine, based on the first measurement information, that the second network device is system-trusted, and decrypt the encrypted information to obtain the second measurement information.

In a specific implementation, the apparatus 2200 further includes a sending unit. The sending unit is configured to send the second measurement information to the second network device.

In an example, the receiving unit 2201 is specifically configured to receive a network configuration NETCONF protocol request message sent by the second network device, where the request message carries the encrypted information and the first measurement information. The sending unit is specifically configured to send a NETCONF protocol response message to the second network device, where the response message carries the second measurement information. The encrypted information and the first measurement information in the request message are described by using an Internet Engineering Task Force Yet Another Next Generation data model IETF YANG data model format. The first measurement information in the response message is described by using the IETF YANG data model format.

In another specific implementation, the processing unit 2202 is further configured to verify system trustworthiness of the third network device based on the second measurement information, to obtain a first verification result. The sending unit is further configured to send the first verification result to the second network device.

It may be understood that the first verification result is used to determine whether the third network device is allowed to access a network.

In an example, the receiving unit 2201 is specifically configured to receive a network configuration NETCONF protocol request message sent by the second network device, where the request message carries the encrypted information and the first measurement information. The sending unit is specifically configured to be used by a first network device to send a NETCONF protocol response message to the second network device, where the response message carries the first verification result. The encrypted information and the first measurement information in the request message are described by using an Internet Engineering Task Force Yet Another Next Generation data model IETF YANG data model format. The first verification result in the response message is described by using the IETF YANG data model format.

In still another specific implementation, the receiving unit 2201 is specifically configured to receive, through the second network device, the encrypted information sent by a fourth network device. In this case, the receiving unit 2201 is further configured to receive third measurement information of the fourth network device through the second network device. The processing unit 2202 is further configured to: before the first network device decrypts the encrypted information, determine system trustworthiness of the fourth network device based on the third measurement information.

In another specific implementation, the receiving unit 2201 is further configured to receive identity information sent by the second network device. In this case, the processing unit 2202 is further configured to: before the first network device decrypts the encrypted information, determine that an identity of the second network device is valid.

It may be understood that the receiving unit 2201 in the apparatus 2200 may be configured to perform steps corresponding to the receiving operation in the embodiment shown in FIG. 16, for example, step 1601. The processing unit 2202 may be configured to perform steps corresponding to operations such as determining and decrypting in the embodiment shown in FIG. 16, for example, step 1602 and step 1603.

It should be noted that the apparatus 2200 may correspond to the MASA in the method embodiments shown in FIG. 5 to FIG. 7, the MASA & verifier in the embodiment shown in FIG. 8, or the first network device in the method embodiment shown in FIG. 16. Therefore, for various possible implementations and technical effects of the apparatus 2200, refer to descriptions of the methods provided in the embodiments shown in FIG. 5 to FIG. 8 and FIG. 16.

Figure 23:
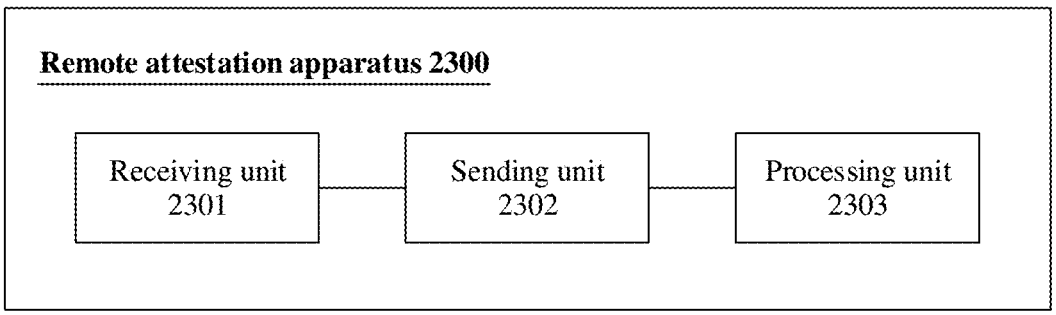
FIG. 23 is a schematic diagram of a structure of another remote attestation apparatus according to an embodiment of this application.

FIG. 23 is a schematic diagram of a structure of another remote attestation apparatus 2300 according to an embodiment of this application. The apparatus 2300 includes a receiving unit 2301, a sending unit 2302, and a processing unit 2303.

The receiving unit 2301 is configured to receive encrypted information sent by a second network device, where the encrypted information is information obtained by encrypting first measurement information of the second network device.

The sending unit 2302 is configured to send the encrypted information and second measurement information of the first network device to a third network device.

The receiving unit 2301 is further configured to receive indication information sent by the third network device.

The processing unit 2303 is configured to determine system trustworthiness of the second network device based on the indication information.

In a case, the indication information is a verification result of the system trustworthiness of the second network device.

In another case, the indication information is the first measurement information. In this case, the processing unit 2303 is specifically configured to verify the system trustworthiness of the second network device based on the first measurement information.

In an example, the sending unit 2302 is specifically configured to send a network configuration NETCONF protocol request message to the third network device, where the request message carries the encrypted information and the second measurement information. The receiving unit 2301 is specifically configured to receive a NETCONF protocol response message sent by the third network device, where the response message carries the indication information. The encrypted information and the second measurement information in the request message are described by using an Internet Engineering Task Force Yet Another Next Generation data model IETF YANG data model format. The indication information in the response message is described by using the IETF YANG data model format.

In a specific implementation, the receiving unit 2301 is specifically configured to receive, through a fourth network device, the encrypted information sent by the second network device. The receiving unit 2301 is further configured to receive third measurement information of the fourth network device sent by the fourth network device. The sending unit 2302 is further configured to send the third measurement information to the third network device.

In another specific implementation, the receiving unit 2301 is further configured to receive first identity information sent by the second network device. The processing unit 2303 is further configured to: before the first network device sends the encrypted information and the second measurement information of the first network device to the third network device, determine, based on the first identity information, that an identity of the second network device is valid.

In still another specific implementation, the receiving unit 2301 is further configured to receive second identity information sent by the fourth network device. The processing unit 2303 is further configured to: before the first network device sends the encrypted information and the second measurement information of the first network device to the third network device, determine that an identity of the fourth network device is valid.

In still another specific implementation, the sending unit 2302 is further configured to send third identity information of the first network device to the third network device.

In still another specific implementation, the processing unit 2303 is further configured to determine, based on the system trustworthiness of the second network device, whether to allow the second network device to access a network.

It may be understood that the receiving unit 2301 in the apparatus 2300 may be configured to perform steps corresponding to the receiving operation in the embodiment shown in FIG. 17, for example, step 1701 and step 1703. The processing unit 2303 may be configured to perform steps corresponding to operations such as determining in the embodiment shown in FIG. 17, for example, step 1704. The sending unit 2302 may be configured to perform steps corresponding to the sending operation in the embodiment shown in FIG. 17, for example, step 1702.

It should be noted that the apparatus 2300 may correspond to the RP or the verifier in the embodiment shown in FIG. 5 or FIG. 6A and FIG. 6B, the verifier in the method embodiment shown in FIG. 7, the RP in the embodiment shown in FIG. 8, or the first network device in the method embodiment shown in FIG. 17. Therefore, for various possible implementations and technical effects of the apparatus 2300, refer to descriptions of the methods provided in the embodiments corresponding to FIG. 5 to FIG. 8 and FIG. 17.

Figure 24:
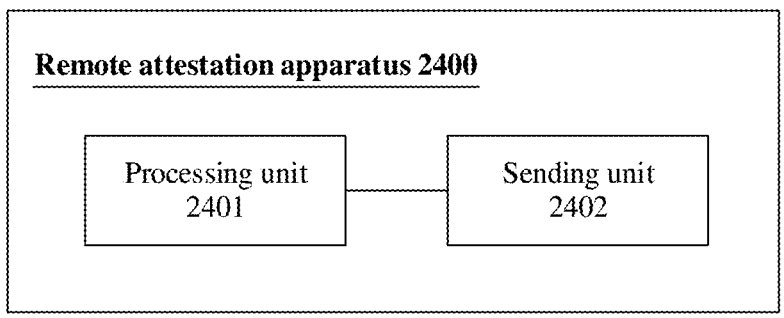
FIG. 24 is a schematic diagram of a structure of still another remote attestation apparatus according to an embodiment of this application.

FIG. 24 is a schematic diagram of a structure of a remote attestation apparatus according to an embodiment of this application. The apparatus 2400 includes a processing unit 2401 and a sending unit 2402.

The processing unit 2401 is configured to generate encrypted information. The encrypted information is information obtained by encrypting measurement information of a first network device.

The sending unit 2402 is configured to send the encrypted information to a second network device. The measurement information is used to verify system trustworthiness of the first network device, to obtain a verification result. It may be understood that the verification result is used to determine whether the first network device is allowed to access a network.

In a specific implementation, the sending unit 2402 is further configured to send identity information of the first network device to the second network device. The identity information is used to verify identity validity of the first network device.

It may be understood that the processing unit 2401 in the apparatus 2400 may be configured to perform steps corresponding to operations such as encryption in the embodiment shown in FIG. 18, for example, step 1801. The sending unit 2402 may be configured to perform steps corresponding to the sending operation in the embodiment shown in FIG. 18, for example, step 1802.

It should be noted that the apparatus 2400 may correspond to the attester in the embodiments shown in FIG. 5 to FIG. 8, or the first network device in the method embodiment shown in FIG. 18. Therefore, for various possible implementations and technical effects of the apparatus 2400, refer to descriptions of the methods provided in the embodiments corresponding to FIG. 5 to FIG. 8 and FIG. 18.

Figure 25:
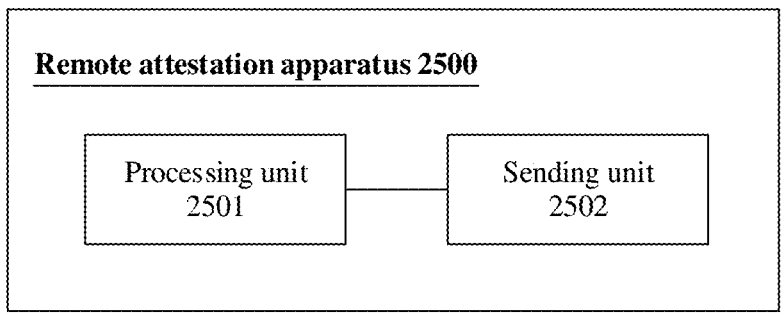
FIG. 25 is a schematic diagram of a structure of yet another remote attestation apparatus according to an embodiment of this application.

FIG. 25 is a schematic diagram of a structure of another remote attestation apparatus according to an embodiment of this application. The apparatus 2500 includes a processing unit 2501 and a sending unit 2502.

The processing unit 2501 is configured to be used by a first network device to query system trustworthiness of a third network device from a second network device, and determine that the third network device is system-trusted.

The sending unit 2502 is configured to send measurement information of the first network device to the third network device. The measurement information is used to verify system trustworthiness of the first network device, to obtain a verification result.

It may be understood that the verification result is used to determine whether the first network device is allowed to access a network.

In a specific implementation, the processing unit 2501 is further configured to: before the first network device sends the measurement information of the first network device to the third network device, query system trustworthiness of a fourth network device from the second network device; and determine that the fourth network device is system-trusted. The third network device is configured to send the received measurement information to the fourth network device, and the fourth network device is configured to verify the system trustworthiness of the first network device based on the measurement information.

In another specific implementation, the processing unit 2501 is further configured to: before the first network device sends the measurement information of the first network device to the third network device, query identity validity of the third network device and identity validity of the fourth network device from the second network device; and determine that an identity of the fourth network device is valid.

It may be understood that the processing unit 2501 in the apparatus 2500 may be configured to perform steps corresponding to operations such as query and determining in the embodiment corresponding to FIG. 19, for example, step 1901 and step 1902. The sending unit 2502 may be configured to perform steps corresponding to the sending operation in the embodiment corresponding to FIG. 19, for example, step 1903.

It should be noted that the apparatus 2500 may correspond to the attester in the method embodiments shown in FIG. 9 to FIG. 12, or the first network device in the method embodiment shown in FIG. 19. Therefore, for various possible implementations and technical effects of the apparatus 2500, refer to descriptions of the methods provided in the embodiments corresponding to FIG. 9 to FIG. 12 and FIG. 19.

Figure 26:
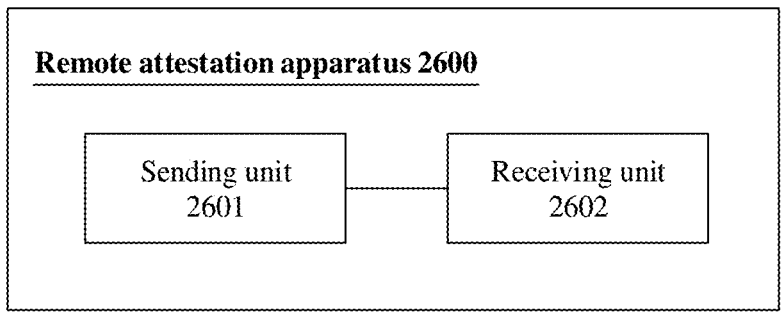
FIG. 26 is a schematic diagram of a structure of still another remote attestation apparatus according to an embodiment of this application.

FIG. 26 is a schematic diagram of a structure of a remote attestation apparatus according to an embodiment of this application. The apparatus 2600 includes a sending unit 2601 and a receiving unit 2602.

The sending unit 2601 is configured to send first measurement information of a first network device to a second network device. The first measurement information is used to verify system trustworthiness of the first network device, and a first verification result of the system trustworthiness of the first network device is recorded in the second network device.

The receiving unit 2602 is configured to receive second measurement information of a third network device sent by the third network device. The second measurement information is used to verify system trustworthiness of the third network device.

In a specific implementation, the sending unit 2601 is further configured to send the second measurement information to a fourth network device.

In another specific implementation, the fourth network device and the second network device are a same device.

In still another specific implementation, the receiving unit 2602 is further configured to receive a second verification result sent by the fourth network device. The second verification result is a verification result of system trustworthiness of the second network device.

In still another specific implementation, the apparatus 2600 further includes a processing unit. The processing unit is configured to verify system trustworthiness of the third network device based on the second measurement information.

In still another specific implementation, the receiving unit 2602 is further configured to receive first identity information sent by the third network device. The processing unit is further configured to verify identity validity of the third network device based on the first identity information.

In another specific implementation, the sending unit 2601 is further configured to send second identity information of the first network device to the second network device. The second identity information is used to verify identity validity of the first network device, and a second verification result of the identity validity of the first network device is recorded in the second network device.

In still another specific implementation, the processing unit is further configured to determine, based on a verification result of the system trustworthiness of the third network device, whether to allow the third network device to access a network.

It may be understood that the sending unit 2601 in the apparatus 2600 may be configured to perform steps corresponding to the sending operation in the embodiment shown in FIG. 20, for example, step 2001. The receiving unit 2602 may be configured to perform steps corresponding to the receiving operation in the embodiment shown in FIG. 20, for example, step 2002.

It should be noted that the apparatus 2600 may correspond to the RP or the verifier in the embodiment shown in FIG. 9 or FIG. 10, the verifier in the method embodiment shown in FIG. 11, the RP in the embodiment shown in FIG. 12, or the first network device in the method embodiment shown in FIG. 20. Therefore, for various possible implementations and technical effects of the apparatus 2600, refer to descriptions of the methods provided in the embodiments corresponding to FIG. 9 to FIG. 12 and FIG. 20.

Figure 27:
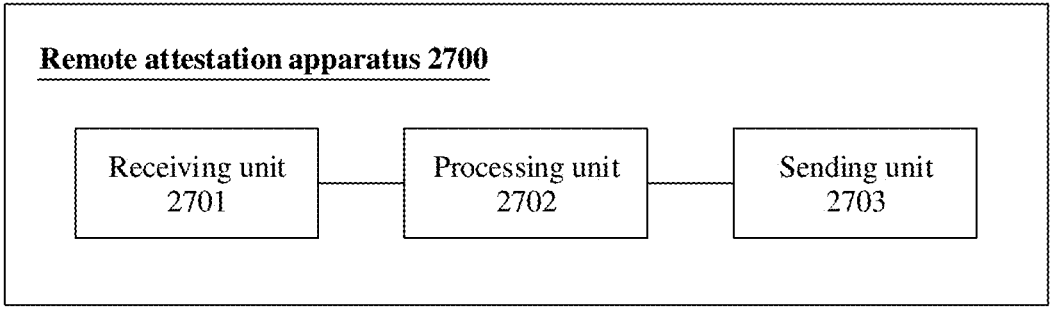
FIG. 27 is a schematic diagram of a structure of another remote attestation apparatus according to an embodiment of this application.

FIG. 27 is a schematic diagram of a structure of another remote attestation apparatus according to an embodiment of this application. The apparatus 2700 includes a receiving unit 2701, a processing unit 2702, and a sending unit 2703.

The receiving unit 2701 is configured to receive first measurement information of a second network device sent by the second network device.

The processing unit 2702 is configured to verify system trustworthiness of the second network device based on the first measurement information, to obtain a first verification result.

The receiving unit 2701 is further configured to receive a query request of a third network device for a verification result of the system trustworthiness of the second network device.

The sending unit 2703 is configured to send the first verification result to the third network device.

In a specific implementation, the receiving unit 2701 is further configured to receive second measurement information of a fourth network device sent by the fourth network device. The processing unit 2702 is further configured to verify system trustworthiness of the fourth network device based on the second measurement information, to obtain a second verification result. The receiving unit 2701 is further configured to receive a query request of the third network device for the verification result of the system trustworthiness of the fourth network device. The sending unit 2703 is further configured to send the second verification result to the third network device. The second network device is configured to receive third measurement information of the third network device sent by the third network device, and send the third measurement information to the fourth network device. The fourth network device is configured to verify system trustworthiness of the third network device based on the third measurement information, to obtain a fifth verification result.

It may be understood that the fifth verification result is used to determine whether the third network device is allowed to access a network.

In another specific implementation, the receiving unit 2701 is further configured to receive first identity information of the second network device sent by the second network device and second identity information of the fourth network device sent by the fourth network device. The processing unit 2702 is further configured to: verify system trustworthiness of the second network device based on the first identity information to obtain a third verification result, and verify system trustworthiness of the fourth network device based on the second identity information to obtain a fourth verification result. The receiving unit 2701 is further configured to receive a query request of the third network device for the verification result of the identity validity of the second network device and a query request of the third network device for the verification result of the identity validity of the fourth network device. The sending unit 2703 is further configured to send the third verification result and the fourth verification result to the third network device.

In still another specific implementation, the receiving unit 2701 is further configured to receive third measurement information of the third network device that is sent by the third network device through the second network device. The processing unit 2702 is further configured to verify system trustworthiness of the third network device based on the third measurement information. The sending unit 2703 is further configured to send a fifth verification result to the third network device. The fifth verification result is a verification result of the system trustworthiness of the third network device.

It may be understood that the receiving unit 2701 in the apparatus 2700 may be configured to perform steps corresponding to the receiving operation in the embodiment shown in FIG. 21, for example, step 2101 and step 2103. The processing unit 2702 may be configured to perform steps corresponding to operations such as verification in the embodiment shown in FIG. 21, for example, step 2102. The sending unit 2703 may be configured to perform steps corresponding to the sending operation in the embodiment shown in FIG. 21, for example, step 2104.

It should be noted that the apparatus 2700 may correspond to the MASA in the embodiments shown in FIG. 9 to FIG. 1*i*, the MASA & verifier in the method embodiment shown in FIG. 12, or the first network device in the method embodiment shown in FIG. 21. Therefore, for various possible implementations and technical effects of the apparatus 2700, refer to descriptions of the methods provided in the embodiments shown in FIG. 9 to FIG. 12 and FIG. 21.

Figure 28:
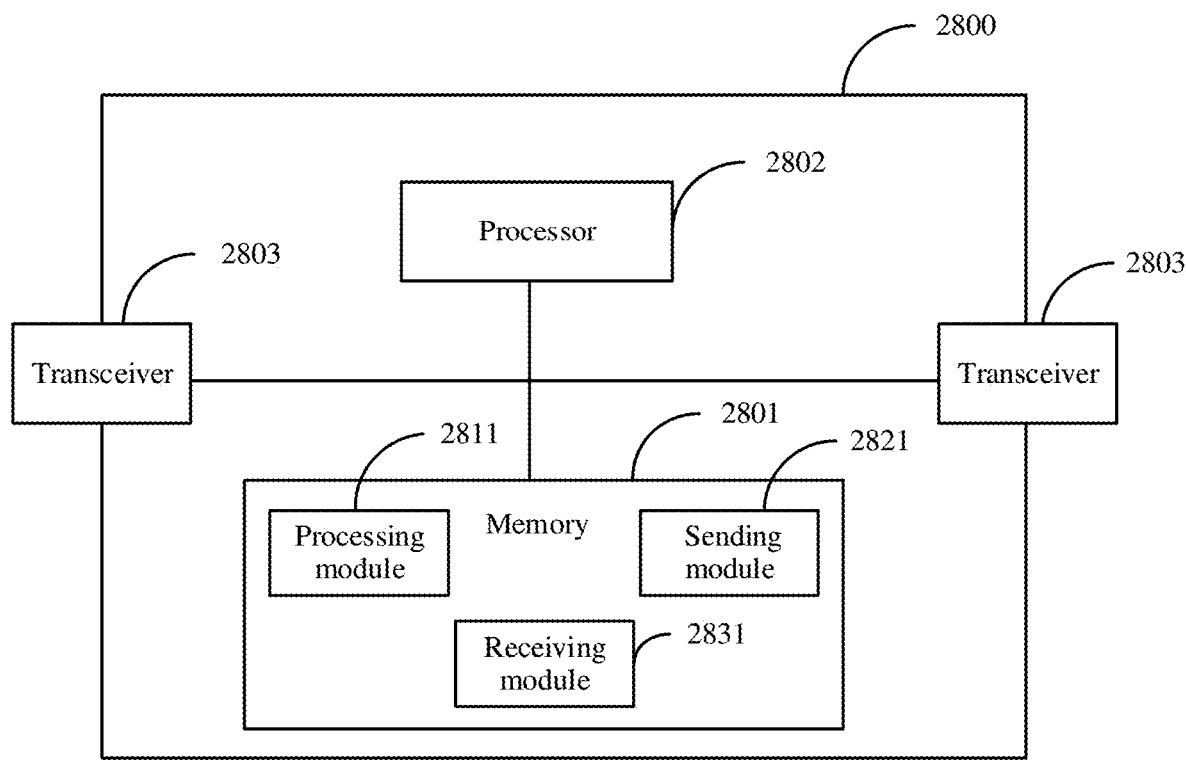
FIG. 28 is a schematic diagram of a structure of a network device according to an embodiment of this application.

In addition, the embodiments of this application further provide a network device 2800. As shown in FIG. 28, the network device 2800 includes a memory 2801, a processor 2802, and a transceiver 2803. The memory 2801, the processor 2802, and the transceiver 2803 may be communicatively connected through a bus. The transceiver may be, for example, an optical module.

In some possible implementations, the memory 2801 in the network device 2800 is configured to store program code. The processor 2802 is configured to run instructions in the program code, to enable the network device 2800 to perform the following operations: receiving encrypted information and first measurement information of a second network device through the second network device, where the encrypted information is information obtained by encrypting second measurement information of a third network device; determining, based on the first measurement information, that the second network device is system-trusted; and decrypting the encrypted information to obtain the second measurement information.

In a specific implementation, the processor 2802 is further configured to run an instruction in the program code, to enable the network device 2800 to perform the following operation: sending the second measurement information to the second network device.

In an example of this implementation, the receiving encrypted information and first measurement information of a second network device through the second network device is specifically: receiving a network configuration NETCONF protocol request message sent by the second network device, where the request message carries the encrypted information and the first measurement information. The sending the second measurement information to the second network device is specifically: The first network device sends a NETCONF protocol response message to the second network device, where the response message carries the second measurement information. It may be understood that, the encrypted information and the first measurement information in the request message are described by using an Internet Engineering Task Force Yet Another Next Generation data model IETF YANG data model format, and the first measurement information in the response message is described by using the IETF YANG data model format.

In another implementation, the processor 2802 is further configured to run instructions in the program code, to enable the network device 2800 to perform the following operations: verifying system trustworthiness of the third network device based on the second measurement information, to obtain a first verification result; and sending the first verification result to the second network device. The first network device is a MASA & verifier, and the second network device is an RP. In this way, the first network device may verify the system trustworthiness of the third network device based on the second measurement information, and send the verification result to the second network device, so that a user can view the system trustworthiness of the third network device by using the second network device.

In an example of this implementation, the receiving encrypted information and first measurement information of a second network device through the second network device is specifically: receiving a network configuration NETCONF protocol request message sent by the second network device, where the request message carries the encrypted information and the first measurement information. The sending the first verification result to the second network device is specifically: sending a NETCONF protocol response message to the second network device, where the response message carries the first verification result. It may be understood that, the encrypted information and the first measurement information in the request message are described by using an Internet Engineering Task Force Yet Another Next Generation data model IETF YANG data model format, and the first verification result in the response message is described by using the IETF YANG data model format.

In still another implementation, the receiving encrypted information through the second network device is specifically: receiving, through the second network device, the encrypted information sent by a fourth network device. The processor 2802 is further configured to run an instruction in the program code, to enable the network device 2800 to perform the following step: receiving third measurement information of the fourth network device through the second network device. Before decrypting the encrypted information, the network device 2800 is further configured to: determine, based on the third measurement information, that a system of the fourth network device is trusted.

In still another implementation, the processor 2802 is further configured to run an instruction in the program code, to enable the network device 2800 to perform the following step: receiving identity information sent by the second network device. Correspondingly, before the network device 2800 decrypts the encrypted information, the processor 2802 is further configured to run an instruction in the program code, to enable the network device 2800 to perform the following step: determining, based on the identity information, that an identity of the second network device is valid.

In an example, the first verification result may be used to determine whether the third network device is allowed to access a network. Specifically, when the first verification result indicates that the third network device is system-trusted, it is determined that the third network device is allowed to access the network. Otherwise, when the first verification result indicates that the third network device is system-untrusted, it is determined that the third network device is not allowed to access the network.

It should be noted that, for this possible implementation, the network device 2800 may correspond to the MASA in the method embodiments shown in FIG. 5 to FIG. 7, the MASA & verifier in the embodiment shown in FIG. 8, or the first network device in the method embodiment shown in FIG. 16. Therefore, for various possible implementations and technical effects of the network device 2800, refer to descriptions of the methods provided in the embodiments shown in FIG. 5 to FIG. 8 and FIG. 16.

In other possible implementations, the memory 2801 in the network device 2800 is configured to store program code. The processor 2802 is configured to run instructions in the program code, to enable the network device to perform the following operations: receiving encrypted information sent by a second network device, where the encrypted information is information obtained by encrypting first measurement information of the second network device; sending the encrypted information and second measurement information of the first network device to a third network device; receiving indication information sent by the third network device; and determining system trustworthiness of the second network device based on the indication information.

In an implementation, the indication information may be a verification result of the system trustworthiness of the second network device.

In another implementation, the indication information may be the first measurement information. Correspondingly, the processor 2802 is specifically configured to run an instruction in the program code, to enable the network device to verify system trustworthiness of the second network device based on the first measurement information.

The sending the encrypted information and second measurement information of the third network device to a third network device is specifically: sending a network configuration NETCONF protocol request message to the third network device, where the request message carries the encrypted information and the second measurement information. The receiving the first verification result sent by the third network device is specifically: receiving a NETCONF protocol response message sent by the third network device, where the response message carries the indication information. In an example, the encrypted information and the second measurement information in the request message are described by using an Internet Engineering Task Force Yet Another Next Generation data model IETF YANG data model format. The indication information in the response message is described by using the IETF YANG data model format.

In still another implementation, the receiving encrypted information sent by a second network device is specifically: receiving, through a fourth network device, the encrypted information sent by the second network device. Correspondingly, the processor 2802 is specifically configured to run instructions in the program code, to enable the network device 2800 to perform the following operations: receiving third measurement information of the fourth network device sent by the fourth network device; and send the third measurement information to the third network device by using the transceiver 2803.

In still another implementation, the processor 2802 is further configured to run an instruction in the program code, to enable the network device to perform the following operation: receiving first identity information sent by the second network device. In this case, before the first network device sends the encrypted information and the second measurement information of the first network device to the third network device, the processor 2802 is further configured to run an instruction in the program code, to enable the network device to perform the following operation: determining, based on the first identity information, that an identity of the second network device is valid.

In another implementation, the processor 2802 is further configured to run an instruction in the program code, to enable the network device 2800 to perform the following operation: receiving second identity information sent by the fourth network device. In this case, before the first network device sends the encrypted information and the second measurement information of the first network device to the third network device, the network device 2800 further performs the following operations: receiving, by using the transceiver 2803, the second identity information sent by the fourth network device, and determining, based on the second identity information, that an identity of the fourth network device is valid.

In still another implementation, the processor 2802 is further configured to run an instruction in the program code, to enable the network device 2800 to perform the following operation: sending third identity information of the first network device to the third network device. The third identity information is used to verify identity validity of the first network device.

It may be understood that, in this embodiment, the first network device may further determine, based on the system trustworthiness of the second network device, whether to allow the second network device to access a network.

It should be noted that, for this possible implementation, the network device 2800 may correspond to the RP or the verifier in the embodiment shown in FIG. 5 or FIG. 6A and FIG. 6B, the verifier in the method embodiment shown in FIG. 7, the RP in the embodiment shown in FIG. 8, or the first network device in the method embodiment shown in FIG. 17. Therefore, for various possible implementations and technical effects of the network device 2800, refer to descriptions of the methods provided in the embodiments corresponding to FIG. 5 to FIG. 8 and FIG. 17.

In other possible implementations, the memory 2801 in the network device 2800 is configured to store program code. The processor 2802 is configured to run instructions in the program code, to enable the network device 2800 to perform the following operations: generating encrypted information, where the encrypted information is information obtained by encrypting measurement information of a first network device; and sending the encrypted information to a second network device, where the measurement information is used to verify system trustworthiness of the first network device, to obtain a verification result.

In an implementation, the processor 2802 is further configured to run an instruction in the program code, to enable the network device 2800 to perform the following operation: sending identity information of the first network device to the second network device, where the identity information is used to verify identity validity of the first network device.

The verification result may be used to determine whether the first network device is allowed to access a network.

It should be noted that, for this possible implementation, the network device 2800 may correspond to the attester in the embodiments shown in FIG. 5 to FIG. 8, or the first network device in the method embodiment shown in FIG. 18. Therefore, for various possible implementations and technical effects of the network device 2800, refer to descriptions of the methods provided in the embodiments corresponding to FIG. 5 to FIG. 8 and FIG. 18.

Figure 29:
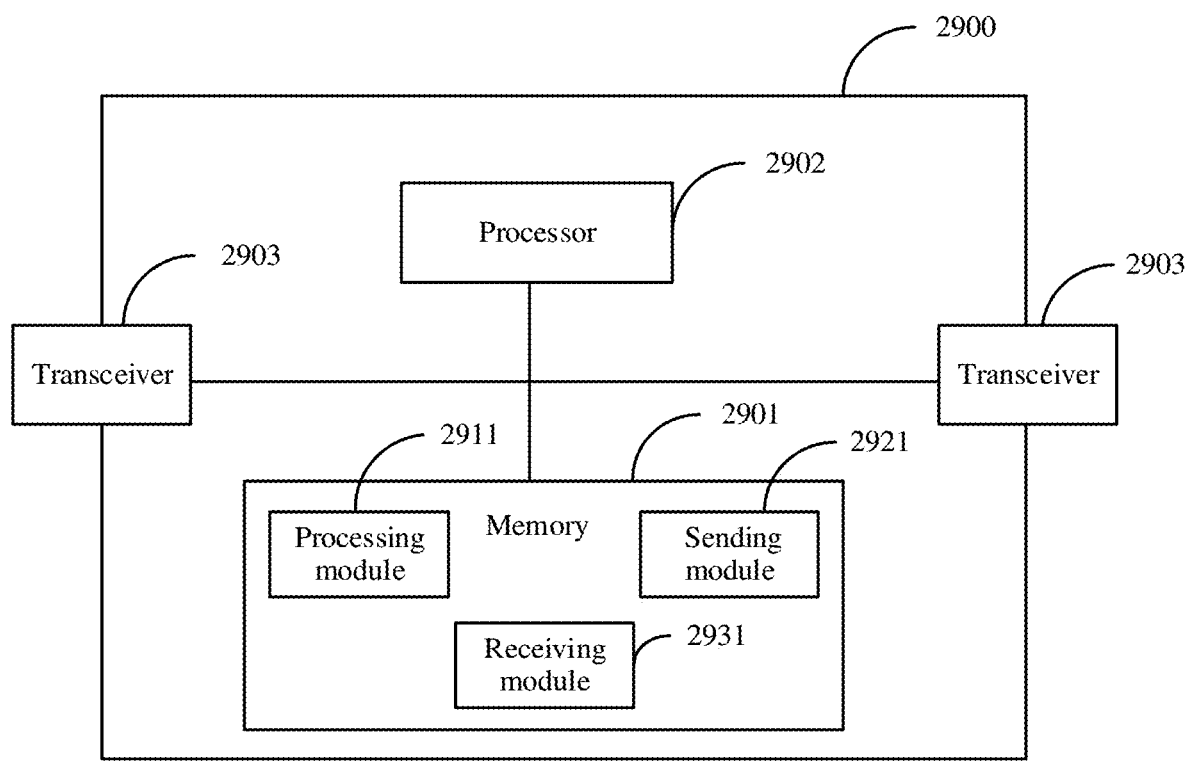
FIG. 29 is a schematic diagram of a structure of another network device according to an embodiment of this application.

In addition, the embodiments of this application further provide a network device 2900. As shown in FIG. 29, the network device 2900 includes a memory 2901, a processor 2902, and a transceiver 2903. The memory 2901, the processor 2902, and the transceiver 2903 may be communicatively connected through a bus. The transceiver 2903 may be, for example, an optical module.

In some possible implementations, the memory 2901 in the network device 2900 is configured to store program code. The processor 2902 is configured to run instructions in the program code, to enable the network device 2900 to perform the following operations: querying system trustworthiness of a third network device from a second network device; determining that the third network device is system-trusted; and sending measurement information of a first network device to the third network device, where the measurement information is used to verify system trustworthiness of the first network device, to obtain a verification result.

In an implementation, before the sending measurement information of a first network device to the third network device, the processor 2902 is further configured to run instructions in the program code, to enable the network device 2900 to perform the following operations: querying system trustworthiness of a fourth network device from the second network device; and determining that the fourth network device is system-trusted. The third network device is configured to send the received measurement information to the fourth network device, and the fourth network device is configured to verify the system trustworthiness of the first network device based on the measurement information.

In an implementation, before the sending measurement information of a first network device to the third network device, the processor 2902 is further configured to run instructions in the program code, to enable the network device 2900 to perform the following operations: querying identity validity of the third network device and identity validity of the fourth network device from the second network device; and determining that an identity of the fourth network device is valid.

It may be understood that the verification result of the system trustworthiness of the first network device is used to determine whether the first network device is allowed to access a network.

It should be noted that, for this possible implementation, the network device 2900 may correspond to the attester in the method embodiments shown in FIG. 9 to FIG. 12, or the first network device in the method embodiment shown in FIG. 19. Therefore, for various possible implementations and technical effects of the network device 2900, refer to descriptions of the methods provided in the embodiments corresponding to FIG. 9 to FIG. 12 and FIG. 19.

In other possible implementations, the memory 2901 in the network device 2900 is configured to store program code. The processor 2902 is configured to run instructions in the program code, to enable the network device 2900 to perform the following operations: sending first measurement information of a first network device to a second network device, where the first measurement information is used to verify system trustworthiness of the first network device, and a first verification result of the system trustworthiness of the first network device is recorded in the second network device; and receiving second measurement information of a third network device sent by the third network device, where the second measurement information is used to verify system trustworthiness of the third network device.

In an implementation, the processor 2902 is further configured to run an instruction in the program code, to enable the network device 2900 to send the second measurement information to a fourth network device.

In this embodiment, the fourth network device and the second network device are a same device.

In another implementation, the processor 2902 is further configured to run an instruction in the program code, to enable the network device 2900 to receive a second verification result sent by the fourth network device, where the second verification result is a verification result of system trustworthiness of the second network device.

In an implementation, the processor 2902 is further configured to run an instruction in the program code, to enable the network device 2900 to verify system trustworthiness of the third network device based on the second measurement information.

In still another specific implementation, the processor 2902 is further configured to run an instruction in the program code, to enable the network device 2900 to receive first identity information sent by the third network device. The first network device verifies identity validity of the third network device based on the first identity information.

In another implementation, the processor 2902 is further configured to run an instruction in the program code, to enable the network device 2900 to send second identity information of the first network device to the second network device. The second identity information is used to verify identity validity of the first network device, and a second verification result of the identity validity of the first network device is recorded in the second network device.

In still another implementation, the processor 2902 is further configured to run an instruction in the program code, to enable the network device 2900 to determine, based on a verification result of the system trustworthiness of the third network device, whether to allow the third network device to access a network.

It should be noted that, for this possible implementation, the network device 2900 may correspond to the RP or the verifier in the embodiment shown in FIG. 9 or FIG. 10, the verifier in the method embodiment shown in FIG. 1*i*, the RP in the embodiment shown in FIG. 12, or the first network device in the method embodiment shown in FIG. 20. Therefore, for various possible implementations and technical effects of the network device 2900, refer to descriptions of the methods provided in the embodiments corresponding to FIG. 9 to FIG. 12 and FIG. 20.

In other possible implementations, the memory 2901 in the network device 2900 is configured to store program code. The processor 2902 is configured to run instructions in the program code, to enable the network device 2900 to perform the following operations: receiving first measurement information of a second network device sent by the second network device; verifying system trustworthiness of the second network device based on the first measurement information, to obtain a first verification result; and receiving a query request of a third network device for the verification result of the system trustworthiness of the second network device; and sending, by the first network device, the first verification result to the third network device.

In an implementation, the processor 2902 is further configured to run instructions in the program code, to enable the network device 2900 to perform the following operations: receiving second measurement information of a fourth network device sent by the fourth network device; verifying system trustworthiness of the fourth network device based on the second measurement information, to obtain a second verification result; receiving a query request of the third network device for the verification result of the system trustworthiness of the fourth network device; and sending the second verification result to the third network device by using the transceiver 2903. The second network device is configured to receive third measurement information of the third network device sent by the third network device, and send the third measurement information to the fourth network device. The fourth network device is configured to verify system trustworthiness of the third network device based on the third measurement information, to obtain a fifth verification result.

It may be understood that the fifth verification result is used to determine whether the third network device is allowed to access a network.

In another implementation, the processor 2902 is further configured to run instructions in the program code, to enable the network device 2900 to perform the following steps: receiving first identity information of the second network device sent by the second network device and second identity information of a fourth network device sent by the fourth network device; verifying system trustworthiness of the second network device based on the first identity information to obtain a third verification result, and verifying system trustworthiness of the fourth network device based on the second identity information to obtain a fourth verification result; receiving a query request of the third network device for the verification result of the identity validity of the second network device and a query request of the third network device for the verification result of the identity validity of the fourth network device; and sending the third verification result and the fourth verification result to the third network device.

In still another implementation, the processor 2902 is further configured to run instructions in the program code, to enable the network device 2900 to perform the following steps: receiving third measurement information of the third network device that is sent by the third network device through the second network device; verifying system trustworthiness of the third network device based on the third measurement information; and sending a fifth verification result to the third network device, where the fifth verification result is a verification result of the system trustworthiness of the third network device.

It should be noted that, for this possible implementation, the network device 2900 may correspond to the MASA in the embodiments shown in FIG. 9 to FIG. 1*i*, the MASA & verifier in the method embodiment shown in FIG. 12, or the first network device in the method embodiment shown in FIG. 21. Therefore, for various possible implementations and technical effects of the network device 2900, refer to descriptions of the methods provided in the embodiments shown in FIG. 9 to FIG. 12 and FIG. 21.

In the network device 2800 and the network device 2900 in this application, the processor 2802/2902 may be a central processing unit (CPU), a network processor (NP), or a combination of a CPU and an NP. Alternatively, the processor 2802/2902 may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor 2802/2902 may be one processor, or may include a plurality of processors. The memory 2801/2901 may include a volatile memory, for example, a random access memory (RAM). Alternatively, the memory 2801/2901 may include a non-volatile memory, for example, a read-only memory (ROM), a flash memory, a hard disk drive (HDD), or a solid-state drive (SSD). Alternatively, the memory 2801/2901 may include a combination of the foregoing types of memories. The memory 2801/2901 may refer to one memory, or may include a plurality of memories. In a specific implementation, the memory 2801/2901 stores computer-readable instructions. The computer-readable instructions include a plurality of software modules, for example, a sending module 2821/2921, a processing module 2811/2911, and a receiving module 2831/2931. After executing each software module, the processor 2802/2902 may perform a corresponding operation according to an indication of each software module. In this embodiment, an operation performed by a software module is actually an operation performed by the processor 2802/2902 according to an indication of the software module. After executing the computer-readable instructions in the memory 2801/2901, the processor 2802/2902 may perform, based on indications of the computer-readable instructions, all operations that may be performed by the network device 2800/2900.

Figure 30:
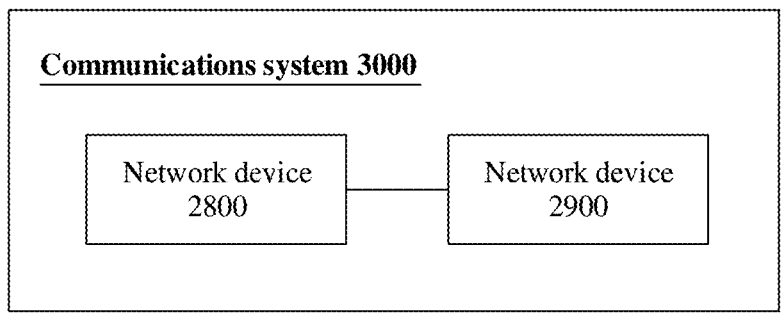
FIG. 30 is a schematic diagram of a structure of a communications system according to an embodiment of this application.

In addition, the embodiments of this application further provide a communications system 3000. As shown in FIG. 30, the communications system 300 may include the foregoing network device 280*o* and the network device 2900, configured to perform the remote attestation method in any implementation of the embodiments corresponding to FIG. 5 to FIG. 12 and FIG. 16 to FIG. 21.

In addition, the embodiments of this application further provide a computer program product. When the computer program product runs on a computer, the computer is enabled to perform the remote attestation method in any implementation of the embodiments corresponding to FIG. 5 to FIG. 12 and FIG. 16 to FIG. 21.

In addition, the embodiments of this application further provide a computer-readable storage medium. The computer-readable storage medium stores instructions. When the instructions run on a computer, the computer is enabled to perform the remote attestation method in any implementation of the embodiments corresponding to FIG. 5 to FIG. 12 and FIG. 16 to FIG. 21.

In the embodiments of this application, "first" in names such as "first network device" and "first measurement information" is merely used for name identification, and does not represent the first in sequence. The same rule applies to other ordinal numbers such as "second".

It can be learned from the foregoing descriptions of the implementations that, a person skilled in the art may clearly understand that a part or all of the steps of the methods in the foregoing embodiments may be implemented by using software and a universal hardware platform. Based on such an understanding, the technical solutions of this application may be implemented in a form of a software product. The computer software product may be stored in a storage medium, for example, a read-only memory (English: read-only memory, ROM)/RAM, a magnetic disk, or an optical disc, and include several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, apparatus and device embodiments are basically similar to a method embodiment, and therefore is described briefly. For related parts, refer to partial descriptions in the method embodiment. The described device and apparatus embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first network device, comprising:
a non-transitory memory; and
a processor;
wherein the non-transitory memory is configured to store program code; and
wherein the processor is configured to run instructions in the program code, causing the first network device to perform the following:
receiving encrypted information and first measurement information of a second network device from the second network device, wherein the encrypted information is information obtained by encrypting second measurement information of a third network device, the first measurement information of the second network device comprises one or more measurement values collected during running of the second network device, the second measurement information of the third network device comprises one or more measurement values collected during running of the third network device, and the second network device and the third network device are different network devices;
determining, based on the first measurement information, that the second network device is system-trusted;
decrypting the encrypted information to obtain the second measurement information; and
sending the second measurement information to the second network device.

2. The first network device according to claim 1, wherein:
receiving the encrypted information and the first measurement information of the second network device from the second network device comprises receiving a network configuration (NETCONF) protocol request message sent by the second network device, wherein the request message carries the encrypted information and the first measurement information; and
sending the second measurement information to the second network device comprises sending a NETCONF protocol response message to the second network device, wherein the response message carries the second measurement information.

3. The first network device according to claim 2, wherein:
the encrypted information and the first measurement information in the request message use an Internet Engineering Task Force Yet Another Next Generation data model (IETF YANG) data model format; and
the first measurement information in the response message uses the IETF YANG data model format.

4. The first network device according to claim 1, wherein receiving the encrypted information from the second network device comprises:
receiving, through the second network device, the encrypted information sent by a fourth network device; and
wherein running the instructions in the program code further causes the first network device to perform the following:
receiving third measurement information of the fourth network device through the second network device; and
before decrypting the encrypted information, determining, based on the third measurement information, that the fourth network device is system-trusted.

5. The first network device according to claim 1, wherein running the instructions in the program code further causes the first network device to perform the following:
receiving identity information sent by the second network device; and
before decrypting the encrypted information, determining, based on the identity information, that an identity of the second network device is valid.

6. A first network device, comprising:
a non-transitory memory; and
a processor;
wherein the non-transitory memory is configured to store program code; and wherein the processor is configured to run instructions in the program code, causing the first network device to perform the following:
receiving encrypted information sent by a second network device, wherein the encrypted information is information obtained by encrypting first measurement information of the second network device, the first measurement information of the second network device comprises one or more measurement values collected during running of the second network device;
sending the encrypted information and second measurement information of the first network device to a third network device, wherein the second measurement information of the first network device comprises one or more measurement values collected during running of the first network device, and the second network device and the first network device are different network devices;
receiving indication information sent by the third network device; and
determining system trustworthiness of the second network device based on the indication information;
wherein the indication information is the first measurement information, and wherein determining system trustworthiness of the second network device based on the indication information comprises:
verifying the system trustworthiness of the second network device based on the first measurement information.

7. The first network device according to claim 6, wherein receiving the encrypted information sent by the second network device comprises receiving, by the first network device through a fourth network device, the encrypted information sent by the second network device; and
wherein running the instructions in the program code further causes the first network device to perform the following:
receiving third measurement information of the fourth network device sent by the fourth network device; and
sending the third measurement information to the third network device.

8. The first network device according to claim 7, wherein running the instructions in the program code further causes the first network device to perform the following:
receiving second identity information sent by the fourth network device; and
before sending the encrypted information and the second measurement information of the first network device to the third network device, determining based on the second identity information, that an identity of the fourth network device is valid.

9. The first network device according to claim 6, wherein running the instructions in the program code further causes the first network device to perform the following:
sending, by the first network device, third identity information of the first network device to the third network device.

10. The first network device according to claim 6, wherein:
sending the encrypted information and the second measurement information of the first network device to the third network device comprises sending a network configuration (NETCONF) protocol request message to the third network device, wherein the request message carries the encrypted information and the second measurement information; and
wherein receiving the indication information sent by the third network device comprises receiving a NETCONF protocol response message sent by the third network device, wherein the response message carries the indication information.

11. A non-transitory computer-readable storage medium, wherein the non-transitory computer-readable storage medium stores instructions, and when the instructions are run on a computer, the computer is caused to perform the following:
receiving encrypted information and first measurement information of a second network device from the second network device, wherein the encrypted information is information obtained by encrypting second measurement information of a third network device, the first measurement information of the second network device comprises one or more measurement values collected during running of the second network device, the second measurement information of the third network device comprises one or more measurement values collected during running of the third network device, and the second network device and the third network device are different network devices;
determining, based on the first measurement information, that the second network device is system-trusted;
decrypting the encrypted information to obtain the second measurement information; and
sending the second measurement information to the second network device.

12. The non-transitory computer-readable storage medium according to claim 11, wherein:
receiving the encrypted information and the first measurement information of the second network device from the second network device comprises receiving a network configuration (NETCONF) protocol request message sent by the second network device, wherein the request message carries the encrypted information and the first measurement information.

13. The non-transitory computer-readable storage medium according to claim 12, wherein:
sending the second measurement information to the second network device comprises sending a NETCONF protocol response message to the second network device, wherein the response message carries the second measurement information.

14. The non-transitory computer-readable storage medium according to claim 13, wherein:
the encrypted information and the first measurement information in the request message use an Internet Engineering Task Force Yet Another Next Generation data model (IETF YANG) data model format; and
the first measurement information in the response message uses the IETF YANG data model format.

15. The non-transitory computer-readable storage medium according to claim 11, wherein receiving the encrypted information from the second network device comprises:
receiving, through the second network device, the encrypted information sent by a fourth network device; and
wherein when the instructions are run on a computer, the computer is caused to further perform the following:

receiving third measurement information of the fourth network device through the second network device; and before decrypting the encrypted information, determining, based on the third measurement information, that the fourth network device is system-trusted.

16. The non-transitory computer-readable storage medium according to claim 11, wherein when the instructions are run on a computer, the computer is caused to further perform the following:

receiving identity information sent by the second network device; and before decrypting the encrypted information, determining, based on the identity information, that an identity of the second network device is valid.

* * * * *